US006816089B2

(12) United States Patent
Flick

(10) Patent No.: US 6,816,089 B2
(45) Date of Patent: Nov. 9, 2004

(54) VEHICLE TRACKER HAVING FIND ALERT FEATURES AND RELATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 269 days.

(21) Appl. No.: 10/105,892

(22) Filed: Mar. 25, 2002

(65) Prior Publication Data

US 2002/0101366 A1 Aug. 1, 2002

Related U.S. Application Data

(63) Continuation-in-part of application No. 09/859,727, filed on May 17, 2001, now Pat. No. 6,512,465.
(60) Provisional application No. 60/264,811, filed on Jan. 29, 2001, provisional application No. 60/258,005, filed on Dec. 22, 2000, provisional application No. 60/251,552, filed on Dec. 6, 2000, provisional application No. 60/252,125, filed on Nov. 20, 2000, provisional application No. 60/236,890, filed on Sep. 29, 2000, provisional application No. 60/246,463, filed on Nov. 7, 2000, provisional application No. 60/222,777, filed on Aug. 3, 2000, and provisional application No. 60/205,178, filed on May 17, 2000.

(51) Int. Cl.[7] ............................................. G08G 1/123
(52) U.S. Cl. .................. 340/989; 340/988; 340/539 B; 342/357.07; 342/357.08; 701/200; 701/213
(58) Field of Search .................... 340/825.36, 825.49, 340/989, 426.13, 426.19, 426.17, 426.2, 426.21, 539.32, 539.13; 379/37, 38, 74

(56) References Cited

U.S. PATENT DOCUMENTS

| 4,837,700 A | 6/1989 | Ando et al. .................. 364/449 |
| 5,024,186 A | 6/1991 | Long et al. .............. 123/179 B |
| 5,043,736 A | 8/1991 | Darnell et al. ............... 342/357 |
| 5,055,851 A | 10/1991 | Sheffer ........................ 342/457 |
| 5,177,490 A | 1/1993 | Ando et al. .................. 342/357 |
| 5,223,844 A | 6/1993 | Mansell et al. ............. 342/357 |
| 5,262,774 A | 11/1993 | Kuwahara et al. .......... 340/988 |
| 5,334,986 A | 8/1994 | Fernhout ..................... 342/357 |
| 5,365,450 A | 11/1994 | Schuchman ................. 364/449 |

(List continued on next page.)

FOREIGN PATENT DOCUMENTS

| CA | 2133673 | 4/1996 | ........... H04B/7/185 |

OTHER PUBLICATIONS

Omega Research and Development, Inc., "GPS 2000", distributed at Consumer Electronics Show in Las Vegas, NV, Jan. 2001, pp. 1–4.

Omega Research and Development, Inc., "Omega Thinks Customers Don't Know Jack!", distributed at Consumer Electronics Show in Las Vegas, NV, Jan. 2001, one page.

Omega Research and Development, Inc., Installation Instructions for ATV–1000 Model Car Alarm, 2002.

Primary Examiner—John Tweel
(74) Attorney, Agent, or Firm—Allen, Dyer, Doppelt, Milbrath & Gilchrist, P.A.

(57) ABSTRACT

A vehicle tracking unit for a vehicle of a type including a vehicle alarm indicator may include a vehicle position determining device, a wireless communications device, and a controller connected to the wireless communications device and the vehicle position determining device to send vehicle position information to a monitoring station. Furthermore, the controller may cause the vehicle alarm indicator to provide an alarm indication lasting for a predetermined time and based upon the wireless communications device receiving a vehicle finder activation signal. The controller may also cause the vehicle alarm indicator to cease providing the alarm indication prior to expiration of the predetermined time based upon a user input.

31 Claims, 36 Drawing Sheets

U.S. PATENT DOCUMENTS

| | | | | |
|---|---|---|---|---|
| 5,398,190 A | | 3/1995 | Wortham | 364/460 |
| 5,483,455 A | | 1/1996 | Lay et al. | 364/448 |
| 5,515,043 A | | 5/1996 | Berard et al. | 340/988 |
| 5,515,285 A | | 5/1996 | Garrett, Sr. et al. | 364/460 |
| 5,570,087 A | | 10/1996 | Lemelson | 340/870.05 |
| 5,572,204 A | | 11/1996 | Timm et al. | 340/988 |
| 5,587,715 A | | 12/1996 | Lewis | 342/357 |
| 5,588,038 A | | 12/1996 | Snyder | 379/57 |
| 5,673,305 A | | 9/1997 | Ross | 379/58 |
| 5,682,133 A | | 10/1997 | Johnson et al. | 340/426 |
| 5,777,580 A | | 7/1998 | Janky et al. | 342/457 |
| 5,825,283 A | | 10/1998 | Camhi | 340/438 |
| 5,895,436 A | | 4/1999 | Savoie et al. | 701/214 |
| 5,939,975 A | | 8/1999 | Tsuria et al. | 340/426 |
| 5,944,768 A | | 8/1999 | Ito et al. | 701/200 |
| 5,969,433 A | | 10/1999 | Maggiora et al. | 307/10.5 |
| 5,983,161 A | | 11/1999 | Lemelson et al. | 701/301 |
| 5,986,543 A | | 11/1999 | Johnson | 340/426 |
| 6,018,657 A | | 1/2000 | Kennedy, III et al. | 455/426 |
| 6,025,774 A | | 2/2000 | Forbes | 340/426 |
| 6,028,514 A | * | 2/2000 | Lemelson et al. | 340/539.13 |
| 6,028,537 A | | 2/2000 | Suman et al. | 340/988 |
| 6,049,269 A | | 4/2000 | Byrd et al. | 340/426 |
| 6,055,426 A | | 4/2000 | Beasley | 455/432 |
| 6,067,007 A | | 5/2000 | Gioia | 340/426 |
| 6,069,570 A | | 5/2000 | Herring | 340/825.49 |
| 6,075,458 A | | 6/2000 | Ladner et al. | 340/825.49 |
| 6,101,443 A | | 8/2000 | Kato et al. | 701/210 |
| 6,116,639 A | | 9/2000 | Breed et al. | 280/735 |
| 6,128,571 A | | 10/2000 | Ito et al. | 701/201 |
| 6,131,067 A | | 10/2000 | Girerd et al. | 701/213 |
| 6,133,855 A | | 10/2000 | Kim | 340/932.2 |
| 6,140,956 A | | 10/2000 | Hillman et al. | 342/357.07 |
| 6,148,212 A | | 11/2000 | Park et al. | 455/456 |
| 6,151,551 A | | 11/2000 | Geier et al. | 701/207 |
| 6,154,648 A | | 11/2000 | Comer | 455/426 |
| 6,166,626 A | | 12/2000 | Janky et al. | 340/426 |
| 6,167,255 A | | 12/2000 | Kennedy, III et al. | 455/414 |
| 6,169,497 B1 | | 1/2001 | Robert | 340/988 |
| 6,195,597 B1 | | 2/2001 | Yamada | 701/1 |
| 6,211,818 B1 | | 4/2001 | Zach, Sr. | 342/357.07 |
| 6,236,365 B1 | | 5/2001 | LeBlanc et al. | 342/457 |
| 6,240,365 B1 | | 5/2001 | Bunn et al. | 701/213 |
| 6,259,381 B1 | | 7/2001 | Small | 340/988 |
| 6,275,773 B1 | | 8/2001 | Lemelson et al. | 701/301 |
| 6,298,306 B1 | | 10/2001 | Suarez et al. | 701/213 |
| 6,313,791 B1 | | 11/2001 | Klanke | 342/357.17 |
| 6,314,366 B1 | | 11/2001 | Farmakis et al. | 701/201 |
| 6,320,535 B1 | | 11/2001 | Hillman et al. | 342/357.1 |
| 6,321,091 B1 | | 11/2001 | Holland | 455/456 |
| 6,330,499 B1 | | 12/2001 | Chou et al. | 701/33 |
| 6,331,825 B1 | * | 12/2001 | Ladner et al. | 340/988 |
| 6,339,745 B1 | | 1/2002 | Novik | 701/208 |
| 6,363,324 B1 | * | 3/2002 | Hildebrant | 701/213 |
| 6,405,125 B1 | * | 6/2002 | Ayed | 701/200 |
| 6,407,698 B1 | * | 6/2002 | Ayed | 342/357.07 |
| 6,489,921 B1 | * | 12/2002 | Wilkinson | 342/357.08 |
| 6,522,265 B1 | * | 2/2003 | Hillman et al. | 340/988 |
| 2001/0045886 A1 | | 11/2001 | Minowa | 340/7.45 |

\* cited by examiner

VEHICLE TRACKER HAVING FIND ALERT FEATURES AND RELATED METHODS

RELATED APPLICATIONS

The present application is a continuation-in-part of U.S. patent application Ser. No. 09/859,727 filed May 17, 2001, now U.S. Pat. No. 6,512,465, which, in turn, is based upon provisional application Ser. Nos. 60/264,811 filed on Jan. 29, 2001; 60/258,005, filed Dec. 22, 2000; 60/251,552, filed Dec. 6, 2000; 60/252,125, filed Nov. 20, 2000; 60/236,890, filed Sep. 29, 2000; 60/246,463, filed Nov. 7, 2000; 60/222,777, filed Aug. 3, 2000; and 60/205,178, filed May 17, 2000, the entire contents of each of which are incorporated herein by reference.

FIELD OF THE INVENTION

The present invention relates to the field of vehicle devices, and, more particularly, to a tracking and alerting system for a vehicle.

BACKGROUND OF THE INVENTION

Motor vehicles, such as passenger cars, trucks, busses, fleet vehicles, etc. are widely used and knowing the locations of such vehicles is often desired. For example, should a vehicle be stolen, it would be beneficial to know the vehicle's location so that authorities could be promptly and accurately directed to retrieve the vehicle. Indeed, the tracking system could plot the getaway path of the thief.

For a company with hired drivers, it may be desirable to know the driver's whereabouts during the course of the day. Similarly, a rental car agency or other fleet operator, for example, may wish to know the whereabouts of its fleet of vehicles.

It may also be desirable to track the location of a vehicle as it is used throughout the course of a normal day. For parents of younger or older drivers, for example, knowledge of the vehicle's location may provide some assurance that the driver is at designated locations and following a prescribed route.

A number of patents disclose various systems and approaches to tracking vehicles. For example, U.S. Pat. No. 5,223,844 discloses a tracking system including a control center and a mobile unit installed in the vehicle. The mobile unit may send security warnings to the command center via a wireless transceiver. Position information for the vehicle is determined using a GPS receiver at the vehicle.

U.S. Pat. No. 5,515,043 discloses a similar system which may send one or more preprogrammed telephone messages to a user when away from the vehicle. The user may remotely access location information or cause certain commands to be carried out by entering a personal identification number (PIN).

The widespread availability and use of the Internet has prompted a number of vehicle tracking systems to also make use of the Internet. For example, TelEvoke, Inc. proposed such a system in combination with Clifford Electronics. The system was to provide notification, control and tracking services via the telephone or the Internet. Users could be notified via phone, e-mail, or pager of events such as a car alarm being triggered. Users could control the vehicle remote devices via phone, web, or PDA such as unlocking car doors. Additionally, users could track TelEvoke-enabled vehicles on the Internet or via the telephone. An Internet map could be viewed by the user showing the actual and prior vehicle locations. TelEvoke offered its services via a centralized fully automated Network Operations Center. To reduce the communications costs, it was proposed to use the control channel of the cellular telephone network.

Many conventional vehicle tracking units include many input and output connections. Accordingly, such units may be difficult to install in a vehicle. This is especially so since the space available to access and connect to vehicle wires is likely to be restricted. Accordingly, errors in the initial installation may occur. Accurate diagnosis of any such errors may be time consuming and add further to the installation costs. Maintenance of an installed system may also be complicated if each connection must be individually checked and rechecked.

SUMMARY OF THE INVENTION

In view of the foregoing background, it is therefore an object of the present invention to provide a vehicle tracking unit which provides a vehicle find alert and related methods.

This and other objects, features, and advantages in accordance with the present invention are provided by a vehicle tracking unit for a vehicle of a type including a vehicle alarm indicator. The vehicle tracking unit may include a vehicle position determining device, a wireless communications device, and a controller connected to the wireless communications device and the vehicle position determining device to send vehicle position information to a monitoring station. Furthermore, the controller may cause the vehicle alarm indicator to provide an alarm indication lasting for a predetermined time and based upon the wireless communications device receiving a vehicle finder activation signal. The controller may also cause the vehicle alarm indicator to cease providing the alarm indication prior to expiration of the predetermined time based upon a user input.

As a result, the vehicle tracking system may therefore advantageously be used to provide the alarm indication when the vehicle may otherwise be out of range for a standard alarm system transmitter (e.g., a key fob transmitter). Yet, the user may still cause the alarm indication to cease so that he does not have to hear and/or see an alarm indication for the entire predetermined period.

More particularly, the controller may be switchable between armed and disarmed modes, and the user input may include switching the controller from the armed mode to the disarmed mode. By way of example, the vehicle may further include an ignition switch, and the controller may be connected to the ignition switch and switch between armed and disarmed modes based upon the ignition switch. Furthermore, the controller may switch between armed and disarmed modes based upon a remote transmitter to be carried by a user and/or based upon a signal from the monitoring station.

In addition, the vehicle may further include a security controller, and the controller may be responsive to the security controller for switching between armed and disarmed modes. The controller may also cooperate with the vehicle position determining device and the wireless communications device to send an alert message to the monitoring station based upon the vehicle changing location while the controller is in the armed mode. In some embodiments, the controller may switch off the alarm indication based upon any of the above inputs irrespective of the operating mode of the controller.

The vehicle tracking unit may include a housing, and the vehicle position determining device, the wireless communications device, and the controller may conveniently be carried by the housing. Also, the vehicle alarm indicator may include at least one of a vehicle horn, a vehicle siren, a vehicle parking light, a vehicle headlight, a vehicle turning direction indicator, a vehicle hazard light, and a strobe light. Further, the controller may include at least one dual polarity compatible output, and the vehicle alarm indicator may be connected to the dual polarity compatible output. By way of example, the vehicle position determining device may be a Global Positioning System (GPS) device, and the wireless communications device may be a cellular telephone communications device. Additionally, the cellular telephone communications device may communicate over a cellular control channel.

A vehicle location method for a vehicle of a type including a vehicle alarm indicator and a vehicle tracking unit, such as the one briefly described above, is also provided in accordance with the present invention. The method may include sending a vehicle finder activation signal to the wireless communications device, and providing an alarm indication lasting for a predetermined time using the vehicle alarm indicator based upon the wireless communications device receiving the vehicle finder activation signal. Additionally, a user input may be provided to the controller, and the method may also include ceasing providing the alarm indication prior to expiration of the predetermined time based upon the controller receiving the user input.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

Figure 1:
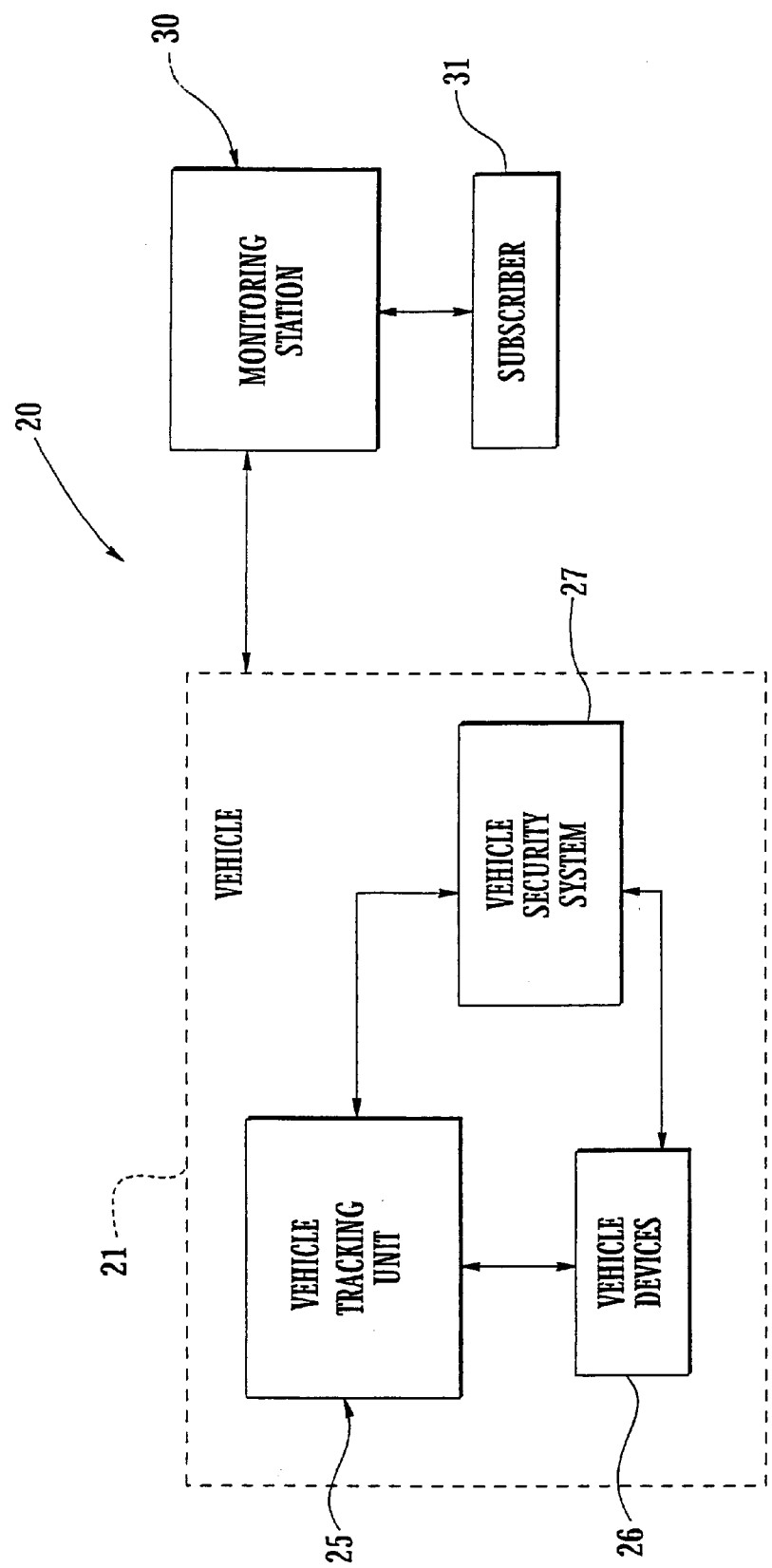
FIG. 1 is a simplified block diagram of a vehicle tracking system in accordance with the present invention.
Figure 2:
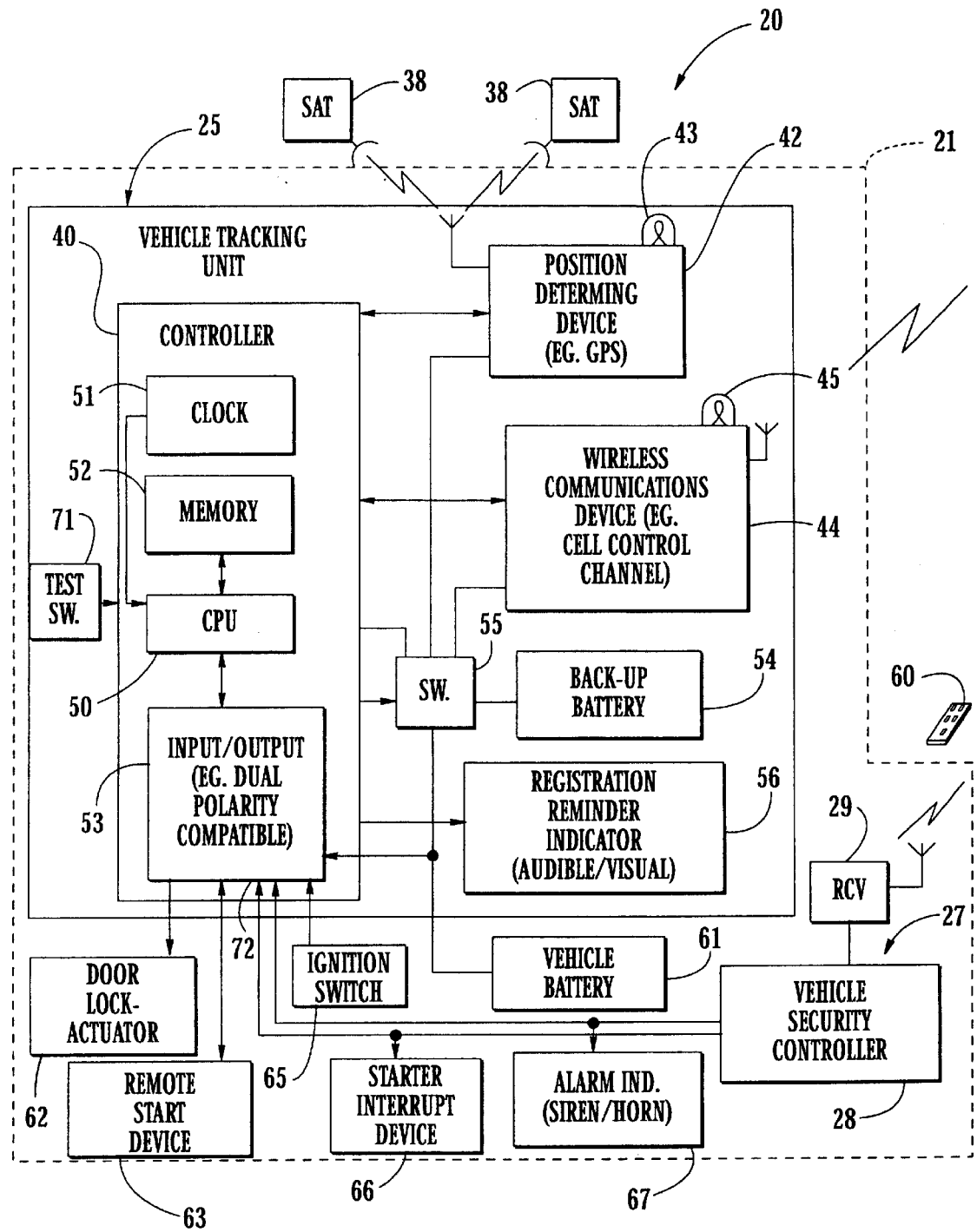
FIG. 2 is a more detailed block diagram of the vehicle tracking unit as shown in FIG. 1.
Figure 3:
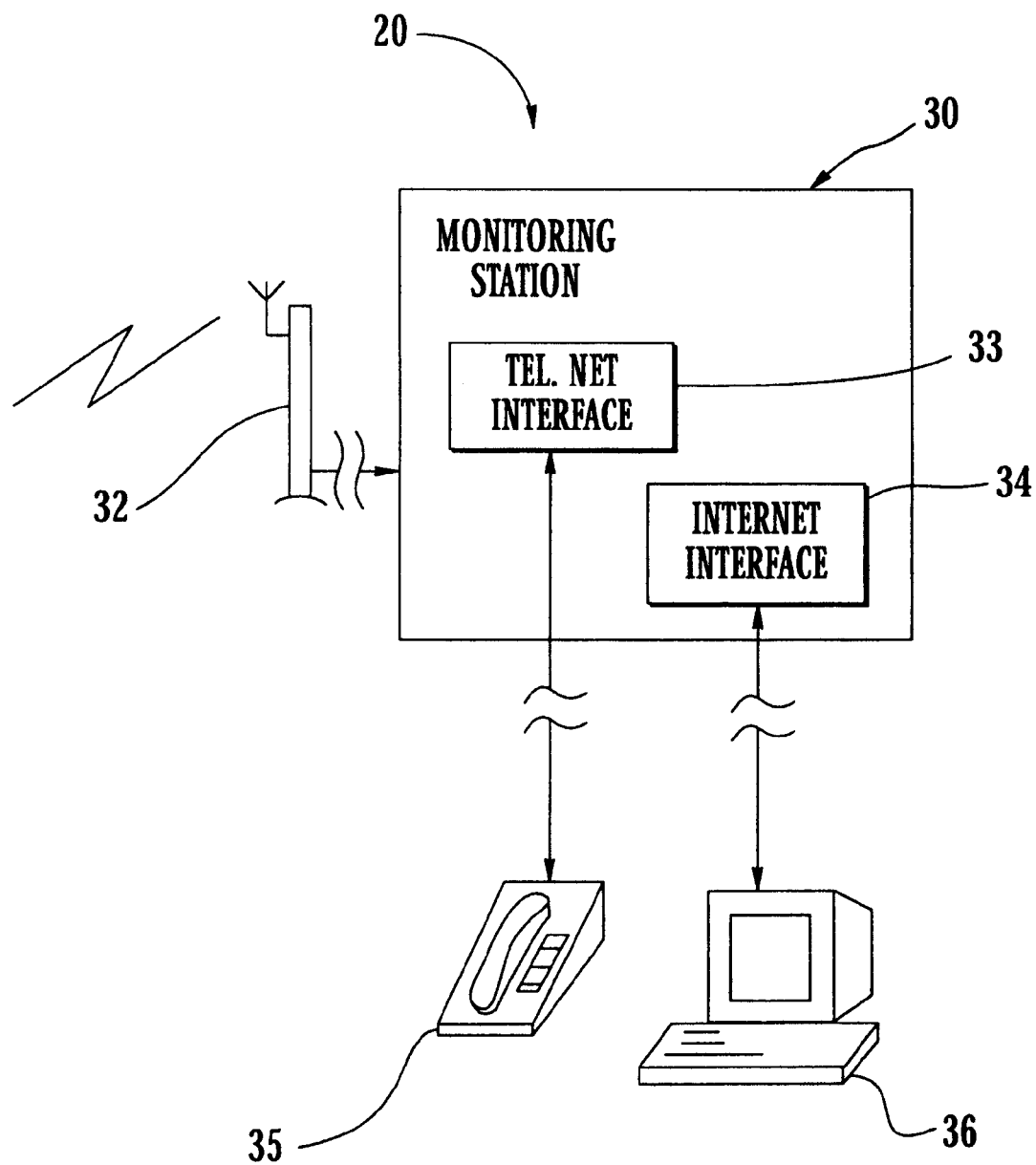
FIG. 3 is more detailed block diagram of the monitoring station as shown in FIG. 1.

Referring to FIGS. 1–3, the vehicle tracking system 20 in accordance with the invention is now initially described. The vehicle system 20 illustratively includes a vehicle tracking unit 25 to be mounted in the vehicle 21 and a monitoring station 30 which is remote from the vehicle and which is typically in a fixed location. In the illustrated embodiment, the vehicle tracking unit 25 interfaces with various vehicle devices, such as may include security sensors, door locks, etc. as will be appreciated by those skilled in the art.

The vehicle tracking unit 25 is also illustratively connected to a separate vehicle security system 27 as may already be installed in the vehicle 21, from the factory or installed as an aftermarket product. Those of skill in the art will appreciate that in some embodiments of the vehicle tracking system 20 a separate vehicle security system 27 may not be needed, and/or various features thereof can be readily incorporated in the vehicle tracking unit 25.

The monitoring station 30 may typically service a number of subscribers 31. As shown perhaps best in FIG. 3, the monitoring station 30 may include a user interface, such as the schematically illustrated telephone network interface 33 and the internet interface 34 which are schematically coupled to a telephone 35, and a computer 36, respectively. Of course in other embodiments, other interfaces may be used and only one of the illustrated interfaces may be needed. Those of skill in the art will also recognize that messages may be sent to a subscriber or user via preprogrammed voice messages, e-mail messages, facsimile messages, pager alerts, etc. In addition commands or instructions from the subscriber can also be input to the monitoring station 30 via the telephone network interface 33 and/or the internet interface 34, from the subscribers telephone 35 or computer 36.

The monitoring station 30 is illustrated connected to a cellular telephone tower 32 which, in turn, may communicate with the vehicle tracking unit 25 in some embodiments. Of course, in other embodiments other communications approaches are also contemplated, such as, for example, including satellite communications.

The monitoring station 30 may typically include the necessary modems, and other communications electronics, and computers for its functions which are described in greater detail below. The configuration of such components and their details will be readily apparent to those skilled in the art. Accordingly, no further discussion of these details is needed.

Referring now more specifically to FIG. 2, additional details of the vehicle tracking unit 25 and devices at the vehicle are now further described. The vehicle tracking unit 25 illustratively includes a controller 40, a vehicle position determining device 42, and a wireless communications device 44 connected together. The vehicle position determining device 42 may be provided by a GPS receiver, for example. The GPS receiver typically operates by receiving multiple signals from spaced apart satellites 38 as will be appreciated by those skilled in the art.

In other embodiments, the vehicle position determining device 42 may be provided based upon communications with the cellular telephone network, or based upon other satellite transmissions, for example. As a particular example, time of arrival techniques are available based upon multiple reception paths to determine position via the cellular telephone network as will be appreciated by those skilled in the art. The vehicle position determining device 42 also illustratively includes an indicator 43 associated therewith, such as for indicating an operating mode, or proper operation of the device as will be addressed in greater detail below.

The wireless communications device 44 may be provided by a cellular telephone transceiver configured to operate on a control channel of the cellular network. Such a control channel may provide nearly universal coverage for the tracking system 20 as will be appreciated by those skilled in the art. In addition, the control channel may offer relatively inexpensive communications between the monitoring station 30 and the vehicle tracking unit 25 as will be appreciated by those skilled in the art. The wireless communications device 44 also illustratively includes an optional status indicator 45 with a similar function as the indicator 43 for the vehicle position determining device.

The wireless communications device 44 in other embodiments, may transmit in the voiceband of the cellular network. Alternately, the wireless communications device may communicate over other networks, such as over satellite, or via wireless internet services, as will be appreciated by those skilled in the art.

The controller 40 illustratively includes a central processing unit (CPU) 50 or other logic circuitry which is connected to a clock signal generator 51 and a memory 52. In other embodiments, the memory 52 may be an embedded memory in the CPU 50. The controller 40 also includes schematically illustrated input/output circuitry 53 to interface with various vehicle devices. In particular the input/output circuitry 53 may provide dual polarity compatibility for one or more inputs or outputs as will be described in greater detail below. One or more of the terminals of the input/output circuitry 53 may also provide both input and output functions as will also be described in greater detail below. This may significantly simplify and accelerate installation of the vehicle tracking unit 25 in the vehicle 21.

Also illustratively shown as part of the vehicle tracking unit 25 are a back-up battery 54, and switch 55 connected thereto for selectively powering certain of the components based upon the controller 40. Of course, the vehicle 21 also includes an electrical system including the vehicle battery 61. Powering of the vehicle tracking unit 25 is described in greater detail below.

The vehicle 21 also includes a number of other components that may relate to vehicle tracking, security, and/or convenience features provided by the vehicle tracking system 20. For example, the vehicle 21 may include one or more door lock actuators 62, an optional remote starting device 63, a starter interrupt device 66 and an alarm indicator 67. For example, the alarm indicator may be provided by a vehicle horn or vehicle siren, and/or flashing of the lights.

The optional separate security system 27 illustratively includes a vehicle security controller 28 and a receiver 29 connected thereto. As is conventional, the vehicle security system 27 may be switched between armed and disarmed modes, for example, by one or more uniquely coded remote transmitters 60. The vehicle security controller 28 may also be capable of learning a new uniquely coded remote transmitter 60 as will be appreciated by those skilled in the art. The vehicle security controller 28 also illustratively is connected to the starter interrupt device 66 and the alarm indicator 67.

For ease of explanation, a number of the features of the vehicle tracking system 20 are now described. The vehicle tracking system 20 includes a number of features that may simplify installation and maintenance. For example, as shown in FIG. 2, the vehicle tracking unit 25 may have a test switch 71 connected to the controller 40.

In normal operation, the controller 40 may be called upon to operate at least one vehicle device. Of course, the controller 40 also cooperates with the wireless communications device 44 and the vehicle position determining device 42 to determine and send vehicle position information to the monitoring station 30. Moreover, the controller 40 may be switchable to a test mode for test operation of the at least one vehicle device responsive to activation of the test switch 71.

In some embodiments, the at least one vehicle device may be a plurality of vehicle devices that are tested by operation in sequence. For example, the at least one vehicle device may comprise at least one door lock actuator 62. The at least one vehicle device may also comprise the starter interrupt device 66, or the engine remote starter 63 if remote starting is an implemented feature. The at least one vehicle device which is tested, may also be the alarm indicator 67. Accordingly, an installer, for example, can quickly check that the tracking unit has been properly installed.

To further provide for ready determination of proper operation of the vehicle tracking unit 25, one or both of the position determining and wireless communications devices 42, 44 may include associated indicators 43, 45 as mentioned briefly above, and which provide an indication relating to proper operation. Each indicator 43, 45 may indicate a mode of operation of the device, its proper operation, or a partial or complete failure of the device.

Another aspect of the invention is that the controller 40 may provide a selectable polarity for the at least one vehicle device based upon sensing thereof. Accordingly, a predetermined activation of the test switch 71 may cause the controller 40 to sense and select the proper polarity. Pressing the test switch 71 for a predetermined time or in a predetermined pattern may sense and set the polarity.

Another feature of the vehicle tracking unit 25 and vehicle tracking system 20 relates to conservation of the number of codes or messages that need to be sent to the vehicle tracking unit. In particular, the controller 40 may have a plurality of different controller states and respond differently to a same message from the monitoring station 30 at different times depending upon the controller state at a given time. Accordingly, a number of codes or messages used by the system can be conserved. Various messages are described in greater detail below.

A controller state may change based upon several different occurrences or events. For example the controller may change states in response to a change in at least one vehicle device, or based upon a message received by the wireless communications device 44 from the monitoring station 30, and/or based upon elapsed time. The controller states, for example, may include an alert sent state based upon an alert message being sent from the wireless communications device 44. Thereafter, receipt of a predetermined message by the wireless communications device 44 when the controller 40 is in the alert sent state may confirm receipt of the alert message by the monitoring station.

Receipt of the predetermined message by the wireless communications device 44 when the controller 40 is in another state different than the alert sent state may thus cause a different response by the controller. The alert sent state may comprise at least one of a vehicle stolen alert sent state, a vehicle alarm sounding alert sent state, a vehicle speeding alert sent state, an unauthorized remote transmitter alert sent state, a low vehicle battery alert sent state, and a device malfunction alert sent state. The various alert messages and confirmation thereof are described in greater detail below.

The code or message conservation aspects of the vehicle tracking system 20 also permit sending a sequence of codes or messages within a predetermined time to also cause a different response at the vehicle tracking unit 25. In other words, the plurality of controller states may comprise a received first message state based upon a first message being received by the wireless communications device 44 from the monitoring station 30. Receipt of a second message by the wireless communications device 44 when the controller 40 is in the received first message state, such as within a predetermined time window, for example, may thus cause a different response by the controller than does receipt of the second message when the controller is in another state than the received first message state.

The plurality of controller states may comprise a vehicle finder state sounding an audible signal via the alarm indicator 67 at the vehicle 21. In this state the controller 40 would bypass sending a vehicle alarm sounding alert to the monitoring station 30.

Another aspect of the vehicle tracking system 20 is the provision of certain power conservation and management techniques, such as to permit extended periods where the vehicle 21 is not in operation. During such extended periods, the vehicle battery 61 provides power to the vehicle tracking unit 25 as well as other vehicle devices. Accordingly, the voltage of the vehicle battery 61 drops over time. The vehicle tracking unit 25 may provide a significant drain on the vehicle battery 61 because of the power consumed by the wireless communications device 44 during transmission as will be appreciated by those skilled in the art.

The vehicle position determining device 42, the wireless communications device 44 and the controller 40 may be considered as defining a power load of the vehicle tracking unit 25. The controller 40 may operate the schematically illustrated power switch 55 to isolate the back-up battery 54 from the power load as a voltage of the vehicle battery 61 drops until reaching a threshold. After or below the threshold the controller 40 may cause the back-up battery 54 to selectively power only a first portion of the power load while a second portion of the power load remains powered by the vehicle battery.

For example, the wireless communications device 44 may have a higher operating voltage than the vehicle position determining device 42. The first portion of the power load that is selectively powered despite the low vehicle battery voltage may thus be the wireless communications device 44. In particular, the wireless communications device 44 may be powered for transmission. Accordingly, the back-up battery 54 can be saved for limited communication using the higher voltage wireless communications device 44. This provides useful features even after an extended period during which the vehicle 21 is left unattended and the vehicle battery 61 gradually discharges.

To further conserve power, the controller 40 may reduce operation of the power load as vehicle battery voltage falls. Conversely, the controller 40 may restore operation of the power load based upon the voltage of the vehicle battery 61 rising again, such as upon being recharged.

Also relating to power consumption, the controller 40 further causes transmission of a low vehicle battery voltage alert to the monitoring station 30 based upon the voltage of the vehicle battery 61 falling below the threshold. The user or subscriber may cause the monitoring station 30 to issue a remote start command. The controller 40 may then generate a remote start output to the remote start device 63 to thereby start the engine and recharge the vehicle battery.

Another feature of the vehicle tracking system 20 is that the vehicle tracking unit 25 may be readily installed and connected to a vehicle 21, such as in the illustrated embodiment where the vehicle includes a starter interrupt device 66 and a separate vehicle security controller 28. More particularly, the controller 40 may switch between an armed mode and a disarmed mode based upon operation of the engine starter interrupt device 66. The controller 40 when in the armed mode may cooperate with the wireless communications device 44 to send an alert message to the monitoring station 30 and including vehicle position information, for example, based upon the vehicle position determining device 42. The controller 40 is also for selectively operating the engine starter interrupt device 66 to provide additional security features.

In one advantageous embodiment, the controller 40 preferably comprises a combination input and output terminal for connection to the engine starter interrupt device. This terminal is at the input/output circuitry 53 and is schematically illustrated by reference numeral 72. The controller 40 may switch to the armed mode when in the disarmed mode and based upon the engine starter interrupt device 66 being operated to disable engine starting. Conversely, the controller 40 may switch to the disarmed mode based upon the engine starter interrupt device 66 being operated to enable engine starting. In other words, the vehicle tracking unit 25 can piggyback its arming and disarming off the existing vehicle security system 27, for example.

The controller 40 may also selectively operate the engine starter interrupt device 66 based upon a command message from the monitoring station 30. The controller 40 may selectively operate the engine starter interrupt device 66 based upon a command message from the monitoring station 30. Alternately, or in addition thereto, the controller 40 may selectively operate the engine starter interrupt device 66 based upon the ignition switch 65.

The following descriptive portions relate to various user or subscriber notifications and features provided by the vehicle tracking system 20. Of course, the controller 40 preferably cooperates with the wireless communications device 44 to send an alert message. The monitoring station 30 may comprise a user interface, such as one or both of the telephone network or internet interfaces 33, 34, respectively (FIG. 3), for generating a sequence of alert message notifications based upon receiving the alert message sent from the vehicle tracking unit 25. More particularly, the monitoring station interface permits canceling any remaining alert message notification based upon a cancellation command response from a user or subscriber having already received the alert message notification. The user may send the cancellation response via the telephone 35 or computer 36 (FIG. 3), for example. Thus, if the user may be reached at different telephone numbers or different users are desirably notified of the alert, this aspect of the vehicle tracking system 20 can make the notifications efficiently and without making unnecessary notifications.

The vehicle tracking system 20 may provide any of a number of very useful alerts, as discussed herein. For example, the alert message sent from the vehicle tracking unit may comprise at least one of a vehicle stolen alert message, and a vehicle alarm sounding alert message. The alert message may be one of a vehicle speeding alert message, and a vehicle acceleration alert message. In addition, the alert message may comprise an unauthorized remote transmitter alert message. Also, the alert message may be at least one of a low vehicle battery alert message, and a device malfunction alert message.

The speeding alert may be based upon exceeding a speed threshold for greater than a certain time, which may be user selectable. The acceleration alert may also be useful as such is also indicative of aggressive driving along with the speeding alert. The unauthorized remote transmitter alert increases overall security since a user will be notified if a would-be thief learns an unauthorized transmitter to operate the controller. These alerts are described in greater detail below.

The vehicle tracking system 20 may be implemented as a service to a subscriber. In other words, the subscriber pays a monthly fee for the service. Accordingly, it may be important to encourage a user to register. Similar subscriber or registrations systems in the past have suffered revenue losses since some users would wait to activate the system until the vehicle was stolen. In other words, the user would only subscribe or register and pay a single month's fee.

In accordance with this aspect of the vehicle tracking system 20 prompt user registration is encouraged. In particular, the vehicle tracking unit 25 may include the user registration reminder indicator 56 and the controller 40 may be switchable from an unregistered mode to a registered mode. In the registered mode, the controller 40 may cooperate with the wireless communications device 44 and the vehicle position determining device 42 to determine and send vehicle position information to the monitoring station 30. In the unregistered mode, the controller 40 may activate the user registration reminder indicator 56 to encourage registration by the user.

The controller 40 may be switchable to the registered mode based upon an activation message from the monitoring station 30. For example, when the registration payment has been received, the monitoring station can send one or more messages to the vehicle tracking unit 25 to stop activation of the registration reminder indicator 56. The indicator 56 may be audible, visual or both. For example, the registration reminder indicator 56 could be a beeping sound generated by a small piezoelectric transducer every ten minutes or so when the ignition 65 is on.

In other words, the user registration reminder indicator 56 may provide a minor but irritating annoyance to the user to encourage registration. Upon successfully registering, the annoyance is abated. Accordingly, a relatively straightforward approach is provided to encourage user registration.

Along these lines, the controller 40 when in the unregistered mode may have reduced features compared to the registered mode. For example, the controller 40 when in the unregistered mode may be restricted or limited in sending messages with the wireless communications device 44. Accordingly, usage of the wireless communications network may be reduced. Transmissions from the vehicle tracking unit 25 may also be beneficially suppressed during original installation, for example.

Returning again to features of the vehicle tracking unit 25 which facilitate installation, the controller 40 may send an alarm indication alert responsive to a continuous activation of the alarm indicator 67 for greater than a predetermined time. Alternately, or in addition thereto, the controller 40 may send an alarm indication alert responsive to a repetitive pattern of alarm indicator 67 activations. In other words, the controller may be configured to distinguish between normal operation of a vehicle horn by the driver, and activation of the horn by the security system 27. As mentioned above, the controller 40 may also monitor signals of at least one of a first and second polarity. The controller 40 thus advantageously piggybacks off the alarm indication generated by the vehicle security system 27 to determine and send a vehicle alarm sounding alert to the monitoring station 30.

In one variation, the controller 40 may monitor signals delivered directly to the vehicle alarm indicator by the vehicle security controller 28. In another variation, the controller 40 monitors signals of voltage dips of the vehicle battery 61. Circuitry is conventionally and readily available for both such functions, as will be readily appreciated by those skilled in the art.

The controller 40 may also include a dual polarity compatible output in the input/output circuitry 53 for a vehicle device, such as the vehicle alarm indicator 67. The controller 40 may further monitor signals relating to activation of the vehicle alarm indicator 67 and send an alarm indication alert with position information from the vehicle position determining device and using the wireless communication device.

For the dual polarity output compatibility, the controller 40 may generate a first polarity output pulse followed by a second polarity output pulse. The controller 40 may also generate a repeating pattern of a first polarity output pulse followed by a second polarity output pulse on the dual polarity compatible output. In yet other embodiments, the controller 40 may sense an actual polarity of the device and thereafter use the actual polarity for the dual polarity compatible output.

Where the vehicle device is a vehicle horn, the controller 40 may typically be configured to generate a negative polarity output on the dual polarity compatible output. Conversely, wherein the vehicle device is a vehicle alarm indicator siren, the controller 40 may be configured to generate a positive polarity output on the dual polarity compatible output.

Another aspect of the vehicle tracking system 20 relates to conserving memory space and/or reducing transmission time over the communications network. In accordance with this advantageous feature, the controller 40 may determine the vehicle position information including a vehicle location and an associated stationary period for each occurrence of the vehicle remaining stationary for greater than a predetermined period. In one embodiment, the controller 40 may cooperate with the wireless transmission device 44 to send the vehicle position information to the monitoring station based upon each occurrence of the vehicle remaining stationary for greater than the predetermined period. In this embodiment, the monitoring station 30 may associate a time with each occurrence of the vehicle remaining stationary for greater than the predetermined period. In other words, the monitoring station 30 may time stamp the received information.

In another embodiment, the controller 40 cooperates with the wireless transmission device 44 to send the vehicle position information to the monitoring station 30 for a plurality of occurrences of the vehicle remaining stationary for greater than the predetermined period. In this embodiment, the controller 40 may associate a time with each occurrence of the vehicle remaining stationary for greater than the predetermined period. In other words, the controller time stamps the position and stationary period information.

As an example, the predetermined time which determines whether the vehicle 21 is stationary and the position should be determined, may be less than about three minutes. This time may filter out vehicle stops in normal traffic, but which will keep track of stops where the driver likely leaves the vehicle 21. Accordingly, only the important information necessary to track the vehicle need be stored and/or transmitted thereby reducing the system costs. If the vehicle 21 is stationary overnight, for example, unnecessary position information need not be determined, stored, and/or transmitted to the monitoring station 30.

The controller 40 may comprise the memory 52 for storing the vehicle position information therein. In one configuration, the controller 40 downloads the vehicle position information from the memory 52 to the monitoring station 30 based upon a predetermined schedule. In another configuration, the controller 40 downloads the vehicle position information from the memory 52 to the monitoring station 30 based upon a predetermined event. In yet another configuration, the controller 40 downloads the vehicle position information from the memory 52 to the monitoring station 30 based upon a predetermined percentage of memory usage.

Having now described certain general features and advantages of the vehicle tracking system 20, this description now turns to additional specific details which are provided as examples. In particular, vehicle tracking system 20 preferably implements one or more of the following features:

1. Detects the vehicle being stolen and transmits a signal to the monitoring station to contact up to 3 people, for example, predetermined by the user, of theft of the vehicle and then starts tracking the vehicle. The contact may be by one or more of the following: an e-mail message, a pager alert, a cellular telephone call, or other telephone call.
2. Detects an optional vehicle security or alarm system activation and transmits a signal to the monitoring station to contact up to 3 predetermined people to inform them the vehicle's alarm is being activated.
3. Detects an optional vehicle alarm system's remote PANIC activation and transmits a signal to the monitoring station to contact up to 3 predetermined people to inform them of the vehicle's PANIC being activated.
4. Detects a vehicle being programmed to operate from an unauthorized remote transmitter, key transponder, other transponder, or other device that has a unique coding, and the vehicle unit transmits a signal to the monitoring station to contact up to 3 predetermined people to inform them of this occurrence. The system can also make available information relating to a number of such coded devices, or a change therein, or when a change occurred. A message can be sent to the user or the information can be available to the user on the WEB site. The vehicle would be equipped with a security system as disclosed in U.S. Pat. No. 5,654,688, for example, which determines an unauthorized transmitter and provides an alert feature. This patent is incorporated herein in its entirety by reference.
5. Detects the vehicle traveling over a predetermined speed, such as for a predetermined time, and transmits a signal to the monitoring station to send a message, such as an e-mail informing the user (and/or others) of this occurrence. Of course, the message could also be sent via a telephone call or page, should additional urgency be required. The vehicle's predetermined maximum speed limit and duration thereof can be selected by the user.

6. Detects a low battery voltage such as for a predetermined time and transmits a signal to the monitoring station to contact up to 3 predetermined people to inform them of vehicle's low battery voltage. This is especially advantageous during winter so that the vehicle could be started, for example, to prevent a problem before it happens. The time setting is preferably selectable by the user.

7. Detects the vehicle not moving for a predetermined time and transmits a signal to the monitoring station to send, for example, a nightly email informing the user of all the vehicle's location and stationary time occurrences. The stationary time length is also selectable. This may be advantageous to encourage patrolling personnel not to remain for a long time in a same location.

8. The vehicle unit preferably includes a back-up battery system making it more reliable.

The vehicle unit may be relatively inexpensive. In addition, the monitoring fee that includes sending up to 60 e-mails and making up to 6 phone calls per month, may also be relatively low. The relatively low monitoring fee is based, at least in part, on the current relatively low rates charged for use of the control channel of the cellular telephone network. It is also noted that access to the control channel provides coverage for almost the entire U.S., for example.

The user or subscriber also preferably has access to an Internet site that will display a map and silently contact the vehicle to acquire its current location, speed, direction of travel, and previous multiple locations with speeds, for example, the user's personal identification number (PIN) can be quickly activated by a telephone call. No additional installation may be required.

Certain annual pre-pay package arrangements may be available. For example, up to 10 access entries per month can be provided on a low monthly billing. Up to 30 access entries could be provided also for a relatively low monthly fee.

The present invention provides a number of other significant advantages including optional access from any phone or from any computer to access the monitoring station internet site. The user may control various vehicle functions remotely via the telephone or the internet site. The only charge may be for additional equipment and installation.

Additional features can also be included with the system and subscribed to by the user in accordance with the invention. For example, these include Hijack, Car Finding, Unlock Doors and Unauthorized Transmitter Alert Features. The equipment and installation is relatively inexpensive. For the hijack feature: from any phone or computer, the user may activate vehicle starter interrupt and sound the horn until the vehicle is retrieved (Command 4).

For the Car Finding feature: from any phone or computer, the user may activate the vehicle's horn, or siren and sound same for 30 seconds. This allows the user to find his vehicle in a crowded parking lot (Command 5).

For the Lock/Unlock vehicle doors feature: from any phone or computer a predetermined command (Command 7) activates unlocking of vehicle doors to retrieve keys, for example, that may have been accidentally locked inside the vehicle. Of course, the system can also be used to lock vehicle doors if this was forgotten (Command 6). The unauthorized transmitter alert feature is similarly selected as described above.

In addition, a remote vehicle start feature may also be provided, such as to start the vehicle's engine to heat or cool the vehicle prior to entry. The equipment and installation for remote starting may be relatively low. Some further details of a specific embodiment of the vehicle tracking unit 25 are provided below as relating to use of red and green LED indicators as may be coupled to the controller 40 and operated thereby. Also various representative wires, designated by color, are provided as an example embodiment.

The red LED verifies the GPS receiving signal. With a yellow wire having positive 12 volts, the red LED blinking indicates searching GPS location, constant indicates found location, and off indicates no GPS signal found. With the yellow wire not having positive 12 volts, if the red LED is off, the LED is not functioning.

The green LED verifies receiving the cell tower signal. With the yellow wire having positive 12 volts, blinking indicates the cell control channel signal is detected, constant indicates sending a micro burst signal (LED stays on 5 seconds after each transmission), and off indicates no cell tower signal received. With the yellow wire not having positive 12 volts, off indicates the green LED is not functioning.

An example of representative DIP switch feature selection is as follows. A first switch may be used for adding the orange wire for controlling arm/disarming of the system. When on, the orange wire controls arm/disarm as follows: to arm, the orange wire is grounded and the yellow wire does not have 12 volts positive. To disarm, the orange wire is not grounded. When the first switch is off, then only the yellow wire controls arm/disarm as follows: to arm, the yellow wire is without 12 volts positive, and 30 seconds after continued arm mode then the orange wire activates a constant 500 ma grounded output to operate an external starter interrupt relay until the system is disarmed. To disarm, the yellow wire is connected to 12 volts positive.

A main 5-pin plug may be provided on the vehicle unit and connected as follows:

1. The Red Wire is connected to the 12 vdc power. An alert warning "E" is given if the system is armed and the battery voltage becomes lower than 11 volts for longer than ## minutes. This alert feature "E" will not operate again until the voltage is above 12 volts to re-set this feature.
2. The black wire is connected to ground.
3. The yellow wire is connected to the ignition 12 volts so that if the key is on, 12 volts is supplied thereto and if the key is off, the yellow wire is connected to ground. Further: if the system is in an armed mode and the Lat/Long changes, then Alert "A" is given. If the system is disarmed and within 2.5 seconds after the yellow wire receives 12 volts and the gray wire detects 3 or more positive pulses the system activates Alert "D". If the first DIP switch is in the off position then: if 12 volts is on yellow wire, the system is disarmed and the orange wire discontinues from the 500 ma ground, and if the yellow wire sees ground or neutral, then the system is armed and 30 seconds after the continued arm mode the orange wire activates a constant 500 ma grounded output to operate an external starter interrupt relay until the system is disarmed.
4. The gray wire is for input and output, and can be connected to an alarm siren or horn positive terminal. In addition:

a. With the system armed and if the gray wire detects +12 v pulsing on/off or on constant for more than 10 seconds from an alarm siren or horn honking activation, then alert warning "B" alarm activation is given.
b. With system disarmed and if the gray wire detects 12 v pulsing on/off or on constant for more than 10 seconds from an alarm siren or horn honking activation, then alert warning "C" panic activation is given.
c. With system disarmed and if the Gray wire detects 3 or more 12 volt positive pulses within 2.5 seconds of yellow wire receiving 12 v and the gray wire by-pass not being activated, then alert warning "D" is given.
d. The gray wire bypass operates as follows:
   i. After alert warning "B" bypass all future alert "B" signals until system is disarmed.
   ii. After alert warning "C" bypass all future Alert "C" signals until system is armed.
   iii. After alert warning "D" bypass all future alert "D" signals until no 12 volt pulses are detected on the gray wire within 3 seconds of the yellow wire having 12 volts.
e. With the system armed or disarmed. The Output: Internal +12 v, 1 amp transistor with pulses 1 second on and 1 seconds off to activate siren or honk car horn or flashing Light relay.
   i. Non-stop activation from (Command "4") ii. 30-second activation from (Command "5")
f. Turn off the above alert "A" from (Command "1")
5. The orange wire is for the starter interrupt and arm/disarm system, and operates as follows:
a. If first DIP switch is in the:
   i. On position and: the orange wire has 12 volts or neutral, the system switches to the disarmed mode; the orange wire is grounded, then the system is switched to the armed mode; and the starter interrupt output will not automatically operate. It can only be activated from "Command #4"
   ii. Off position and the orange wire does not effect the arming or disarming of the system; 30 seconds after system arms the orange wire will automatically activate constant 500 ma ground until the system is disarmed. And from "command #4". Connect to Starter interrupt relay output.
b. Command 4 activates Orange wire to have 500 ma. negative until Command 1 is received.
c. After Alert warning "B" is activated the first time it is thereafter bypassed while the orange wire remains grounded. Alert warning "B" is re-set to operate again 3 seconds after orange wire becomes ungrounded.

The vehicle unit may also include a Door Lock Plug configured as follows, for example. A green wire provides a 250 ma, negative 1 second pulse for Lock Doors. (Command "6"). A red wire provides a constant 12v output from the red power wire. A blue wire provides a 250 ma., negative 1 second pulse for Unlock Doors (Command "7"). A pink wire provides a 250 ma., negative 1 second pulse for remote Car Starter (Command "2").

An installation test button may also be provided to work as follows. Pressing the button activates the orange wire for 10-seconds (starter interrupt), with these circuits in sequence. First, it activates the gray wire for 1-second (siren/horn). After the first stops, it activates the green wire for 1 second to lock the doors. After the second stops, it activates the blue wire for 1 second to unlock the doors. After the third stops, it activates the pink wire for 1 second to activate an optional item.

Figure 6:
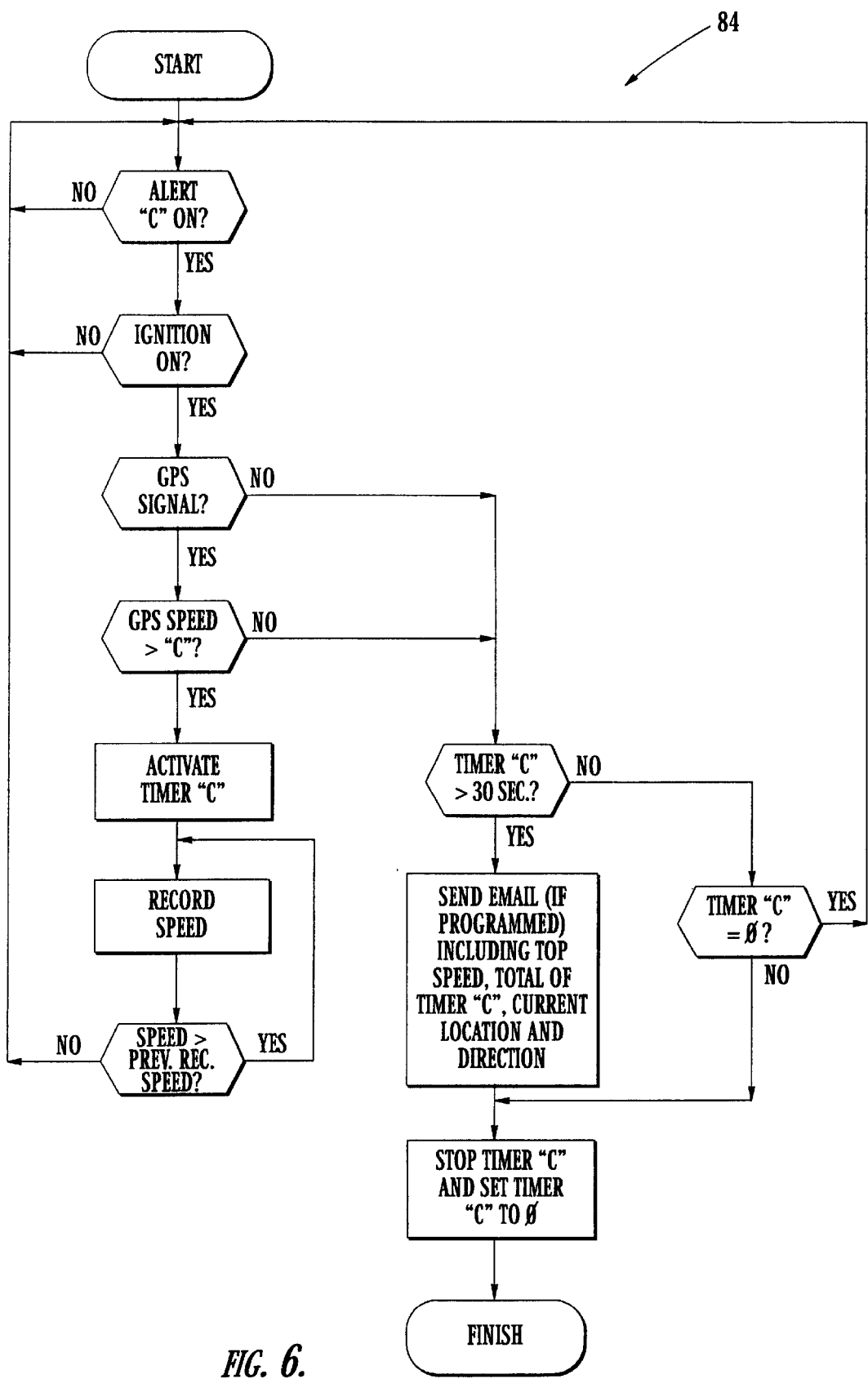
FIG. 6 is a flowchart for operation of the vehicle tracking system as shown in FIG. 1 illustrating a vehicle speeding alert.
Figure 7:
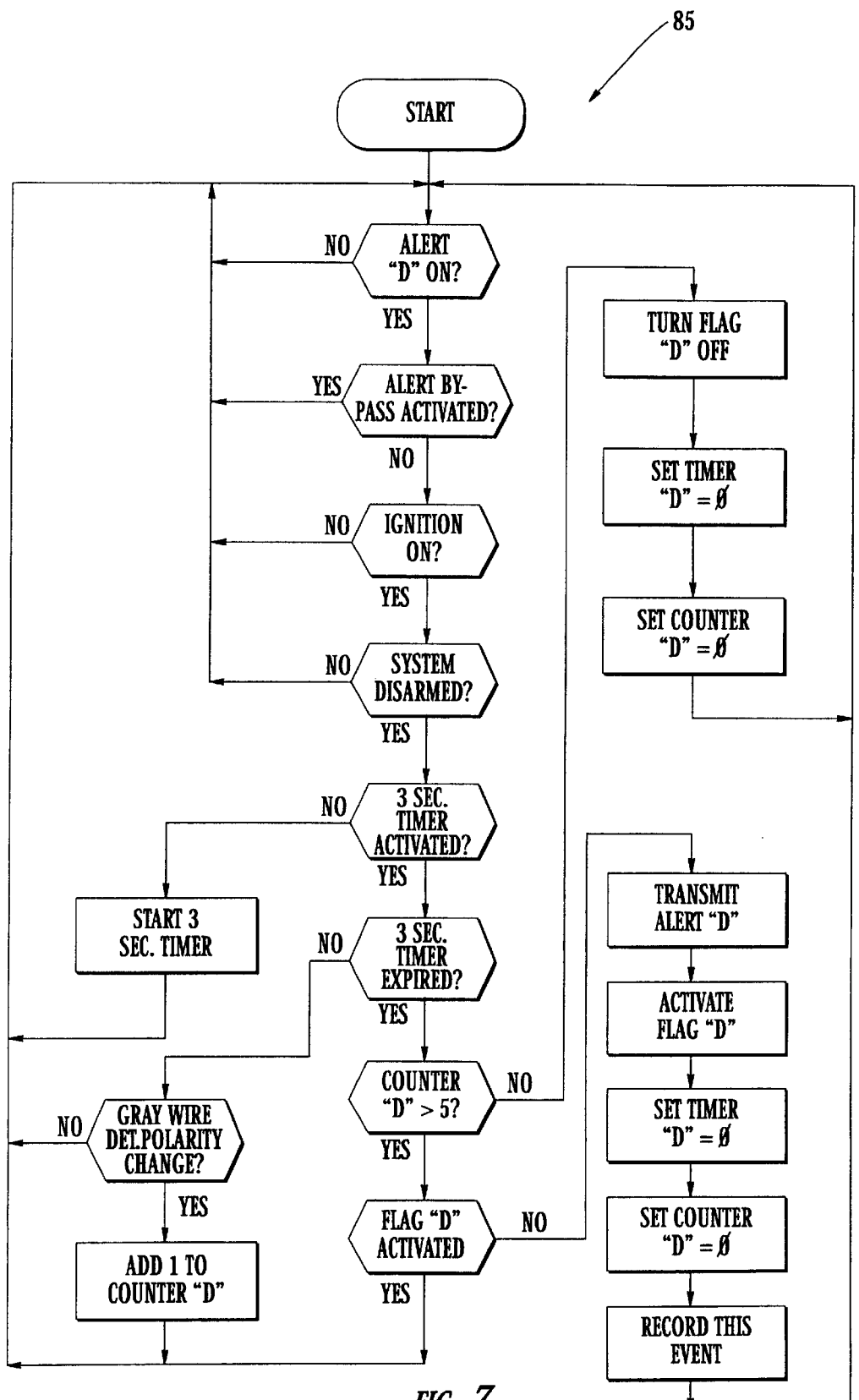
FIG. 7 is a flowchart for operation of the vehicle tracking system as shown in FIG. 1 illustrating an unauthorized transmitter learned alert.

Representative warning alerts are as follows:
1. Alert Warning "A" (FIG. 4): Automatic activation of "Command 8" and the vehicle unit contacts monitoring station to instantly call 3 phone numbers with the message "Your Vehicle is stolen please confirm then call 911 to advise police of web site and your pin # so police can locate the vehicle". This is detected with the system armed and the GPS indicating movement. Bypasses all future alert warning "A" signals until the system is re-armed.
2. Alert Warning "B" (FIGS. 5A–5C): the vehicle unit contacts the monitoring station to instantly call 3 phone numbers with the following message "Vehicle alarm activated please confirm". This is with the system armed and detecting gray wire having 12 volts pulsing or on constant for longer than 10 seconds. After alert warning "B" is activated the first time, it is thereafter bypassed while the orange wire remains grounded. Alert warning "B" is re-set to operate again 3 seconds after orange wire becomes ungrounded.
3. Alert Warning "C" (FIG. 6): the vehicle unit contacts the monitoring station to instantly send e-mail message "vehicle was traveling faster than your preset amount of "###" and time limit of "##" seconds. Indicates the vehicle speed and location that the speeding started and how long speeding accrued" (Detected from GPS). This aspect is further understood with reference to the enclosed flowchart 84 of FIG. 6.
4. Alert Warning "D" (FIG. 7): the vehicle unit contacts the monitoring station to instantly call 3 phone numbers with the message "Unauthorized remote transmitter was just programmed to operate your vehicle." This is with the system disarmed and the Gray wire detecting three or more 12 volt pulses within 2.5 seconds of the yellow wire having seen 12 volts positive. All future alerts "D" are bypassed until no 12 volt pulses are detected on the gray wire within 3 seconds of the yellow wire seeing 12 volts. This aspect is further understood with reference to the enclosed flowchart 85 of FIG. 7.
5. Alert Warning "E" (FIG. 8): the vehicle unit contacts the monitoring station to instantly call 3 phone numbers with the message "Vehicle has low battery voltage and system has changed to low voltage mode". This is with the system armed and detecting the Red wire with lower than 11 volts for ## minutes. All future alerts "E" are bypassed until, first, more than 13.5 volts are detected on the red wire and, second, after the yellow wire stops having positive voltage the red wire then must detect more than 12 volts.

The following are representative commands for use in the system:
Command 1: Reset all circuits and system remains asleep until the ignition key is turned on. Resets the triggered mode and unit is asleep to prevent power drain on vehicle battery.
Command 2: (Accessory activation) monitoring station Command to the system to activate Pink wire to pulse 250 ma negative for 1 second.
Command 3: (Vehicle Location) Web site to indicate present location and past events in memory.
Command 4: (Hijack or Stolen) monitoring station Command to vehicle system to activate:

a. Gray wire to pulse 1 sec on/1 sec off with 1 amp positive output and which continues until receive command #1.

b. Orange wire to have 500 ma ground and which continues until receive command #1.

Command 5: (Car Find) monitoring station Command to system activating Gray wire for 30 seconds pulsing 1 sec on/1 sec off with 1 amp positive output.

Command 6: (Lock Doors) monitoring station Command to system activating Green wire to pulse 1 second with 250 ma negative.

Command 7: (Unlock Doors) monitoring station Command to system to activate Blue wire to pulse 1 second with 250 ma negative.

Command 8: (Start Constant Vehicle Tracking) sends previous 2 events in memory and then every 120 seconds get update of location information sent to the Web site.

The system is also operable in a battery saver mode which operates as follows:

1. With the ignition key off, if the battery voltage drops below 11.5 volts for more than 5 seconds, the GPS verification wakes up to look:
   a. Once instantly.
   b. Once in 1 hour if at the same location.
   c. Once in 6 hours if at the same location.
   d. Once in 12 hours if at the same location.
   e. Once every 24 hours if at the same location.
   f. Activate alert "E" when the battery saver mode is activated, and bypass sending all future Alert "E" until the battery voltage goes above 13 volts for 10 minutes to reset this feature.

Another aspect of the invention relates to automatic vehicle alert e-mails sent containing some or all of the previous system events. This sending can be triggered as follows:

a) At a user selected predetermined time ## (01–24) of each day, or b) At a predetermined memory fill level, such as full or near full.

In addition, each system event may contain one or more of the following:

a) Vehicle Location
b) Vehicle total time at location
c) Time of day
d) Mph traveling
e) Total time traveling above MPH
f) Direction traveling
g) Delta
h) Special Alert messages, if any, including:
   i) GPS signal not received for longer than 5 minutes.
   ii) Traveling above ###MPH for ## minutes.
   iii) Vehicle is stolen.
   iv) Alarm activated.
   v) Unauthorized remote transmitter alert.
   vi) Battery saver mode activated
   vii) Command 1: Reset all circuits and system remains asleep until the ignition key is turned on.
   viii) Command 2: (Accessory activation)
   ix) Command 3: (Vehicle Location was retrieved)
   x) Command 4: (Hijack or Stolen mode activated)
   xi) Command 5: (Car Find mode activated)
   xii) Command 6: (Locked Doors)
   xiii) Command 7: (Unlocked Doors)
   xiv) Command 8: (Started 2-second incremental Vehicle Tracking)

Another feature of the invention relates to the selectable threshold conditions causing an event to be recorded into the memory of the vehicle unit. For example, this may include: while the yellow wire has 12 volts, record events every "??" default 15 minutes time if the GPS location has changed. If the GPS location is the same then only update stationary total time. If the GPS antenna is not receiving any signal then enter last known GPS location and with an indication that this was the last known GPS location before the GPS signal stopped, how long no GPS signal was received, and the GPS location in the on-hold file, when the vehicle is traveling above ### MPH for ##-minutes.

The monitoring station may also provide a number of automated phone calls as described above. These may include:

1. The user's vehicle has issued a stolen alert:
   a. If vehicle is stolen, after receiving the phone message the user then calls 911 to advise police of the theft, and gives the police the Web site address and an identification number, such as the user's PIN, to allow the police to locate where your vehicle has been, where it is now and keep tracking it until the police can retrieve the vehicle.
   b. If this is a false alert due to vehicle being towed away for service, for example, then the user may press "1" to put the vehicle in an off mode. Once the ignition key is turned on again the system will reset back to its normal operation mode.

2. The user's vehicle has issued an alarm activated for more than 10 seconds alert. The system will not respond to this alert again until ignition key is turned on again to reset this feature.

3. The vehicle battery voltage is low or has been disconnected. The tracking system is in low voltage mode. The system will not respond to this alert again until the battery voltage goes above 13 volts for 10 minutes to reset this feature.

The backup battery may be sized according to the GPS receiver and processing power draw. In addition, the battery may also be sized based upon estimated micro burst transmitting power draw. Such transmissions are typically at about 3 watts power to the antenna.

The system according to the invention including the vehicle unit and monitoring station provides a number of significant advantages and features. For example, the police may be directly contacted by the user when the vehicle is stolen. The user receives the telephone message from the monitoring station 30, and this is done without requiring the intervention of a manual security monitoring operator, such as an ADT operator, for example. In addition, once in the stolen mode, the vehicle unit will periodically continue to send out its location, so that the police may track the vehicle via the WEB, for example. This location sending feature may begin immediately, that is, without requiring the user to contact the vehicle to begin tracking. Having the vehicle contacting the monitoring station 30 is considerably less expensive than other schemes where the vehicle is periodically polled via the cellular network, for example.

The system may also be interfaced to a breath alcohol sensor at the vehicle, for example, and this information recorded in memory. The information could be passed along to the monitoring station 30, which, in turn, could send out a notification message (e-mail or telephone) that the vehicle is being operated by a driver who may be impaired by alcohol. The vehicle's location could then be tracked to permit the police to detain the driver.

Another aspect of the unit is that it may be able to recognize the desirability to bypass certain security breach triggers or other events. For example, a car finding feature can be provided that will allow the user to sound the horn or siren when near the vehicle to help locate the vehicle, as in a crowded parking area. Without the bypass feature, the unit could recognize the horn or siren as a security breach and transmit such information to the monitoring center. In accordance with this aspect of the invention, the unit would recognize the car finding feature was activated and thereby bypass sending a security breach transmission, for example. Again, false alarms and unneeded usage and expense of the communications infrastructure would be avoided.

Figure 4:
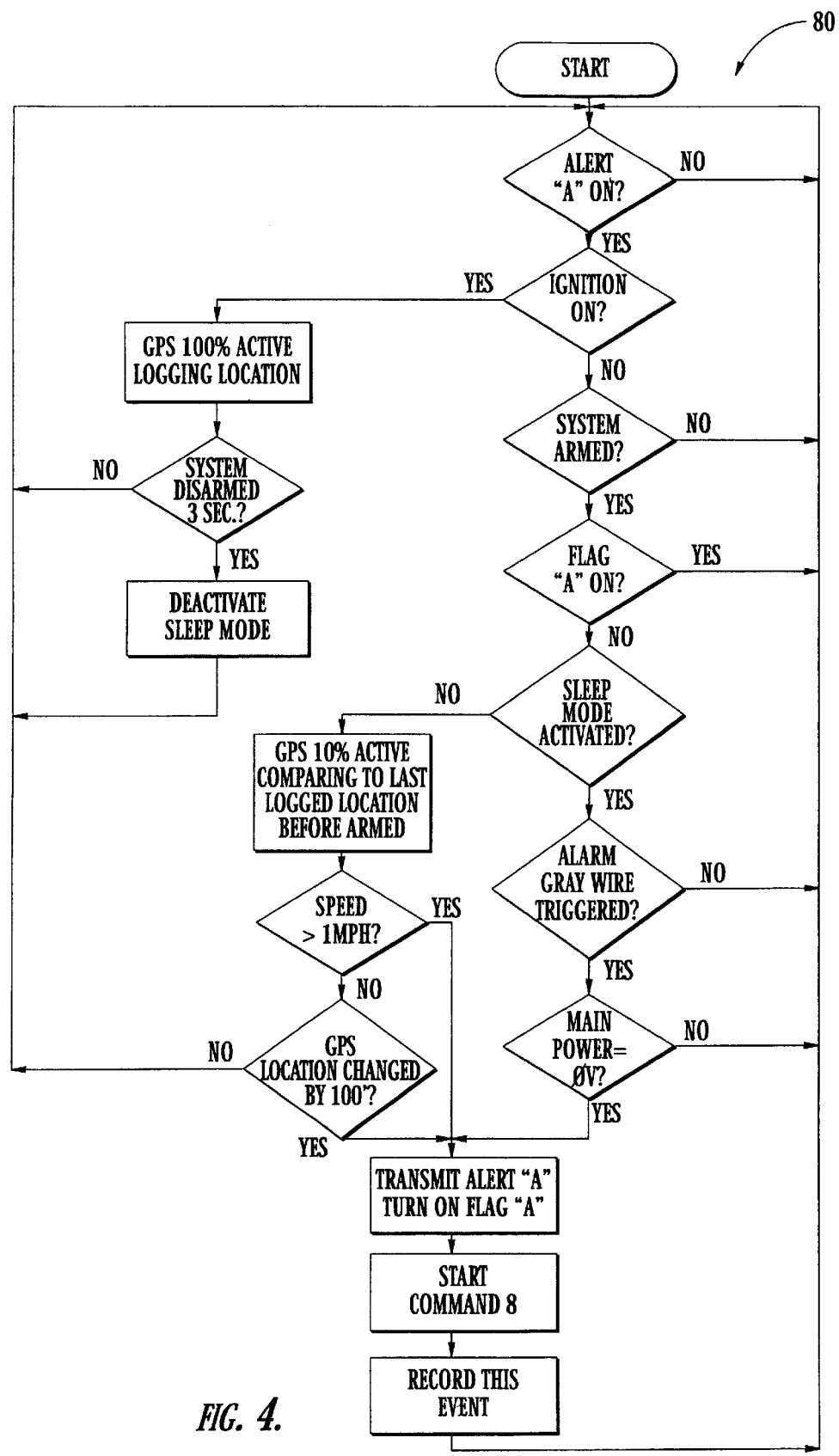
FIG. 4 is a flowchart for operation of the vehicle tracking system as shown in FIG. 1 illustrating a vehicle stolen alert.

Yet another aspect of the invention relates to thwarting a would-be thief who attempts to disable the alarm by cutting the battery cable or power supplied to the system. The unit preferably includes a back-up battery. More particularly, upon being in an armed mode and sensing a breach of security, such as the hood opening, for example, the unit will send out a signal indicating the alarm or security breach and while the alarm is indicated, if the battery is disconnected then the unit will send out a message indicating the vehicle is stolen, and also providing the vehicle's current position. Accordingly, the would-be thief is not able to defeat the security system by quickly disrupting power to the unit during an alarm indication or security breach. Also, to prevent additional alerts, this message is prevented from being transmitted again until the user returns to the vehicle to disarm the system and/or turn on the ignition so that the unit sees a voltage above 13 volts, indicating the vehicle has started using the owner's ignition key. This aspect is further understood with reference to the enclosed flowchart 80 (FIG. 4).

Still another aspect of the invention relates to how the unit can discriminate between ordinary usage or honking of the horn as compared to a security system triggered alarm. Most vehicle security systems will provide a pattern of horn soundings as an alarm indication, and this can be determined and used to reduce false alarm transmissions from the unit. For example, the unit can look at the number of leading and trailing edges of the power pulse used to sound the horn. A single pressing of the horn switch by the user will cause two edges within a predetermined time, such as about 10 to 12 seconds. Accordingly, the unit can be configured to not send a security breach transmission to the control center based upon detecting two transitions. Since a number of vehicle security systems may have a continuous sounding of the horn within the predetermined time, the unit can send the transmission upon detecting only a single transition.

Figure 5A:
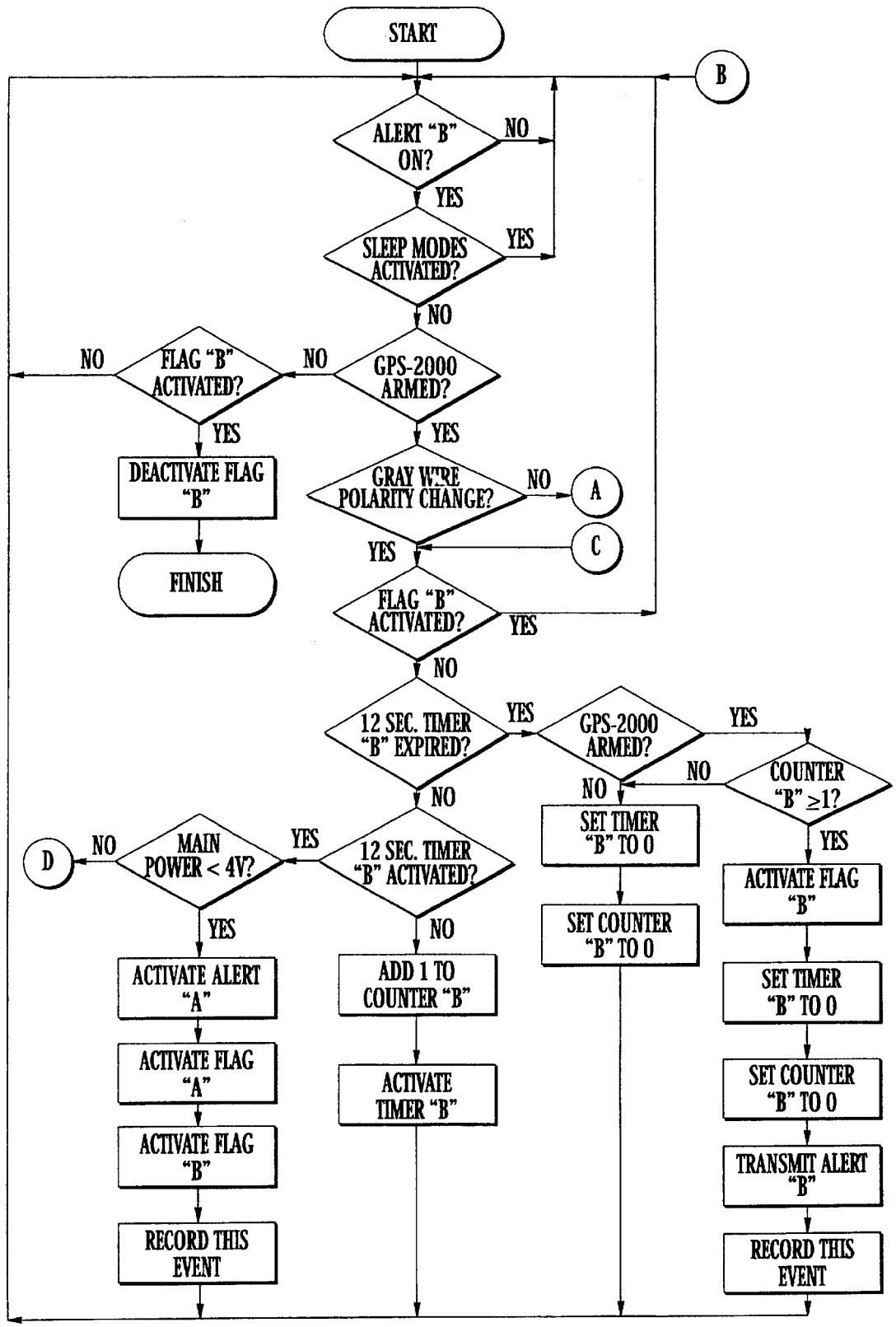
FIGS. 5A–5C are a flowchart for operation of the vehicle tracking system as shown in FIG. 1 illustrating a vehicle alarm sounding alert.
Figure 5B:
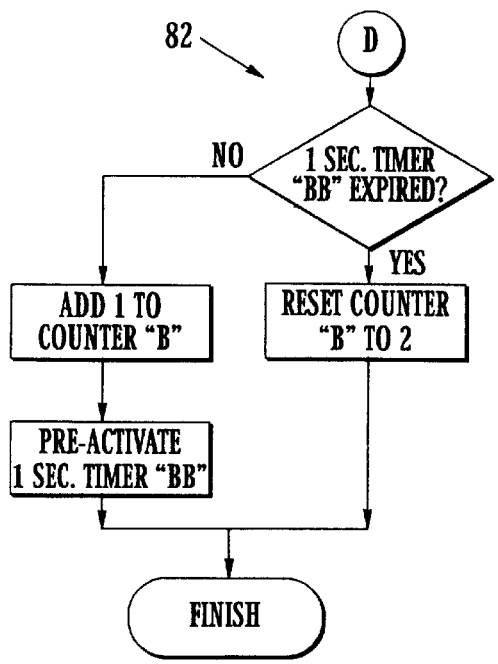
Figure 5C:
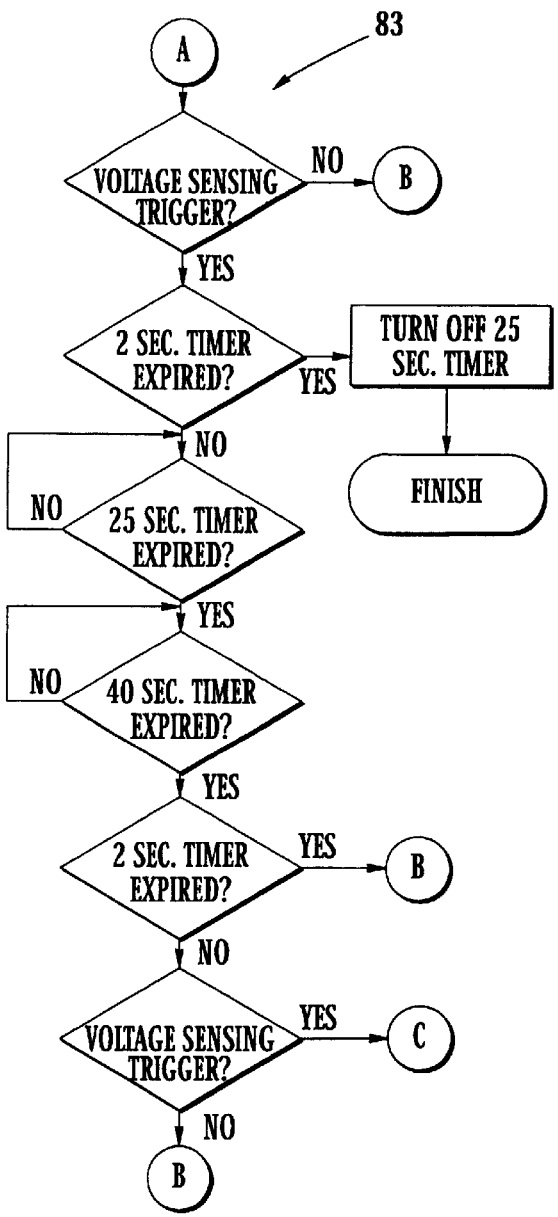

A number of other vehicle security systems provide a series of pulses or horn soundings within the predetermined time. Accordingly, the unit may also be configured to send a security breach transmission upon detecting greater than a predetermined number of transitions, such as greater than nine, for example. This number is also typically higher than a user would generate honking the horn several times within the predetermined time. In other terms, the number of transitions of the horn pulses can be counted, and if equal to one, or greater than nine, for example, the transmission is triggered, and otherwise the sounding of the horn is ignored. Also, to prevent additional alerts, this message is prevented from being transmitted again until the user returns to the vehicle to disarm the system and/or turn on the ignition so that the unit sees a voltage above 13 volts, indicating the vehicle has started using the owner's ignition key. This aspect is further understood with reference to the enclosed flowcharts 81–83 (FIGS. 5A–5C).

Figure 8:
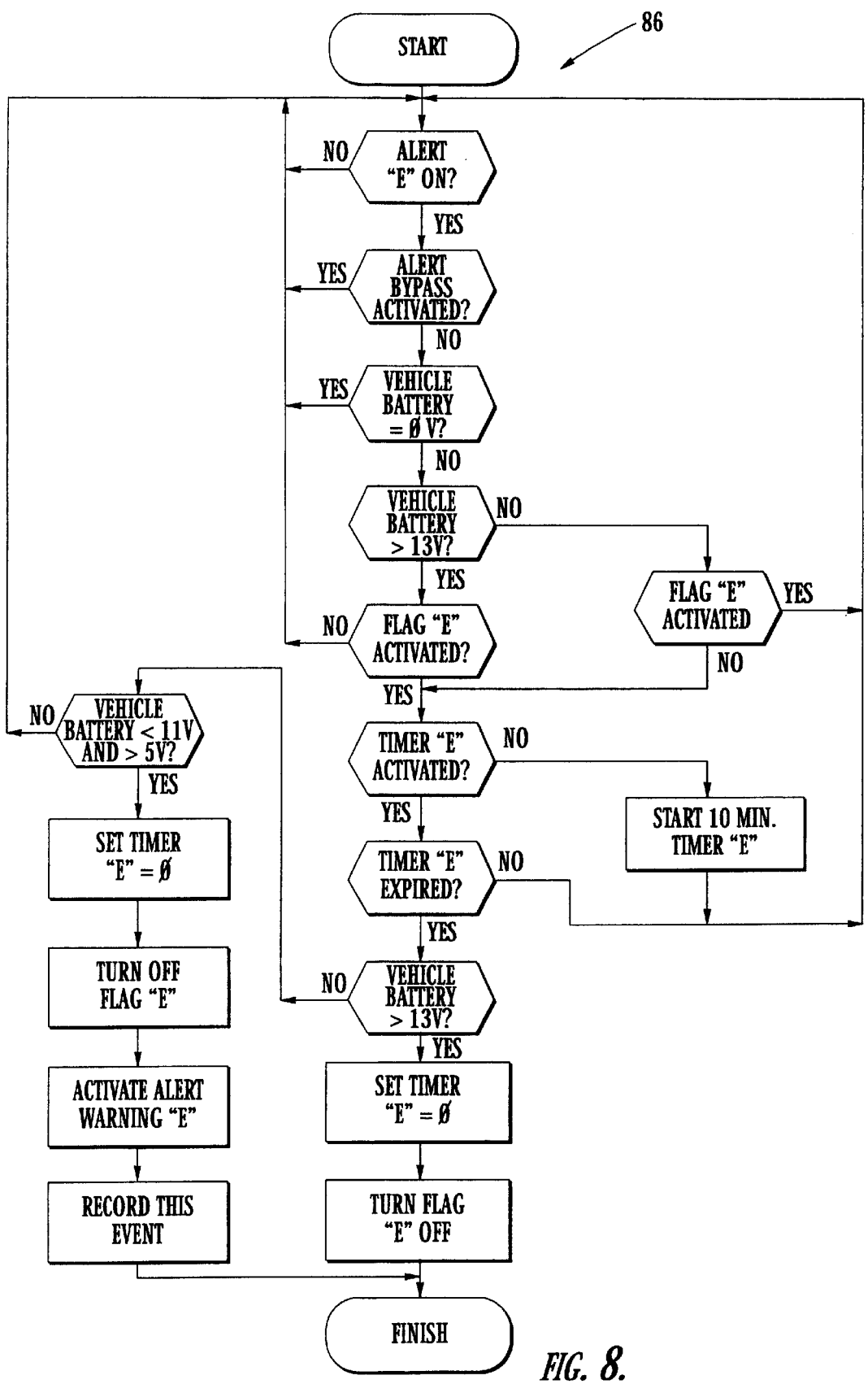
FIG. 8 is a flowchart for operation of the vehicle tracking system as shown in FIG. 1 illustrating a low battery alert.

Yet another feature of the invention relates to a low vehicle battery alert. For example, the unit may monitor the battery voltage over a predetermined time such as ten minutes. The ten minute window prevents false tripping, for example, when the voltage dips during engine cranking. In particular, the voltage can be sensed and it can be determined whether it is greater than zero (e.g. greater than six volts) and less than a high value (e.g. eleven or twelve volts), and, if so, a low battery voltage transmission can be communicated to the monitoring station 30, and ultimately to the vehicle user when away from the vehicle 21. If the vehicle is being serviced and the battery 61 is disconnected, this will cause the battery voltage to be equal to zero. Then, the low battery voltage transmission will not be communicated to the monitoring station 30. Also, to prevent additional alerts, this message is prevented from being transmitted again until the user returns to the vehicle to disarm the system and/or turn on the ignition so that the unit sees a voltage above 13 volts, indicating the vehicle has started using the owner's ignition key. Again, false triggerings are reduced. This aspect is further understood with reference to the enclosed flowchart 86 (FIG. 8).

Yet another advantageous feature of some embodiments of the invention relates to the ability to conserve electrical power. More particularly, when the vehicle is stopped and in the armed mode, the GPS receiver may be periodically operated to determine the vehicle position. If the vehicle position changes, this is indicative that the vehicle is being moved or stolen. For example, the GPS receiver may be operated to generate new vehicle position information every 29 seconds. These relatively quick successive position determinations or readings are generally termed hot start. These are relatively less complicated than a cold start position determination which takes longer, since the cold start position determination requires greater time to acquire and receive data from multiple satellites, as will be appreciated by those skilled in the art.

Unfortunately, this relatively high repeated usage of the GPS receiver may cause unnecessary battery drain, especially when the vehicle is left armed and unattended by the user for an extended period. Accordingly, the power conserving feature of the invention permits the GPS receiver to be turned off when the vehicle is in the armed mode, and the GPS receiver is turned on only when needed. For example, a vehicle sensor, such as a shock sensor, motion sensor, ignition sensor, door sensor, or other sensor, or combinations thereof could be used to start the GPS receiver. This sensor could also be used to trigger an alarm if desired; however it need not be so used in all embodiments. The GPS receiver, once turned on, could operate in the normal periodic fashion as described above, or for a fixed period of time. The GPS receiver could also be turned off again after some predetermined time if no further sensor signal is received, or if the position fails to change on subsequent position readings or determinations.

Yet another feature relates to permitting more colorful audible alert messages to be generated for the user. The user can, in some embodiments, access an internet site to type or enter the text for a message to be sent, such as to alert the user that his vehicle is being stolen. The audible message then communicated by a telephone call to the user is generated by a speech message synthesizer based upon the entered text. In accordance with this aspect of the invention, the user could type in phonetically spelled words or phrases, such as to create more colorful messages including slang terms, various accents, and/or to mimic various dialects, for example. The speech synthesizer would then generate the desired message customized for the user. Of course, the system could also permit the user to test or preview the pronunciation generated by the speech message synthesizer based on the entered text message prior to its adoption.

Another aspect relates to requesting GPS position information from a vehicle. If a command is sent downstream to the vehicle requesting that GPS information in turn be sent upstream from the vehicle, and the GPS information is not received within a predetermined time, such as about four minutes, then another command may be sent to the vehicle requesting the GPS information. This may keep repeating until GPS information is received, for a predetermined number of tries, or until a user instructs stopping of the requests. This helps to ensure and confirm the activation and reception of GPS tracking coordinates from the vehicle.

Yet another aspect relates to reducing a frequency with which GPS information is sent from the vehicle. More particularly, the unit may be configured to activate GPS information transmission upstream every 2 minutes. To reduce system usage expense and power consumption at the vehicle, this rate of transmission of GPS information could be progressively decreased over time. For example, in one embodiment, upon activation the GPS location signals could be sent every 2 minutes during the first hour, then once an hour for the next 23 hours, after which only one signal would be sent per day.

Figure 9:
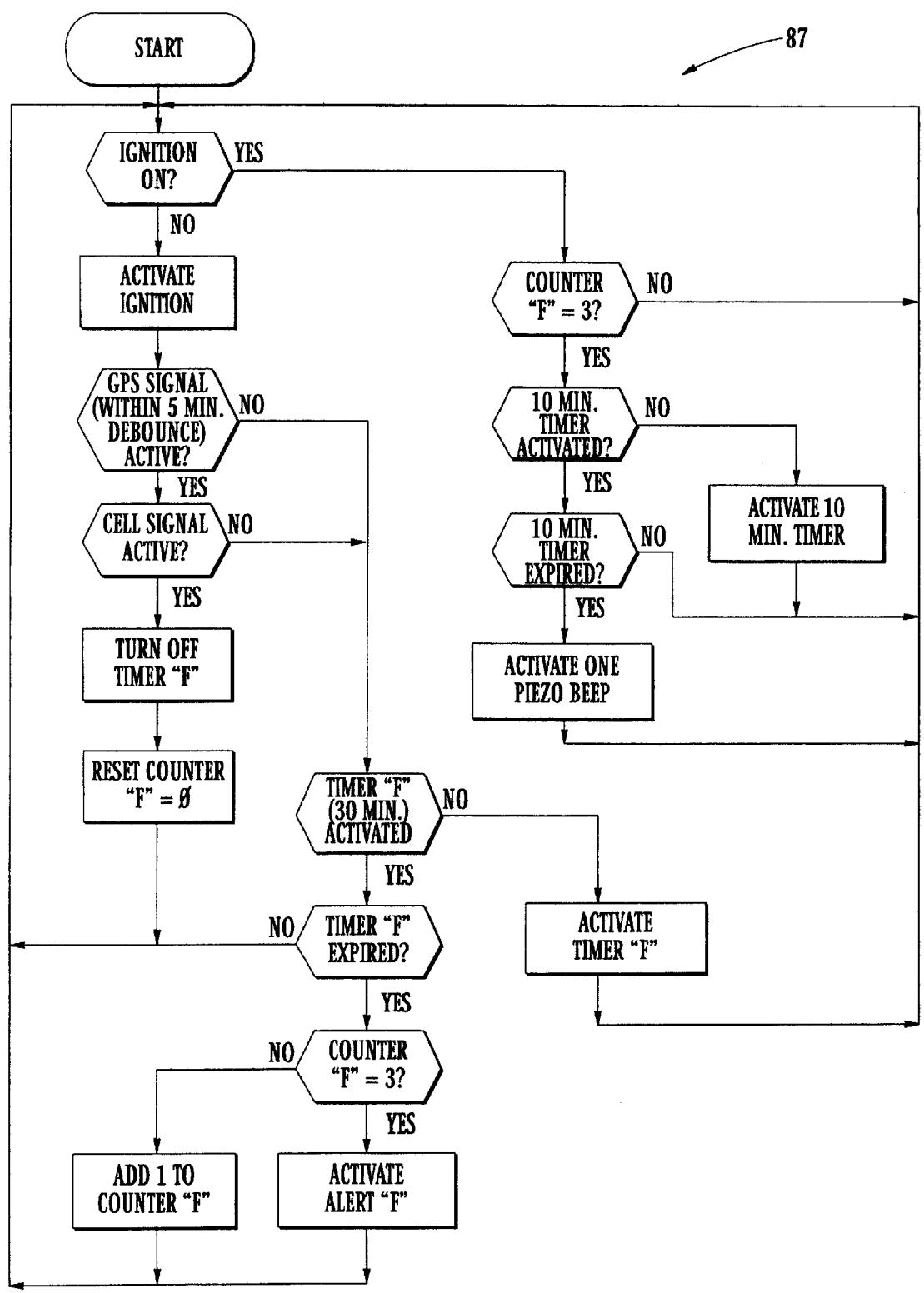
FIG. 9 is a flowchart for operation of the vehicle tracking system as shown in FIG. 1 illustrating a GPS or cellular unit failure alert.

Turning now to the flowchart 87 of FIG. 9, still another aspect relates to warning the user of an inoperable or malfunctioning GPS or cellular telephone section. More particularly, if the GPS or cellular telephone antenna wire is cut or the mounting position of either is changed causing the antenna to stop receiving the signal the user would not ordinarily know of this problem quickly. In accordance with one embodiment, if the ignition is turned on a predetermined number of times, such as about three, and each time ignition turns on if no GPS or no cell signal is received for a minimum time, such as about 15 to 30 minutes or longer, an audible warning beeper may be activated in the vehicle. This beeper may be sounded once every 15 minutes. At anytime if the GPS or cell signal is received properly then the system re-sets automatically stopping the beeper sound.

As an example, if the ignition key is turned on and no GPS or no Cell signal is being received for 15-minutes, and the vehicle ignition stays on for 45 minutes and there is still no GPS or no cell signal, the unit counts one. Thereafter, if the ignition key is turned on and no GPS or no cell signal is being received for 15-minutes, and the vehicle ignition stays on for 60-minutes and there is still no GPS or no cell signal, a second count is determined. Thereafter, if the ignition is turned on and no GPS or no cell signal is received for 10-minutes, and the vehicle ignition stays on for only 10-minutes and there is still no GPS or no cell signal, no count is determined. Thereafter, if the ignition is turned on and no GPS or no cell signal is being received for 15-minutes, a third count is determined and the beeper is activated as described above. This beeping may continue every 15-minutes while the vehicle ignition stays on as long as the vehicle ignition stays on for 16-minutes and still no GPS or no Cell signal is being received. If thereafter, the ignition is turned on and no GPS or no cell signal is being received, the beeper beeps once and again beeps once every 15-minutes while vehicle ignition stays on. If in 10-minutes both GPS or cell signal is being received, the beeper system is turned off and the warning count is reset.

By way of example, if the ignition key is turned on and no GPS or no cell signal is being received for only 5, 10 or 12 minutes (with the threshold set at 15 minutes), then no count is determined.

In certain circumstances, the GPS signal may fail, but the cell signal may still be working. Accordingly, it may be desirable to send an indication of the failure of the GPS signal to the central monitoring station 30 to thereby alert the user as described above. If the cell signal also failed, or if the cell signal failed by itself, in other embodiments a separate paging device would transmit the failure or loss of the cell signal information to the central monitoring station 30, to thereby alert the user.

Yet another feature is directed to efficient use of a relatively small number of codes available to communicate with the tracking unit from the cellular network and central station. More particularly, a typical arrangement may provide eight basic codes and two "wildcard" codes. The two wildcard codes are reserved for future or other uses. A particular tracking device will respond directly to any of the eight basic codes. For example, the doors could be locked or unlocked, a present location downloaded from the vehicle, etc.

In accordance with this feature, the tracking device may respond differently to the same code or command depending upon the state or condition of the tracking device. For example, if an alarm is triggered at the vehicle, it may be desired that the tracking device continue to send the alarm signal until confirmation is received that the central monitoring station 30 has received the alarm signal. This confirmation can be sent using the same code as may provide another function if the device were not indicating an alarm. Any of a number of such tracking device conditions may trigger a different message to be interpreted from the received code. For example, if any of the above Alerts A–E were triggered, the receipt of a predetermined code, such as code eight, would confirm receipt of the alert by the central station, and this receipt of code eight would not cause the other response (no alarm triggered) in the tracking device. Of course this concept can be extended to other features as will be appreciated by those skilled in the art.

In accordance with another feature, the rate of sending the location or position data (or change in position data) from the vehicle may be varied to reduce system usage and thereby reduce expenses. More particularly, in one embodiment, the rate of sending may be based upon how long the vehicle has remained stationary. This time period may be selected by the user. For example, the selected time may be in the range of 15 minutes to six hours. If the vehicle has been stationary for the selected time period, then the rate of transmission may be reduced. This reduces or eliminates the need to send home position data and send all the over 15-minute stops made that day. Otherwise, that is when the vehicle is moving, the device may send data at a faster rate. Of course, a system user would not likely be interested in quick updates, especially where the position information is not changing. Conversely, if the vehicle is being moved, it may be desirable to receive more frequent position updates.

Another variation of this transmission rate conservation feature bases the rate of transmission on the vehicle position. For example, a reduced rate of transmission may be selected if the vehicle is in a predetermined area where the user has a lesser interest in quickly updated position information. The user may also have a reduced interest in an area that can be defined outside of a predetermined distance from a reference point.

Yet another variation of the vehicle position transmission rate conservation feature is based upon the vehicle's speed, such as the vehicle's average or maximum speed, for example. Accordingly, if the vehicle is traveling above a preset speed, the rate of transmission may be increased.

In accordance with another aspect of the invention, the tracking device may send the alert indication a predetermined number of times without receiving an acknowledgment as described above, and then wait until the vehicle position has changed before trying again or the cell re-registers or its RSS (received signal strength) changes. Thus, power is conserved. When the vehicle has moved to a new position, any obstructions may no longer be present thereby increasing the likelihood of a successful communication. In addition, the change in position may be determined when the vehicle is sensed to be moving about a predetermined relatively small speed, such as greater than 1 mph, for example.

In all of the embodiments and variations described herein, the tracking device may communicate with one or more other vehicle devices via a vehicle data communications bus. Further aspects of interfacing with a vehicle data communications bus are described in U.S. Pat. Nos. 5,719,551 and 6,011,460 assigned to the assignee of the present invention.

Yet another aspect relates to efficient use of available codes on the cellular telephone control channel. In one particular example, ten codes may be available to be transmitted from the monitoring station 30 to the vehicle trackers. The first eight or nine codes are command codes that will cause a specific action by the tracking device at the vehicle. The other one or two codes may be wildcard codes as mentioned above, that may set a stand-by mode for one or a group of vehicles, for example.

It may be desirable to provide more than eight commands at the vehicle responsive to the corresponding eight available codes. For example, it may be desirable to set a feature on or off, or to set a different feature setting or threshold. In accordance with this aspect of the invention, the commands at the tracker are determined based upon a series of different command codes being received within a predetermined time window.

For example, the monitoring station 30 may send code 9 that switches the tracker in the car into a stand-by mode for a predetermined time and which causes the tracker to respond with an upstream confirmation code 7 or 9 indicating receiving code 9. During the predetermined time of the stand-by mode another code follows that causes a system programmable feature or setting to change. Note that the second code would otherwise cause a different function at the vehicle. Note that system might operate a function 9 if another code 1–9 is not received in the predetermined time. The following list is exemplary for features resulting from second codes 1–9:

(1) Code 1—Tracker will turn off feature of upstream code caused by vehicle alert being detected.
(2) Code 2—Tracker will turn on feature of upstream code caused by vehicle alert being detected.
(3) Code 3—Tracker deactivates cell receiver from operating due to a non-paying customer for monitoring service. That phone number can then be allocated to another customer.
(4) Code 4—Turn on audio buzzer feature that will sound once each 10 minutes. The monitoring station 30 need only send the command to activate the feature, as the tracker will time the period and drive the buzzer thereafter. The monitoring station 30 will normally not need to send this command because the tracker will be configured out of the box with this feature activated to sound the buzzer every 10 minutes until the next command is received.
(5) Code 5—Turn off the audio buzzer. This is to be sent by the monitoring station 30 after a user has successfully activated his account.
(6) Code 6—Turn on the 80 mph speed limit reporting. This will normally not be sent as this feature will be the default setting of the tracker.
(7) Code 7—Turn off the 80 mph speed limit reporting.
(8) Code 8—Increase speed limit 5 mph and increase the time 5 minutes.
(9) Code 9—Decrease speed limit 5 mph and decrease the time 5 minutes, and wait 5 minutes if another code number follows. It could operate this way to allow another set of codes to change more features.

In this example, in response to the tracker receiving the system code 1–9, the tracker sends an upstream code 7 to acknowledge receipt of the system code 1–9. Upon receipt of code 9 the tracker waits up to 5 minutes to determine if another system code is received. If no code is received, then the tracker performs the code 9 operation. Of course, in other embodiments other features or settings can be selected.

In general, it may be preferred that the first code sent in a series of two codes, for example, be a code that causes only a minor function to be performed at the vehicle. This is so because if the second code is sent from the monitoring station 30, but not received at the tracker, only a minor function is performed. For example, the first code may switch between armed and disarmed modes. This is in contrast to using a remote engine starting code or engine shutdown code as the first code. The vehicle may be moving or positioned in a marginal reception area, and the second command may not be received by the tracker within the predetermined time window. As will be appreciated by those skilled in the art, this concept of multiple digit codes, can be extended beyond two digits to three or more.

To further conserve cellular transmissions and as described above, the tracker may be set to record a position based upon a determined event. Only this recorded position information may be downloaded either by user request or at set times. It is desired that such events be relatively few, but that the information still be helpful to the user.

For example, an event for recording of position may be determined based upon the vehicle being stopped for greater than a first time and less than a second time. For example, the first time may be 15 minutes and the second time may be 6 hours. Determination of the vehicle being stopped can be made based upon one or both of the GPS position or the vehicle ignition being turned off. The second time prevents the recording of position information when the vehicle is stopped at the owner's home during the evening, for example. Accordingly, the important information of the vehicle stops being made is recorded and made available to the user, while system communications resources are conserved.

In another example, if the mode is selected to send the vehicle's location every 10 mm and the vehicle is in the same location for greater than a set time, then no more vehicle locations are sent until the vehicle location has changed to start the every 10 mm reporting again.

Figure 10:
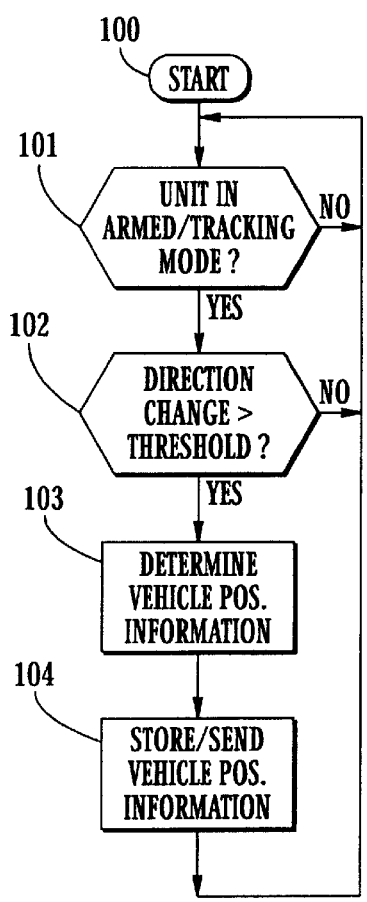
FIG. 10 is a flowchart illustrating operation of the vehicle tracking unit as shown in FIG. 1 for direction deviation tracking.

Turning now additionally to FIG. 10, operation of the vehicle tracking unit 25 for providing direction deviation tracking will now generally be described. More particularly, beginning at Block 100, when the vehicle tracking unit 25 is placed in an armed or tracking mode (Block 101) to provide constant tracking, the vehicle tracking unit may determine and send the vehicle position information at predetermined intervals, for example, as described above. For example, the vehicle tracking unit 25 may be placed in the armed mode when the vehicle 21 is stolen to allow the police and/or a user to maintain current vehicle position information, such as by overlaying the vehicle position information on a map using a mapping program.

Yet, one difficulty which may be encountered with prior art tracking approaches which transmit vehicle position information based solely upon a predetermined schedule is that it may take a relatively long time for direction changes of the vehicle 21 to be determined. That is, if a car thief turned at a stop light shortly after vehicle position information was sent, the change in direction would not be discovered until the next time vehicle position information was sent. If the intervals between sendings of vehicle position information are relatively long, the police may pursue the vehicle 25 in the wrong direction.

Thus, in accordance with the present invention, the controller 40 may cooperate with the vehicle position determining device 42 to determine vehicle position information based upon the vehicle 21 changing a direction of travel by greater than a threshold, at Blocks 102 and 103. This may preferably be done in addition to sending vehicle position information at predetermined intervals, for example, as will be described further below. Of course, in some embodiments the vehicle position information may simply be determined and stored for later retrieval by the user based upon the direction changes, for example, or this may be done in addition to sending the vehicle position information to the monitoring station 30.

The threshold may be advantageously used to distinguish slight deviations in direction (e.g., from small bends in the road) from significant directional changes (e.g., turning at an intersection) which will actually be important to the police and/or user. By way of example, the threshold may be greater than about 45 degrees, although other thresholds may also be used.

Thus, in addition to regularly updating the vehicle position information at predetermined intervals, the police and/or user are also updated when the vehicle 25 changes direction. That is, the controller 40 may also cooperate with the wireless communications device 44 to send the vehicle position information to the monitoring station 30 based upon each occurrence of the vehicle 21 changing the direction of travel by greater than the threshold, at Block 104. It will be appreciated by those of skill in the art that the vehicle position information may include direction or heading information in some embodiments, although in other embodiments basic GPS coordinate information (i.e., latitude and longitude coordinates) could be sent and the heading information determined at the monitoring station 30.

Of course, in some embodiments the controller 40 may advantageously not send the vehicle position information to the monitoring station 30 unless the vehicle 25 changes the direction of travel by greater than the threshold. That is, vehicle position information will not be sent at predetermined intervals, but only when the direction of the vehicle 21 changes.

As a result, wireless communications charges (e.g., cellular phone charges) may be held to a minimum in those applications where continuous vehicle position updates are not required. By way of example, when tracking trucks, busses, etc. traveling on interstates, it may only be necessary to know when and where drivers get off of the interstate. As such, a significant amount of cellular phone charges may be saved by not continuously updating vehicle position information while such vehicles are traveling along a known route, (i.e., an interstate).

Figure 11:
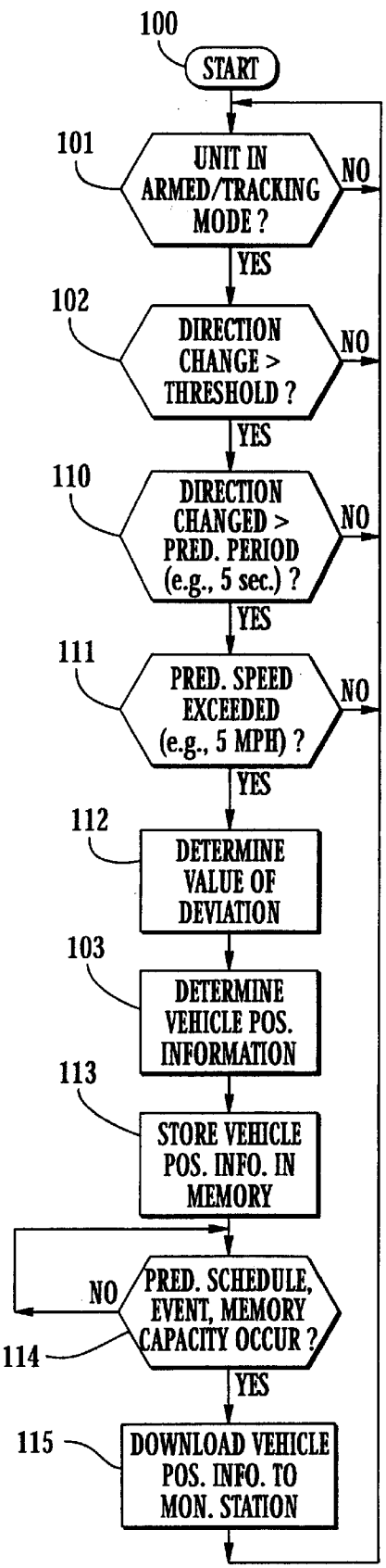
FIG. 11 is a flowchart illustrating the direction deviation tracking operation of FIG. 10 in further detail.

Referring more particularly to FIG. 11, further details of the direction deviation tracking operation according to the invention will now be described. The controller 40 may determine the vehicle position information based not only upon the vehicle 21 changing the direction of travel by greater than the threshold (Block 102), but this determination may also optionally be based upon the vehicle then continuing in the changed direction for greater than a predetermined period, at Block 110. By way of example, the predetermined period may be greater than about five seconds and, more preferably, between about five and seven seconds, although other periods may also be used, as will be appreciated by those of skill in the art.

Similarly, the controller 40 may, in addition to determining the vehicle position information based upon the vehicle 21 changing the direction of travel by greater than the threshold, also optionally base this determination upon the vehicle then continuing in the changed direction at greater than a predetermined speed, at Block 111. Preferably, the predetermined speed may be greater than about five miles per hour (MPH), but other speeds may also be used.

As a result of the steps illustrated at Blocks 110, 111, unwanted downloading of vehicle position information may advantageously be avoided. For example, when a vehicle makes only a temporary change in direction, such as to stop briefly at a gas station or go around something in the road, the above conditions may be used to limit the determination of vehicle position information. Again, this may result in further wireless communications charge savings.

In accordance with another advantageous aspect of the invention, the controller 40 may also determine a value of deviation in direction, at Block 112. For example, this value of deviation may be an angular speed, such as in degrees per second. As such, the controller 40 may advantageously determine the vehicle position information based upon the value of deviation, at Block 103.

Thus, yet another option is provided for determining whether a directional deviation is significant and requires vehicle position information to be determined or not. For example, determining angular speed may help discriminate between the vehicle 21 taking a curved on-ramp to a highway and simply turning slowly into a gas station for a brief stop. Of course, those of skill in the art will appreciate that any one or all of the steps illustrated at Blocks 110–112 may be used, or combinations thereof, to adjust the frequency with which the vehicle position information may be determined and sent for different applications.

As noted above, the controller 40 may include the memory 52 which may store the vehicle position information therein (Block 113). The controller 40 may download the vehicle position information from the memory 52 to the monitoring station 30 based upon at least one of a predetermined schedule, a predetermined event, and the memory reaching a predetermined capacity, as noted above, at Blocks 114 and 115.

Figure 12:
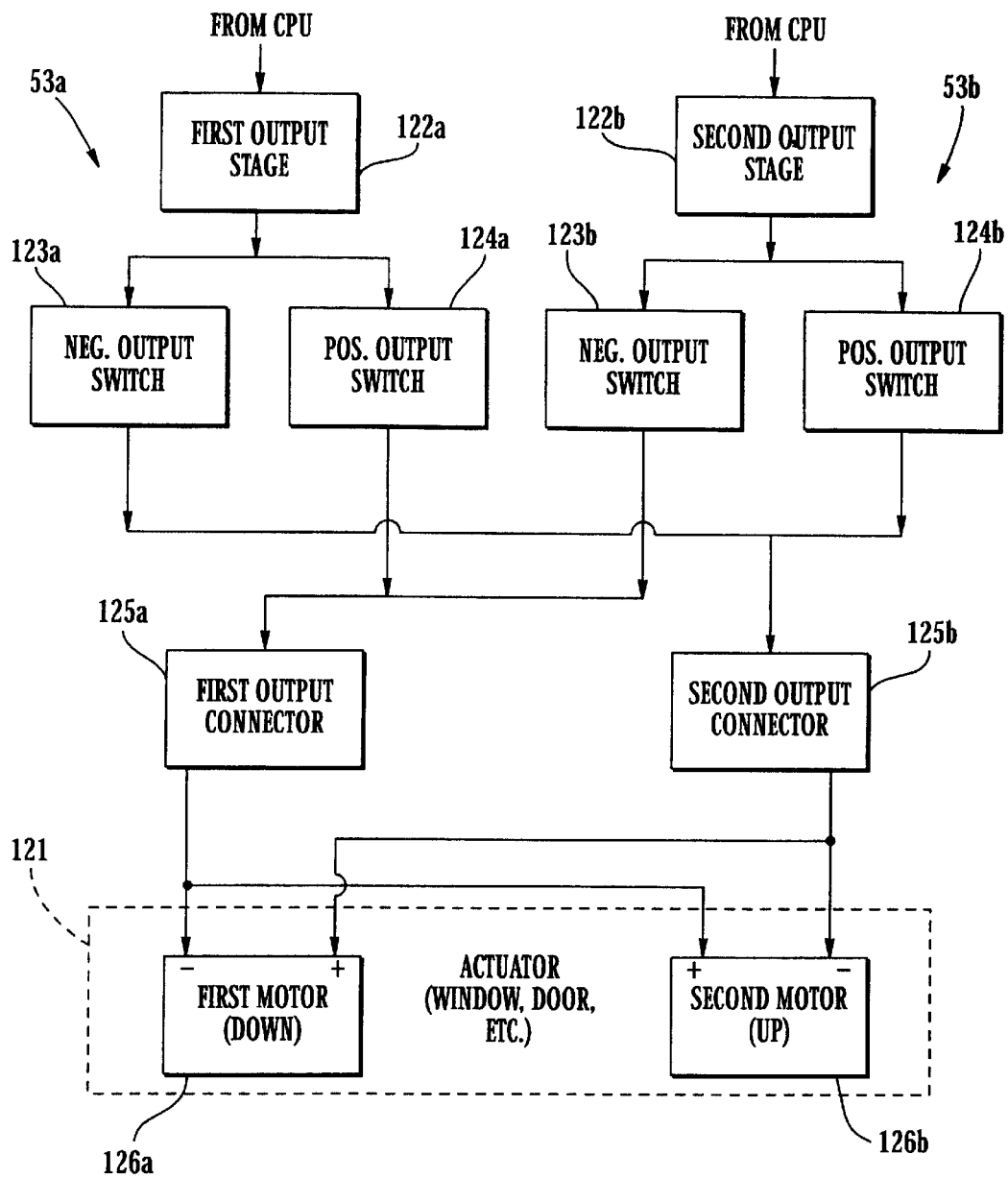
FIG. 12 is a schematic block diagram illustrating a pair of switchable polarity output terminals, as generally illustrated in FIG. 2, connected to a dual-motor vehicle device operable based upon output polarity.

Turning now additionally to FIG. 12, the multiple polarity outputs 53, which were generally illustrated in FIG. 2, will now be described in further detail. More particularly, the controller 40 may include one or more pairs 53*a*, 53*b* of switchable polarity output terminals which may be used for controlling various vehicle devices. By way of example, such vehicle devices may include an actuator 121, such as the door lock actuator 62 or a window actuator, for example, which may be used for performing at least one of door locking and unlocking functions or at least one of a roll up and a roll down function, respectively. In particular, the vehicle device may include one or more pairs of input terminals, each pair being connected to a respective pair of output terminals 53*a*, 53*b*. In certain embodiments the controller 40 may advantageously include a learning mode in which it detects respective operating polarities of the input terminals of the vehicle device, as will be appreciated by those of skill in the art. Accordingly, the controller 40 may switch the pair of output terminals 53*a*, 53*b* based upon the detected operating polarities of the pair of input terminals. This learning mode may therefore save installers valuable time which might otherwise be required to manually match the polarities of the outputs 53*a*, 53*b* with vehicle device inputs.

The controller 30, and more particularly the CPU 50, may switch the pair of switchable polarity output terminals 53*a*, 53*b* based upon a command received by the remote transmitter 60 or by the wireless communications device 44, for example. That is, the CPU 50 provides respective activation signals to a first output stage 122*a* of the output terminal 53*a* and a second output stage 122*b* of the output terminal 53*b*. In particular, the CPU 50 may provide the activation signals substantially simultaneously, with the two activation signals having opposite polarities.

The CPU 50 may preferably activate the pair of output terminals 53*a*, 53*b* for a predetermined period, such as a few seconds to roll a window up or down, for example. On the other hand, the activation signals need only be a few seconds in duration to allow the door lock actuator 62 to perform a door locking/unlocking function. Of course, those of skill in the art will appreciate that any predetermined period may be used in accordance with the present invention.

Upon applying the activation signals to the output stages 122*a*, 122*b*, the activation signals are then passed to respective negative and positive switches 123*a*, 124*a*, and 123*b*, 124*b* of the output terminals 53*a*, 53*b*. Accordingly, only one of the switches 123*a*, 124*a* which corresponds in polarity to the activation signal applied to the output terminal 53*a* will provide an output. The same is also true with the switches 123*b*, 124*b*.

Thus, for example, if positive and negative activation signals are provided to the first and second output stages 122*a*, 122*b*, the positive output switch 124*a* will provide an output on a first output connector 125*a*, and the negative output switch 123*b* will provide an output on a second output connector 125*b*. In the embodiment illustrated in FIG. 12, the window actuator 121 includes a first motor 126*a* for rolling a window down, and a second motor 126*b* for rolling the window up, both of which are activated based upon the polarity of signals provided thereto. Of course, in some embodiments an actuator 121 with a single motor could be used, as will be appreciated by those of skill in the art.

Accordingly, using the above example, the first motor 126*a* would receive a negative polarity signal from the first output connector 125*a* at its negative polarity terminal, and a positive polarity signal from the second output connector 125*b* at its positive polarity terminal. The first motor 126*a* will therefore be actuated, and the window will be rolled down. To the contrary, the second motor 126*b* will receive the negative polarity signal from the first output connector 125*a* at its positive polarity terminal and the positive polarity signal from the second output connector 125*b* at its negative polarity terminal, and it will therefore not be actuated.

Figure 13:
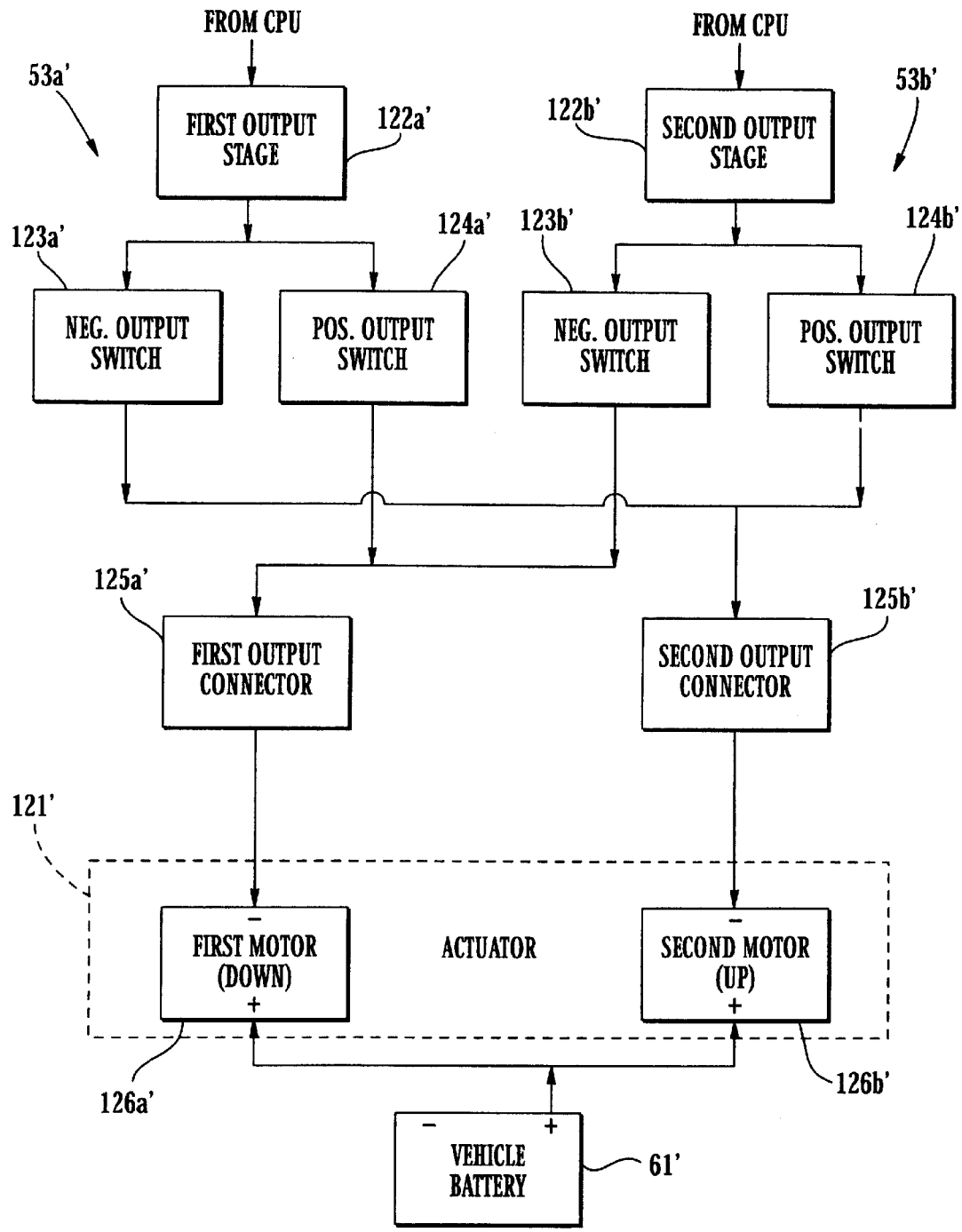
FIGS. 13 and 14 are schematic block diagrams similar to FIG. 12 and both illustrating alternate connection arrangements in which the vehicle device is connected to a vehicle battery.
Figure 14:
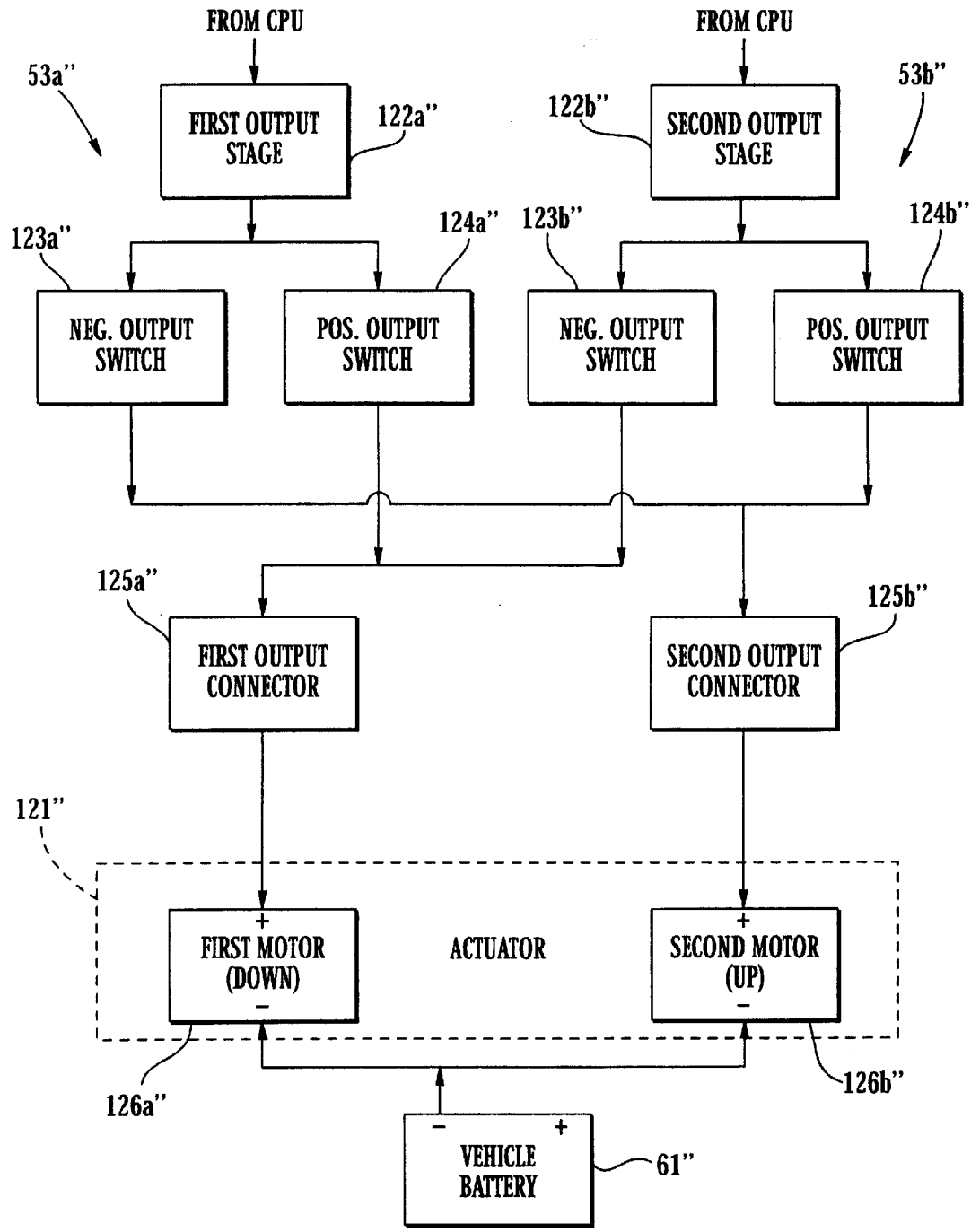

Referring additionally to FIG. 13, an alternate configuration is illustratively shown in which the first and second motors 126*a'*, 126*b'* are connected to the positive terminal of the vehicle battery 61' so that they are both activated by a negative polarity signal. As previously described above, if opposite polarity activation signals are provided by the CPU 50 to the first and second output stages 122*a'*, 122*b'*, then only one of the first and second output connectors 125*a'*, 125*b'* will provide a negative polarity signal at a time. Thus, only one or the other of the first and second motors 126*a'*, 126*b'* will be actuated at a time. The case in which the first and second motors 126*a"* and 126*b"* are connected to the battery 61" to be actuated by positive polarity signals is illustratively shown in FIG. 14.

Figure 15:
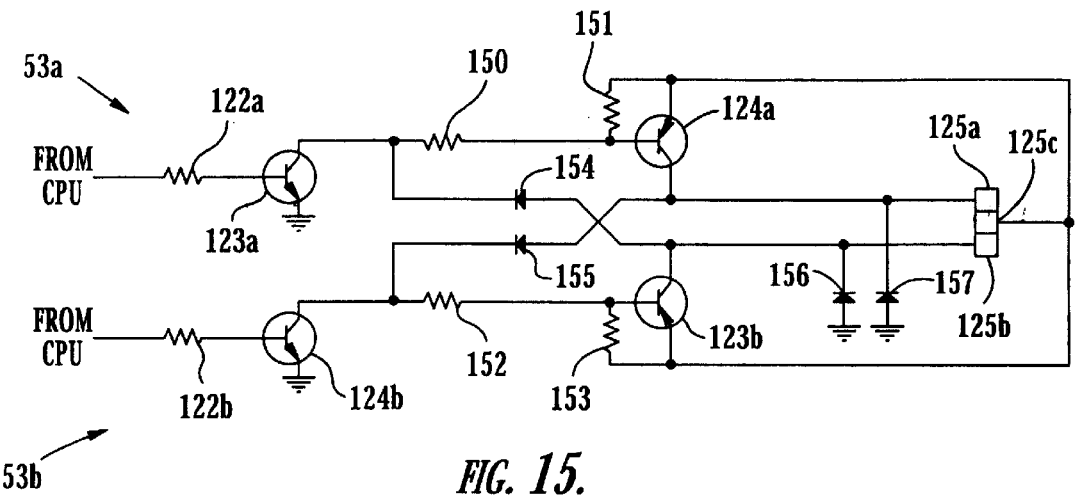
FIG. 15 is a schematic diagram illustrating the pair of switchable polarity output terminals of FIG. 12 in greater detail.

A more detailed schematic diagram illustrating the pair of output terminals 53*a*, 53*b* is shown in the schematic diagram of FIG. 15. The output stages 122*a* and 122*b* may each include a resistor, and the switches 123*a*, 124*a*, 123*b*, and 124*b* may all be transistors (e.g., bi-polar transistors). The output terminals may also include resistors 150–153, and diodes 154–157, as illustratively shown. In the illustrated embodiment, a three-pin connector is used which includes the connectors 125*a*, 125*b*, and an additional connector 125*c* which may be used to provide power, for example, as will be appreciated by those of skill in the art. By way of example, the resistors 122*a*, 122*b*, 150, and 152 may be 4.7 KΩ resistors, and the resistors 151, 153 may be 47 KΩ resistors though other values may also be used.

Accordingly, it will also be appreciated that the vehicle tracking unit 25 of the present invention may advantageously require less output terminal circuitry than in prior art vehicle tracking units, since a separate positive and negative terminal does not have to be provided for each motor, etc. Further, installation of the vehicle tracking unit 25 of the present invention may be simplified since the amount of wires that have to be connected to various vehicle devices is reduced.

Figure 16:
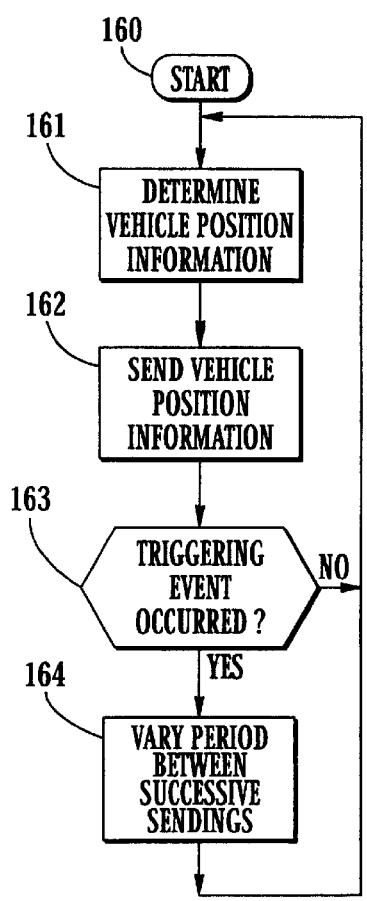
FIGS. 16 and 17 are flowcharts illustrating yet another aspect of the present invention for varying a frequency at which the vehicle tracking unit of FIG. 1 sends vehicle position information to the monitoring station.

Another advantageous aspect of the invention will now be described with reference to the flowchart shown in FIG. 16. Beginning at Block 160, as noted above, the vehicle tracking unit 25 may periodically determine (Block 161) and send (Block 162) vehicle position information to the monitoring station 30. Again, this may be the case when the controller 40 is in the armed or tracking mode and such information has been requested or a predetermined event has occurred, as described above. The controller 40 may detect whether a triggering event has occurred, at Block 163, and, if so, vary a period between successive sendings of vehicle position information based upon the triggering event (Block 164).

By using a triggering event to increase the period between successive sendings of the vehicle position information, wireless (e.g., cellular) communications charges may advantageously be reduced by sending the vehicle position information less frequently. This may also result in significantly less drain on the vehicle battery 61 and/or back-up battery 54. On the other hand, the period between successive sendings may also be decreased based upon a triggering event, which may be particularly beneficial when police are tracking the vehicle 25 after it has been stolen, for example.

Figure 17:
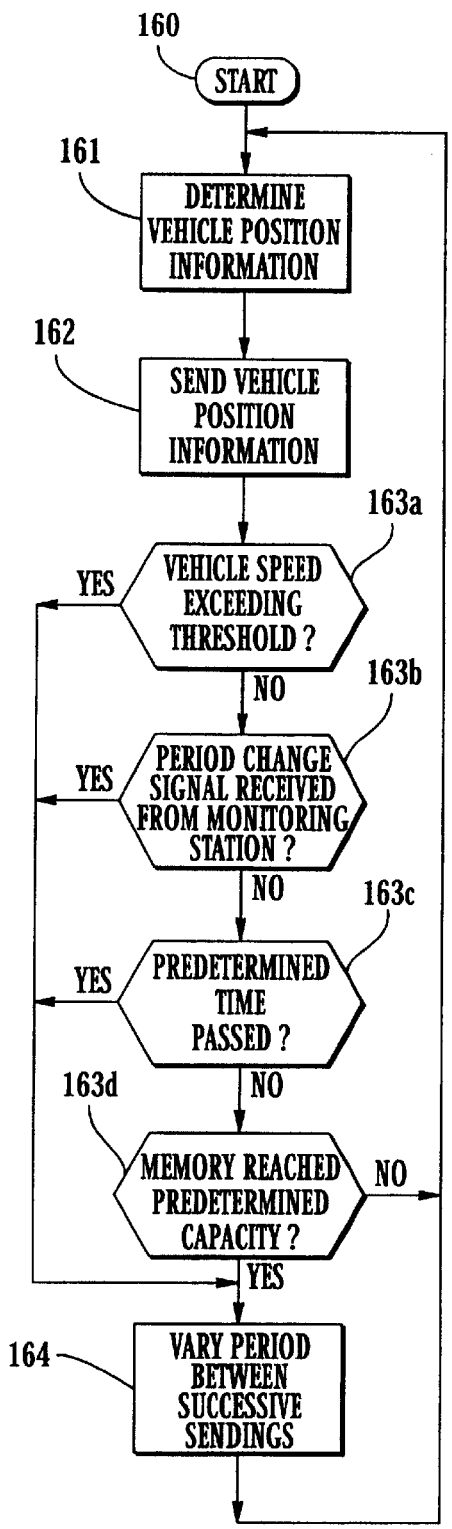

Turning more particularly to FIG. 17, the step of determining the triggering event (Block 163 in FIG. 16) will now be described in further detail. By way of example, the triggering event may include a vehicle speed exceeding a threshold (Block 163*a*), receiving a period change signal from the monitoring station 30 (Block 163*b*), the passing of time (Block 163*c*), and/or the memory 52 reaching a predetermined capacity (Block 163*d*).

With respect to the passage of time, a message may be sent from the monitoring station 30 to the vehicle tracking unit to prompt the sending of vehicle position information, as previously described above. By way of example, the initial period between sendings of vehicle position information may be about two minutes. After an hour, the period between sendings may be decreased to every fifteen minutes, and after six hours the period decreased to every hour. Further, after twenty four hours have passed, the controller 40 may then increase the period between sendings to once a day. Of course, the above periods and triggering events are merely exemplary, and others may be used as well, as will be appreciated by those skilled in the art.

It should be noted here that in some embodiments the visual indicator(s) 43 may advantageously cooperate with the vehicle position determining device 42 (e.g., a GPS device) for indicating a number of GPS satellites currently accessible. Similarly, the visual indicator(s) 45 may cooperate with the wireless (e.g., cellular) telephone communications device 44 for indicating communications with a cellular base station, for example.

Figure 18A:
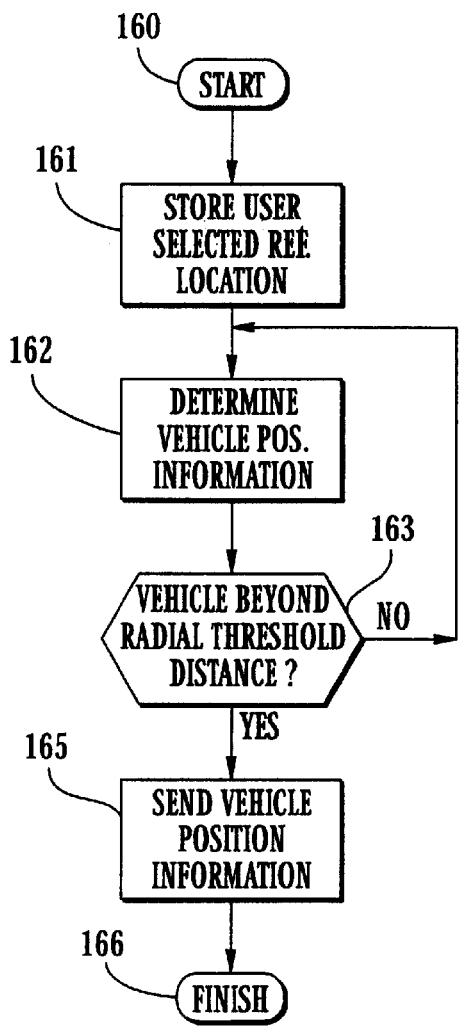
FIGS. 18A and 18B are flowcharts illustrating yet another aspect of the invention for using the vehicle tracking unit as shown in FIG. 1 to determine and send vehicle position information based upon the vehicle moving outside a radial threshold distance from a user selected reference location.
Figure 18B:
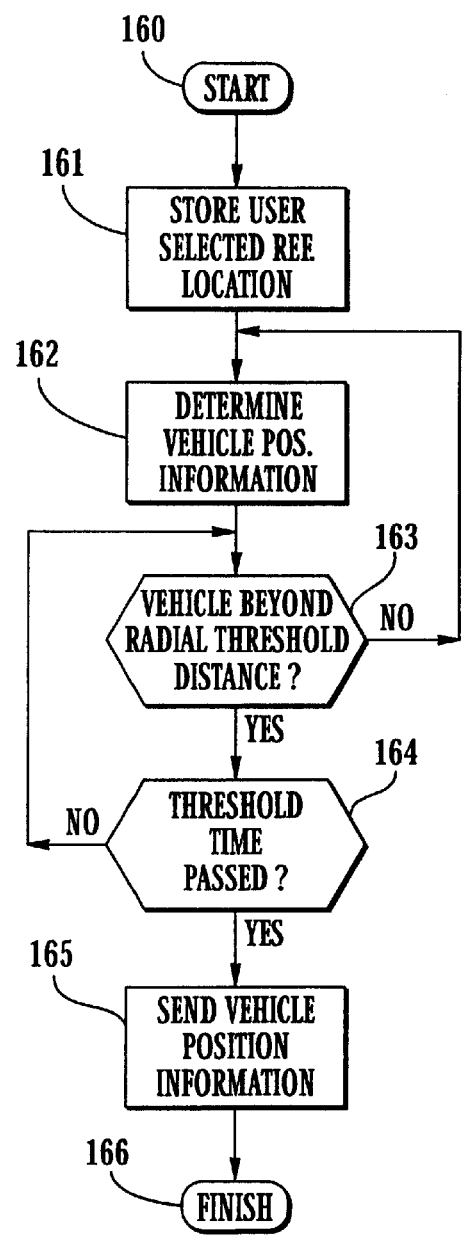
Figure 19:
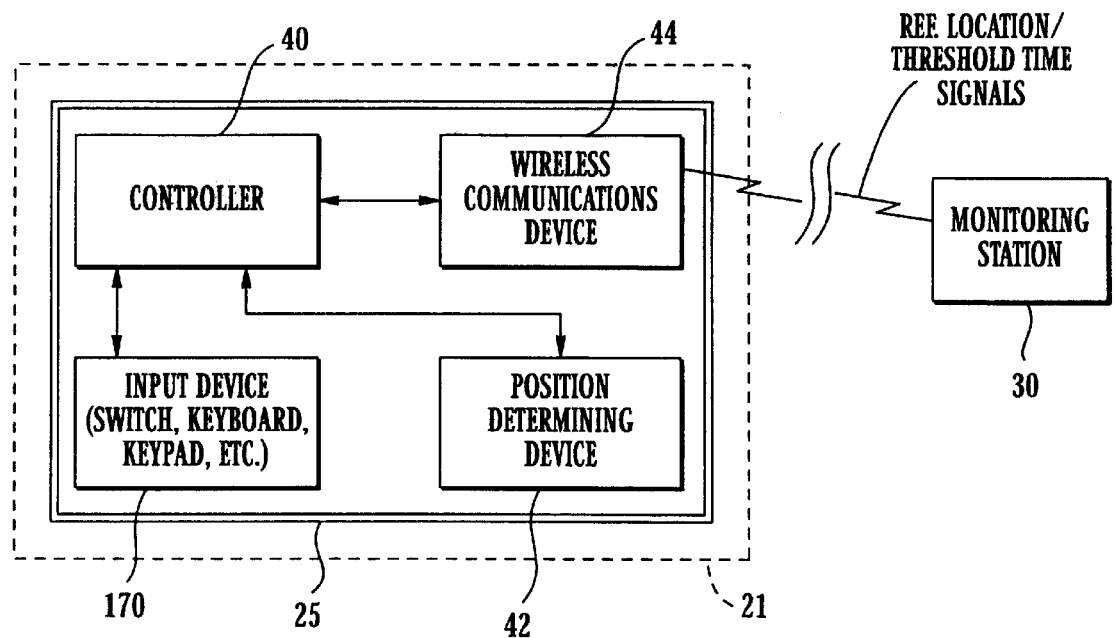
FIG. 19 is a schematic block diagram illustrating the vehicle tracking unit of FIG. 1 including a user input device for setting the user selected reference location and/or a threshold time.
Figure 20:
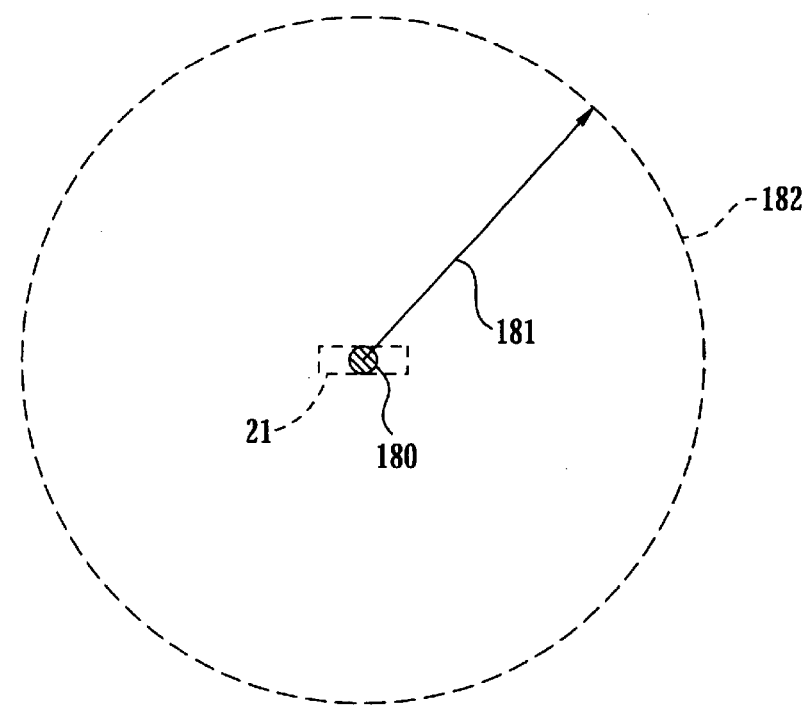
FIG. 20 is a schematic diagram illustrating the user selected radial threshold and a radial threshold distance therefrom.

Turning now additionally to FIGS. 18–20, another aspect of the present invention for using the vehicle tracking unit 25 to notify a user when the vehicle 21 has been removed from a predetermined area (i.e., a G.O. fence) will now be described. Beginning at Block 160, the controller 40 may store a user selected reference location 180, at Block 161, and determine vehicle position information (Block 162) as previously described above. For example, the user selected reference location 180 may be stored in the memory 52 (FIG. 2).

The user selected reference location 180 may advantageously be set in several ways according to the present invention. For example, the vehicle tracking unit 25 may include one or more input devices 170 to be positioned within the vehicle 21 for setting the user selected reference location 180. By way of example, the input device 170 may be a switch, a keyboard, a keypad, or other suitable input device known to those skilled in the art.

If a keyboard or keypad is used, for example, the user could enter desired coordinates (e.g., in latitude and longitude) of the user selected reference location 180. The input device 170 may also cooperate with the vehicle position determining device 42 and the controller 40 to set a current vehicle position as the user selected reference location. Accordingly, a user may advantageously set the user selected reference location 180 to correspond to any desired position of the vehicle 21 simply by driving the vehicle to that position and using the input device 170.

This may be particularly advantageous when the user allows someone to use the vehicle 21 within a limited area (e.g., as with valet parking), but wants to be notified if the vehicle 21 is removed from this area. In such situations, the user will not want to be notified of any movement of the vehicle, as these may occur frequently if the vehicle 21 is moved around, such as in a valet parking lot. Thus, the user may use the input device 170 to set the user selectable reference location 180 at the position where possession of the vehicle 21 is transferred, e.g., at the valet parking drop-off location. The user may then advantageously only be notified if the vehicle moves beyond a radial threshold distance 181 from the user selectable reference location, if desired, as will be described further below.

The controller 40 may also set the user selected reference location 180 based upon one or more signals provided by the monitoring station 30. For example, the controller 40 may also cooperate with the vehicle position determining device 42 to set a current vehicle position as the user selected reference location 180 based upon the signal(s) provided by the monitoring station 30. In addition, the at least one signal may simply include the user selected reference location 180.

As illustratively shown at Block 163, based upon the vehicle position information determined as noted above with reference to Block 162, the controller 40 determines whether the vehicle 21 has moved beyond a radial threshold distance 181 from the user selected reference location 180. If this is the case, the controller 40 may then cause the vehicle position information to be sent to indicate to the user that the vehicle 21 has moved beyond the radial threshold distance 181.

In some embodiments, the vehicle position information may be sent a threshold time after (Block 164) the vehicle 21 moves beyond the radial threshold distance 181 from the user selected reference location 180 if the vehicle has not moved back within the radial threshold distance. By so doing, a bounded area 182 defined by the user selected reference location 180 and the radial threshold distance 181 may be made smaller than with prior art approaches while still reducing unwanted false alarms. This feature may be particularly useful in the case of car dealerships, where vehicles may occasionally be driven beyond the radial threshold distance 181 for test drives, but will return to the dealership (i.e., within the bounded area 182) within a short time.

In accordance with the invention, the input device 170 may also permit user setting of the threshold time, or this may be done by the monitoring station 30. The radial threshold distance 181 may also be set via the input device 170 and/or the monitoring station 30. By way of example, the radial threshold distance 181 may be less than about five miles, and the threshold time may be less than about thirty minutes, although other values may also be used in accordance with the present invention.

Figure 21:
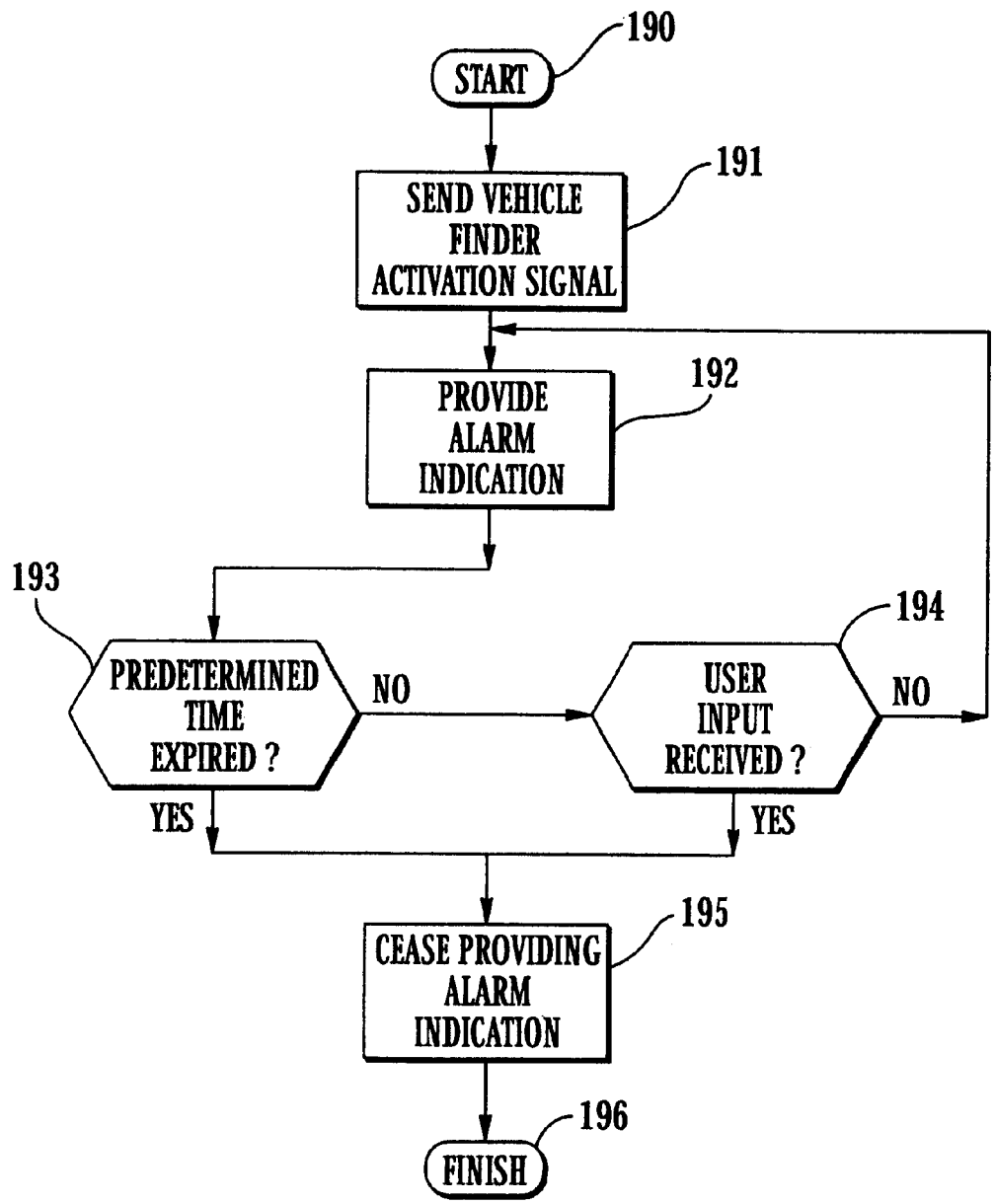
FIG. 21 is a flowchart illustrating another aspect of the invention for using the vehicle tracking unit of FIG. 1 to provide an alarm indication for locating a vehicle and cease providing the alarm indication based upon a user input.

Another particularly useful aspect of the present invention will now be described with reference to FIG. 21. As noted above, the vehicle 21 may include the vehicle alarm indicator 67, which may include one or more of a vehicle horn, a vehicle siren, a vehicle parking light, a vehicle headlight, a vehicle turning direction indicator, a vehicle hazard light, and a strobe light, for example. In accordance with this aspect of the invention, beginning at Block 190, if a user is unable to find the vehicle 21, such as when the vehicle is parked in a crowded parking lot, the user (or monitoring station 30) may send a vehicle finder activation signal to the vehicle tracking unit 25, as previously described above.

Similar to some prior art vehicle tracking systems, the controller 40 may then cause the vehicle alarm indicator 67 to provide an alarm indication lasting for a predetermined time (e.g., about 60 seconds or less), at Block 193, based upon the wireless communications device 44 receiving the vehicle finder activation signal. As such, the vehicle tracking unit 25 may therefore be used to provide an alarm indication when the vehicle security controller 28 is otherwise out of range for the uniquely coded remote transmitter 60.

Yet, one problem which may arise with prior art tracking systems is that once the user locates the vehicle 21, there may still be a significant amount of time left before alert indication ceases. This may be particularly true where the predetermined time is set to be relatively large. Thus, if a user finds the vehicle 21 quickly, she may have to listen to the horn sounding for a relatively long period, or start driving away with a strobe light flashing, for example.

In accordance with the present invention, the controller 40 may also determine not only whether the predetermined time has expired before ceasing providing the alarm indication, but it may also determine whether a user input has been received, at Block 194. Thus, the controller 40 may advantageously cause the vehicle alarm indicator 67 to cease providing the alarm indication, at Block 195, prior to expiration of the predetermined time based upon the user input.

As noted above, the controller 40 may be switchable between armed and disarmed modes, and the user input may include switching the controller from the armed mode to the disarmed mode. By way of example, this may be done based upon the ignition switch 65, the remote transmitter 60, a signal received from the monitoring station 30, and/or the security controller 28. Alternately, the controller 40 may switch the alarm indication off based upon the ignition switch 65, etc., irrespective of the current operating mode of the controller.

Figure 22:
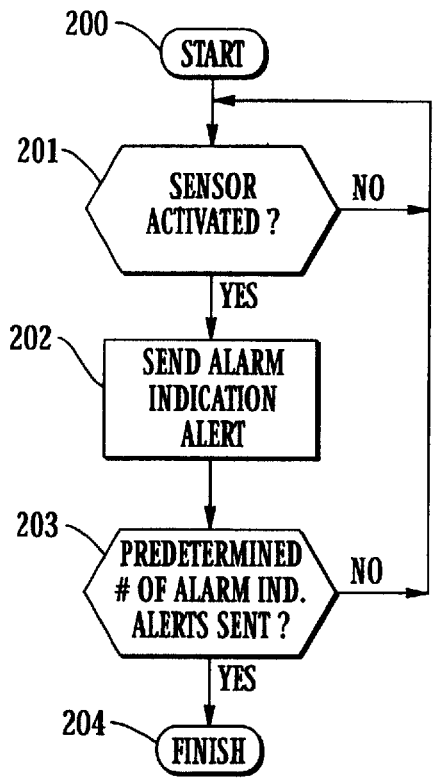
FIGS. 22 and 23 are flowcharts illustrating yet another aspect of the invention for sending alarm indication alerts based upon vehicle sensor activation.

As discussed above with reference to FIG. 5A, the controller 40 may cooperate with the wireless communications device 44 to send an alarm indication alert to the monitoring station 30 based upon at least one vehicle sensor. More particularly, referring now to FIG. 22, beginning at Block 200 the controller 40 may determine if the vehicle sensor has been activated, for example, at Block 201. By way of example, the sensor may include at least one of the alarm indicator 67 (i.e., vehicle horn, vehicle siren, etc.), a vehicle parking light, a vehicle headlight, a vehicle turning direction indicator, a vehicle hazard light, a vehicle door switch, and a vehicle dome light. Of course, other sensors may also be used as will be appreciated by those of skill in the art.

Once the alarm indication alert has been sent, at Block 202, the controller 203 may then determine whether a predetermined number of alarm indication alerts have already been sent, at Block 203. If so, the controller 40 may stop the sending of further alarm indication alerts, at Block 204. By so doing, if the vehicle sensor has been falsely activated (e.g., the alarm indicator 67 is repeatedly activated by thunder), the user need not receive numerous alarm indication alerts and may save the wireless communications charges associated therewith. By way of example, the predetermined number of alarm indication alerts may be in a range of one to five, although other numbers may also be used.

Figure 23:
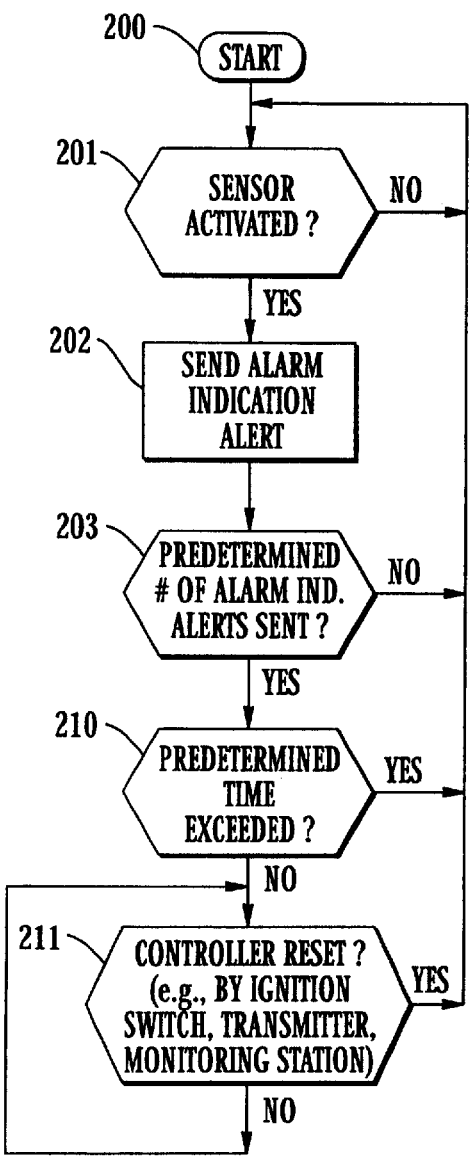

Another flowchart illustrating yet further details in accordance with this aspect of the present invention is shown in FIG. 23. In addition to the above described steps, after determining that the predetermined number of alarm indication alerts have been sent, the controller 40 may then determine whether the predetermined number thereof occurred within a predetermined time, at Block 210. If so, the controller 40 may stop sending further alarm indications until the controller is reset, at Block 211.

More particularly, the controller 40 may be switchable between armed and disarmed modes, as discussed above, and the controller 40 may be reset upon being switched between armed and disarmed modes. By way of example, the controller 40 may be switchable between armed and disarmed modes based upon the ignition switch 65, based upon the vehicle sensor being controlled by the remote transmitter 60, and/or based upon a signal from the monitoring station 30. Of course, other suitable ways of switching the controller 40 between armed and disarmed modes may also be used, as will be appreciated by those of skill in the art.

Figure 24:
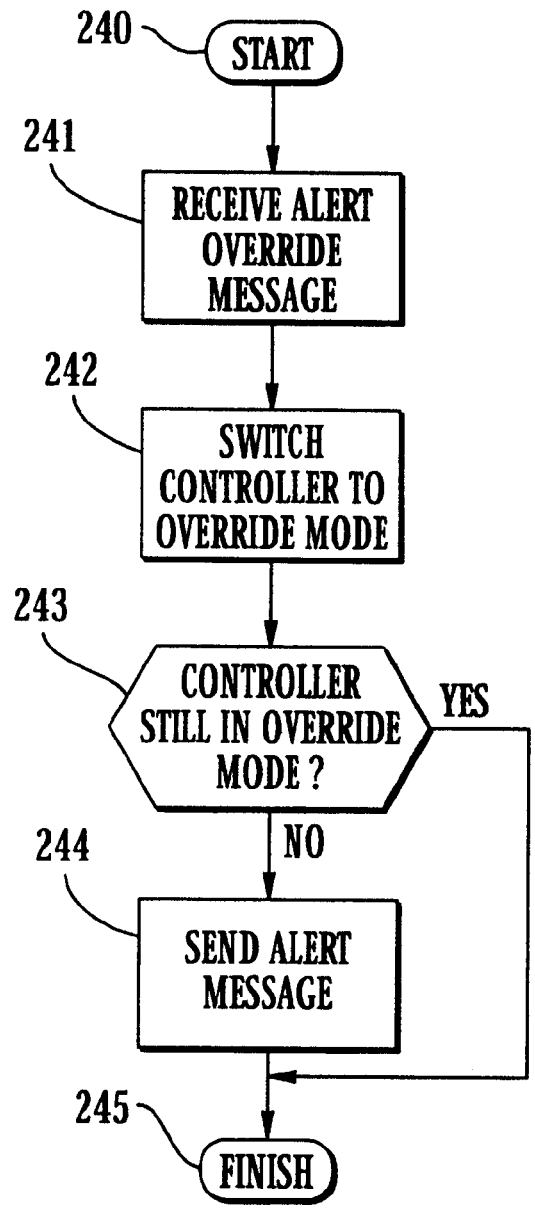
FIGS. 24 and 25 are flowcharts illustrating a further aspect of the invention for selectively sending alert messages to a user.
Figure 25:
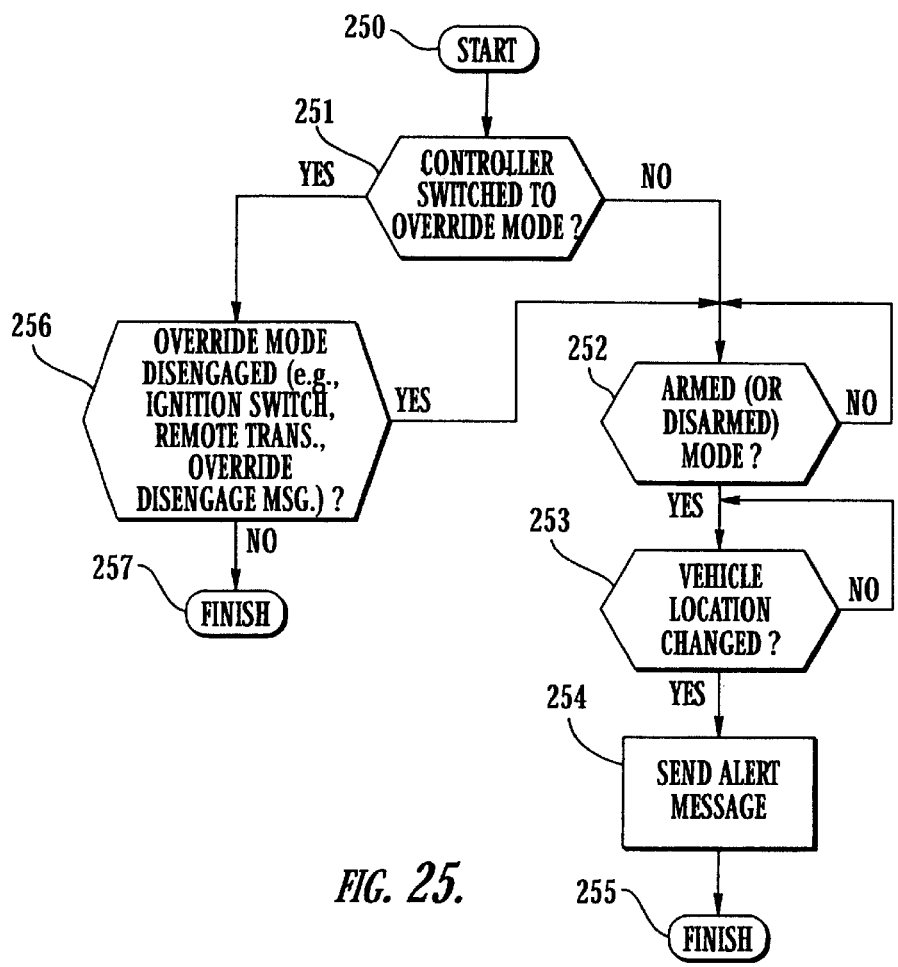

Referring now to FIGS. 24 and 25, according to another related aspect of the present invention, beginning at Block 240 the controller 40 may cooperate with the vehicle position determining device 42 and the wireless communications device 44 to send an alert message to the monitoring station 30 based upon at least one vehicle sensor, at Blocks 244, as discussed previously above. More particularly, the at least one vehicle sensor may include the ignition switch 65, the uniquely coded remote transmitter 60, or other suitable vehicle sensors noted above, for example, which may be used for switching the controller 40 between armed and disarmed modes.

Thus, during normal operation, the controller 40 may cause the alert message to be sent when the vehicle tracking unit 25 (i.e., the controller 40) is in the active mode (e.g., the ignition switch 65 is in the off position) and a triggering event occurs (e.g., the vehicle 21 is moved), at Blocks 252–254. The normal operation is illustratively shown as concluding at Block 255 for clarity of illustration, but those of skill in the art will appreciate that additional alert messages may be sent in some embodiments. It should also be noted that in some embodiments the alert message may also be sent when the controller 40 is in the disarmed mode (as opposed to the armed mode).

By way of example, if the vehicle 21 was broken down on the side of the road and the user had to leave the vehicle until a tow truck arrived, the user could accordingly place the controller 40 in the armed mode so he will be alerted if the vehicle is moved. Yet, the user would not want to receive alert messages resulting from the tow truck moving the vehicle 21, which may not only be an inconvenience but may also result in significant wireless (e.g., cellular) communications charges for the user.

In accordance with this aspect of the invention, the vehicle tracking unit 25 (i.e., controller 40) may also be switchable to an override mode, at Block 242, to prevent sending of the alert message, as illustratively shown by the conclusion step at Block 245, based upon receiving an alert override message from the monitoring station 30. This switching may be performed irrespective of whether the controller 40 is in the armed mode or the disarmed mode. Using the above example, the user may therefore cause the controller 40 to be switched to the override mode once the tow truck has picked up the vehicle 21 so that he will no longer receive the alert indication.

Of course, the override mode may be disengaged, at Block 256, once the user wants to start receiving alert messages again. By way of example, the controller 40 may disengage the override mode based upon the vehicle ignition switch 65 being switched between on and off positions, and more particularly from the off to the on position (i.e., the next time the user starts the vehicle 21). Additionally, an override disengage message may also be sent from the monitoring station 30 to the vehicle tracking unit 25, and the controller 40 may cooperate with the wireless communications device 44 to receive the override disengage message and disengage the override mode based thereon.

Also, the controller 40 may disengage the override mode based upon an operable vehicle device being controlled by the remote transmitter 60, as discussed previously above. Again, the operable vehicle device may include at least one of a vehicle alarm device (e.g., the security controller 28), a keyless entry device and/or the door lock actuator 62, the engine starter interrupt device 66, and the remote starter device 63, for example. If the override mode is not disengaged, no further alert messages may be sent (Block 257), but if it is then normal operation may resume as described above.

As previously noted, the monitoring station 30 may include a user interface for accepting at least one command from a user and sending at least one alert to the user, such as the Internet interface 34 and/or the telephone network interface 33, for example (FIG. 3). Of course, in some embodiments the monitoring station 30 may also be a user's computer, telephone, personal data assistant (PDA), or other suitable device which may send/receive signals directly to/from the vehicle tracking unit 25 via a wireless communications network, for example.

Figure 26:
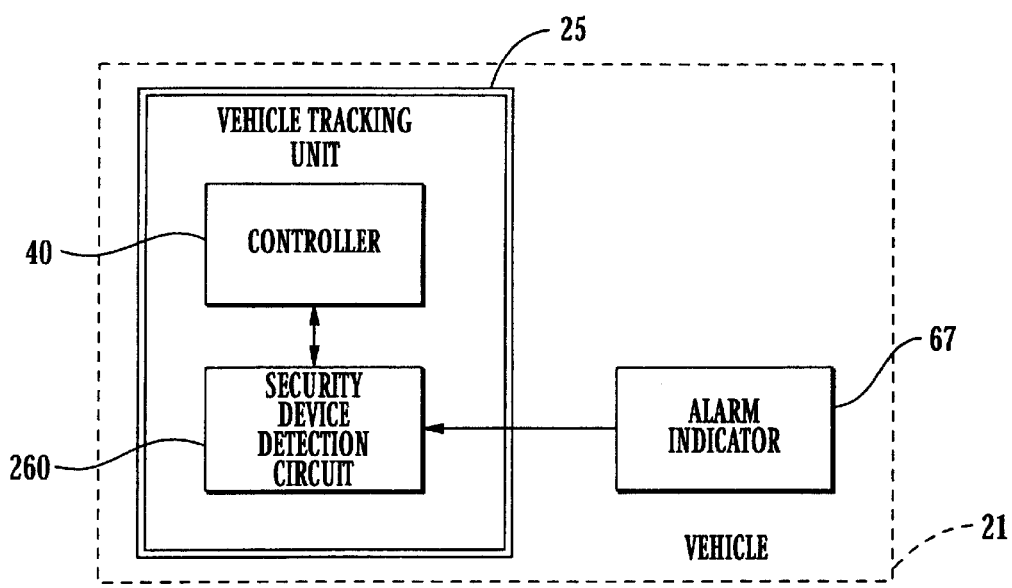
FIG. 26 is a schematic block diagram of the vehicle tracking circuit of FIG. 1 further including a security device detection circuit.
Figure 27:
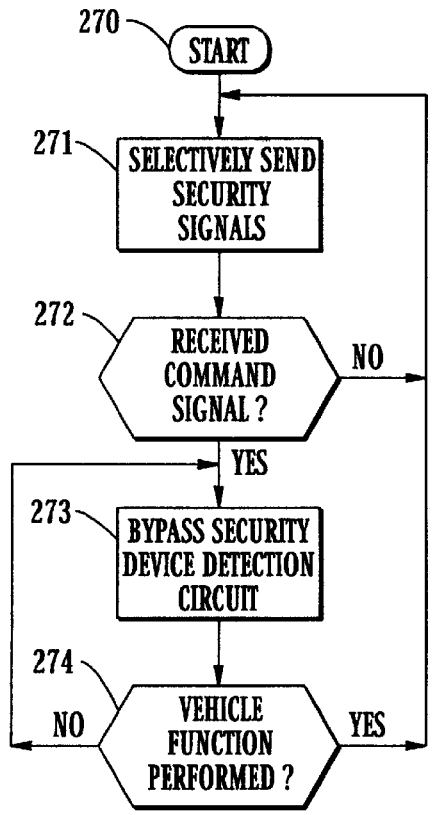
FIGS. 27 and 28 are flowcharts illustrating another aspect of the invention for bypassing sending security signals while performing certain vehicle functions.
Figure 28:
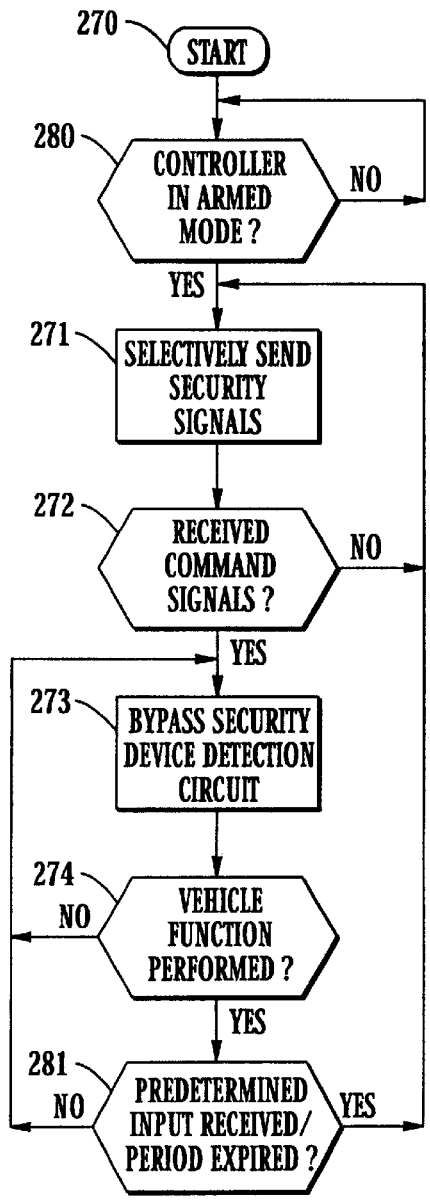

Referring now to FIGS. 26–28, in accordance with yet another aspect of the present invention the vehicle tracking unit 25 may further include a security device detection circuit 260 for at least one vehicle security device, such as the alarm indicator 67, for example. As illustrative shown, the security device detection circuit 260 may be connected to the controller 40, and the controller may cooperate with the wireless communications device 44 and the security device detection circuit for sending security signals to the monitoring station 30 based upon the security device detection circuit, at Block 271.

By way of example, the controller 40 may cause the security signals to be sent to the monitoring station 30 based upon the security device detection circuit 260 detecting that the alarm indicator 67 has been activated. It should be noted that although the security device detection circuit 260 is illustratively shown as being separate from the controller 40 in FIG. 26, this circuitry may well be included within the controller in some embodiments, or even implemented in software to be run on the CPU 50, for example, as will be appreciated by those of skill in the art.

As previously noted above, the vehicle tracking unit 25 in accordance with the present invention may advantageously receive one or more command signals (Block 272) (e.g., from the remote transmitter 60 and/or the monitoring station 30) and perform corresponding vehicle functions based thereon. For example, the command signals may include car find command signals for causing the vehicle security controller 28 to activate the alarm indicator 67 and/or remote start command signals for causing the remote start device 63 to start the vehicle 21.

Yet, one problem which may be encountered when the controller 40 causes such functions to be implemented is that by causing the alarm indicator 67 to be turned on so that the user can locate the vehicle 21, the security device detection circuit 260 will detect the activation thereof. Thus, the controller 40 will be prompted to send a security signal to the user, even though the user was the one who sent the car find command signal. The same may also be the case with a remote start command signal, which may otherwise cause the security controller 28 to determine that the vehicle 21 is being stolen and trigger the alarm indicator 67.

As such, in accordance with this aspect of the present invention, the controller 40 may perform the at least one predetermined vehicle function while bypassing sending the security signals, i.e., bypassing the security device detection circuit 260, at Block 273. Once the function has been performed, at Block 274, then the normal sending of security signals may resume. Accordingly, even though performing the at least one vehicle function may otherwise activate the alarm indicator 67, for example, the vehicle tracking unit 25 may advantageously avoid sending unwanted security signals to the user, which may result in a significant savings in wireless communications costs.

Once again, the controller 40 may be switchable between armed and disarmed modes, and the controller may perform the at least one predetermined vehicle function based upon receiving the corresponding command signal via the wireless communications device while in the armed mode, at Block 280. The controller 40 may also cease bypassing the security device detection circuit 260 based upon a predetermined input, or after a predetermined period, at Block 281. More particularly, the predetermined period could be measured from the time when the corresponding command signal is received, or from the time the corresponding vehicle function is completed, for example.

By way of example, the predetermined input may include switching the ignition switch 65 between on and off positions, or a deactivation of the at least one security device (i.e., the alarm indicator 67). Use of the predetermined period may be particularly advantageous in the case of remote starting the vehicle 21, in which case the function of starting the vehicle may last a relatively short time but the alarm indicator 67, if activated, could continue to provide an alert for much longer. Accordingly, the predetermined period could be set to be slightly longer than the time which the security controller 28 is programmed to activate the alarm indicator 67.

Figure 29:
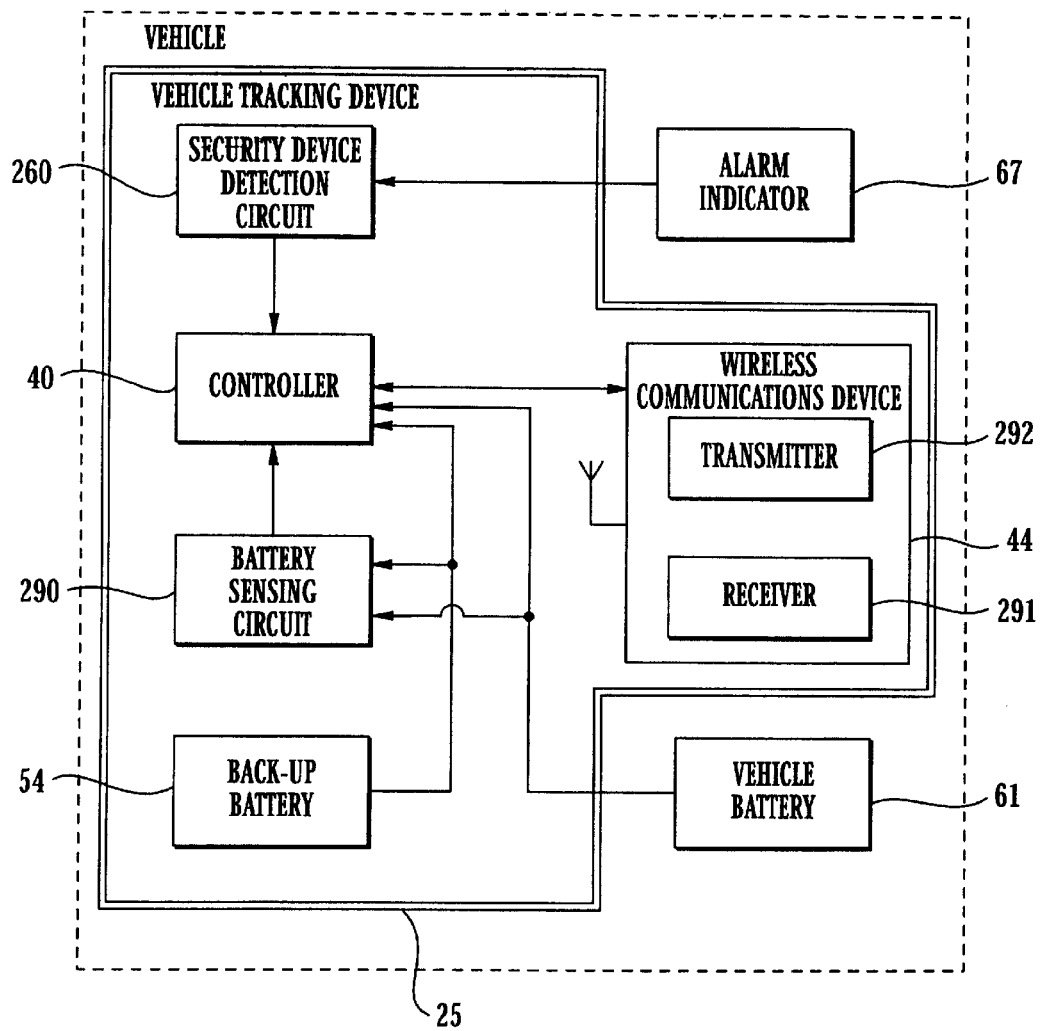
FIG. 29 is a schematic block diagram of the vehicle tracking unit of FIG. 1 also including the security device detection circuit and a battery sensing circuit.
Figure 30:
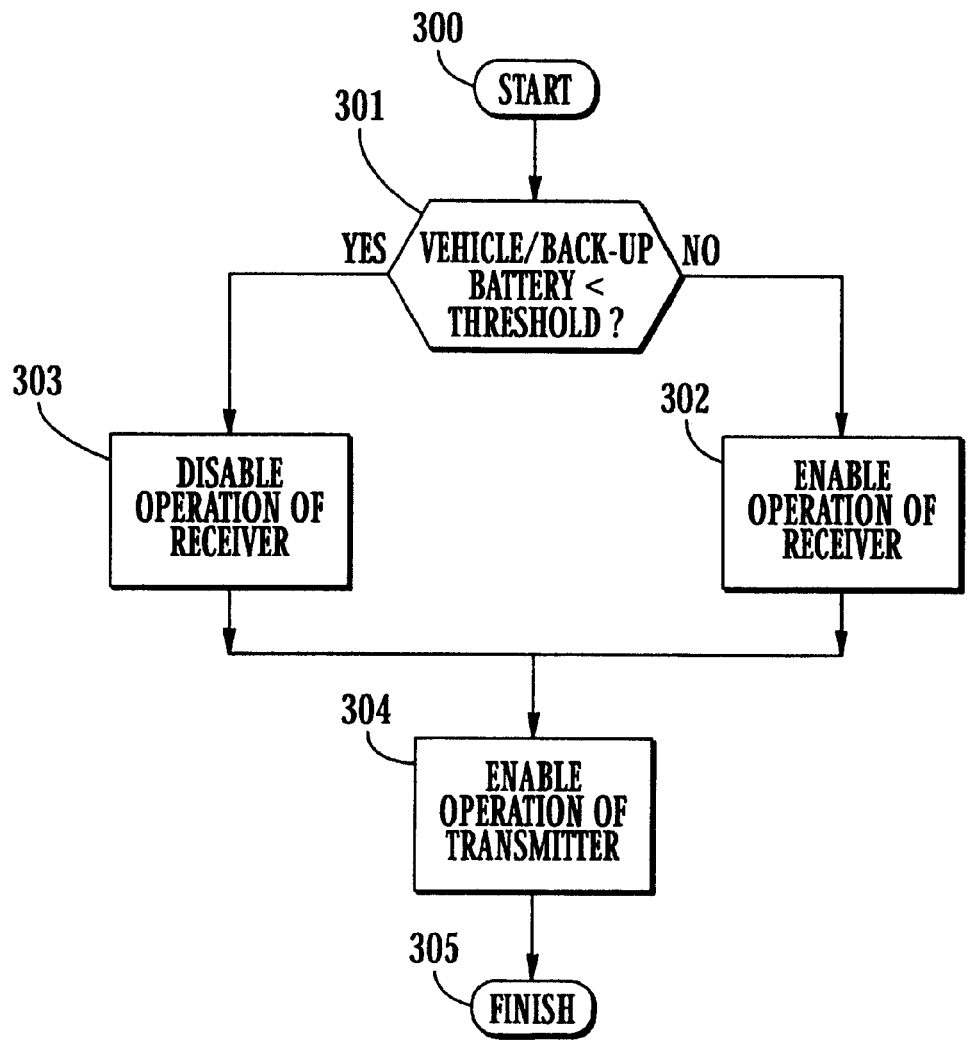
FIGS. 30 and 31 are flowcharts illustrating a still further aspect of the invention for reducing excessive power drain on the vehicle battery and/or the back-up battery.
Figure 31:
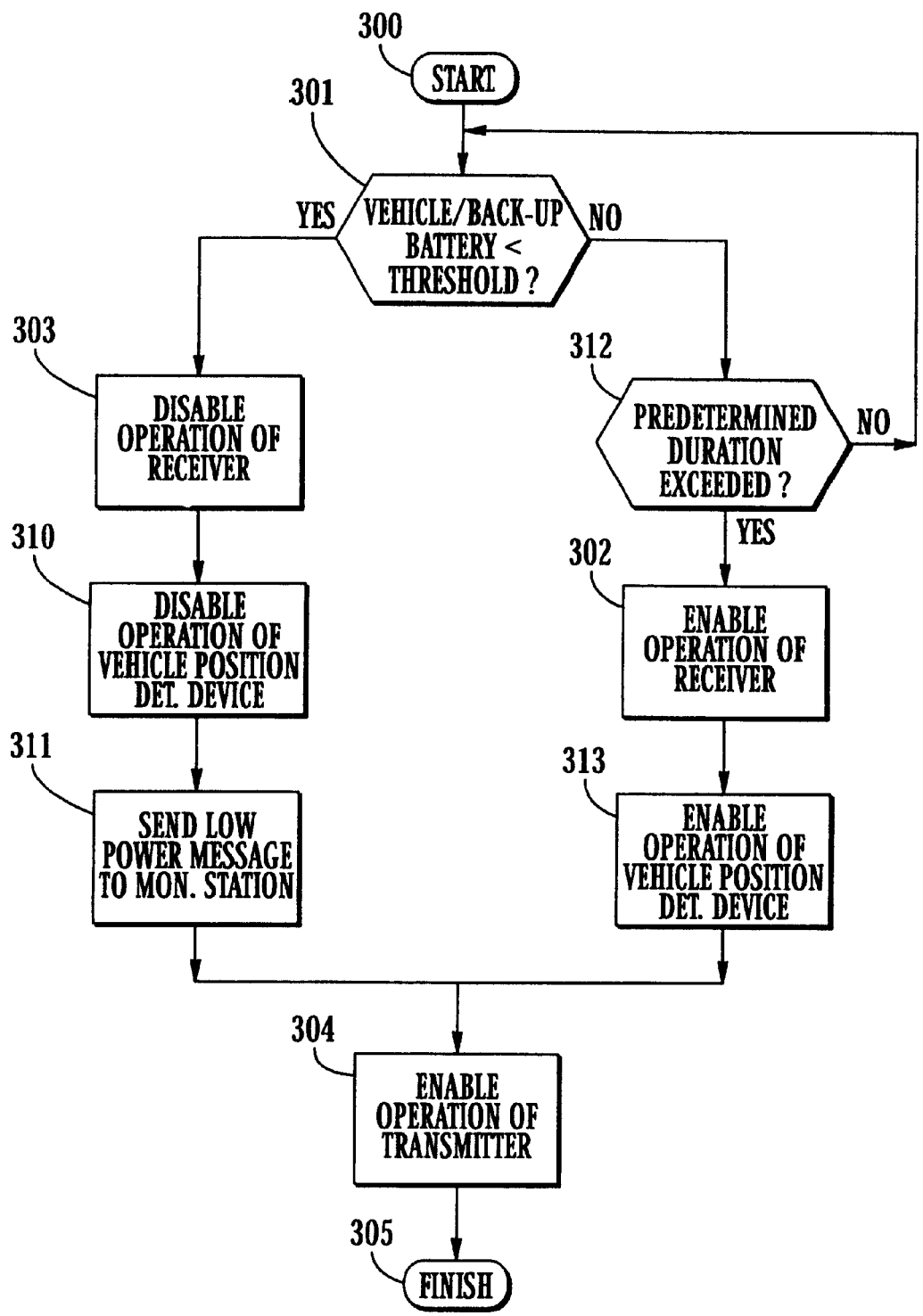

Turning now additionally to FIGS. 29–31, another aspect of the invention for a battery power saving mode will now be described. By way of example, the power saving mode may be particularly applicable when the vehicle tracking unit 25 is switched to the armed mode based upon the ignition switch 65 being switched off, as previously discussed above.

As will be appreciated by those of skill in the art, the wireless communications device 44 may include a receiver 291, and a transmitter 292 for communicating with the monitoring station 30. As noted above, the vehicle tracking unit 25 may include the security device detection circuit 260, and it may also include a battery sensing circuit 290 for sensing a voltage of at least one of the back-up battery 54 and the vehicle battery 61.

Beginning at Block 300, the controller 40 may cooperate with the battery sensing circuit 290 to determine whether a voltage of the battery supplying power to the vehicle tracing unit 25 (which could be either the vehicle battery 61 or the back-up battery 54, for example) has fallen below a threshold, at Block 301. In the case of the vehicle battery 61, the threshold may advantageously be set to a voltage level required to start the vehicle (e.g., greater than about 11.5 Volts). For the back-up battery 54, the threshold may correspond to a voltage level sufficient to allow the transmitter 292 to continue sending security and/or position signals.

If the sensed battery voltage is below the threshold, the controller 40 may then disable operation of the receiver 291, at Block 303. In some embodiments, the controller 40 may wait a predetermined period before disabling the operation of the receiver 291. The controller 40 may preferably enable operation of the transmitter 292 irrespective of the sensed battery voltage (i.e., even when the sensed voltage falls below the threshold), at Block 304, thus concluding the power saving mode (Block 305).

As such, the controller 40 may advantageously allow the receiver 291, which may consume a significant amount of battery power, to remain on as long as possible while preserving enough battery power to allow the vehicle 21 to be started (i.e., when the vehicle battery 61 is supplying power) and/or to allow other components of the vehicle tracking unit 25 to function properly. Accordingly, the controller 40 may still cooperate with the wireless communications device 44 to send security and/or position signals to the monitoring station 30.

In particular, the controller 40 may enable operation of the receiver 291 based upon the sensed battery voltage being above the threshold for a predetermined duration, at Block 312. Accordingly, if the sensed voltage only momentarily falls below the threshold, the receiver 291 will not unnecessarily be disabled and incoming signals potentially missed. To this end, the receiver 291 when enabled may operate substantially continuously, and the transmitter 292 when enabled may operate substantially intermittently based upon the security device detector circuit 260 to send security signals, as previously discussed above.

To provide even further power savings, the controller 40 may also enable operation of the vehicle position determining device 42 based upon the sensed battery voltage being above the threshold, at Block 313, and disable operation of the vehicle position determining device 42 based upon the sensed battery voltage being below the threshold, at Block 310. Again, the controller 40 may enable operation of the vehicle position determining device based upon the sensed battery voltage being above the threshold for the predetermined duration (Block 312).

Of course, those of skill in the art will appreciate that while a single duration has been illustrative shown in FIG. 31 for clarity of illustration, separate durations (or even separate voltage thresholds) could be used for enabling the receiver 291 and the vehicle position determining device 42. Moreover, if the vehicle tracking unit 25 includes additional components (e.g., an upgrade device, as will be discussed further below), such components may also be similarly disabled to further conserve power, as will be appreciated by those of skill in the art. It should be noted that the controller 40 may also advantageously cooperate with the wireless communications device 44 in some embodiments to send a low power message to the monitoring station 30 based upon the sensed battery voltage being below the threshold, at Block 311. Here again, the controller 40 may delay a predetermined time before so doing in some embodiments.

Figure 32:
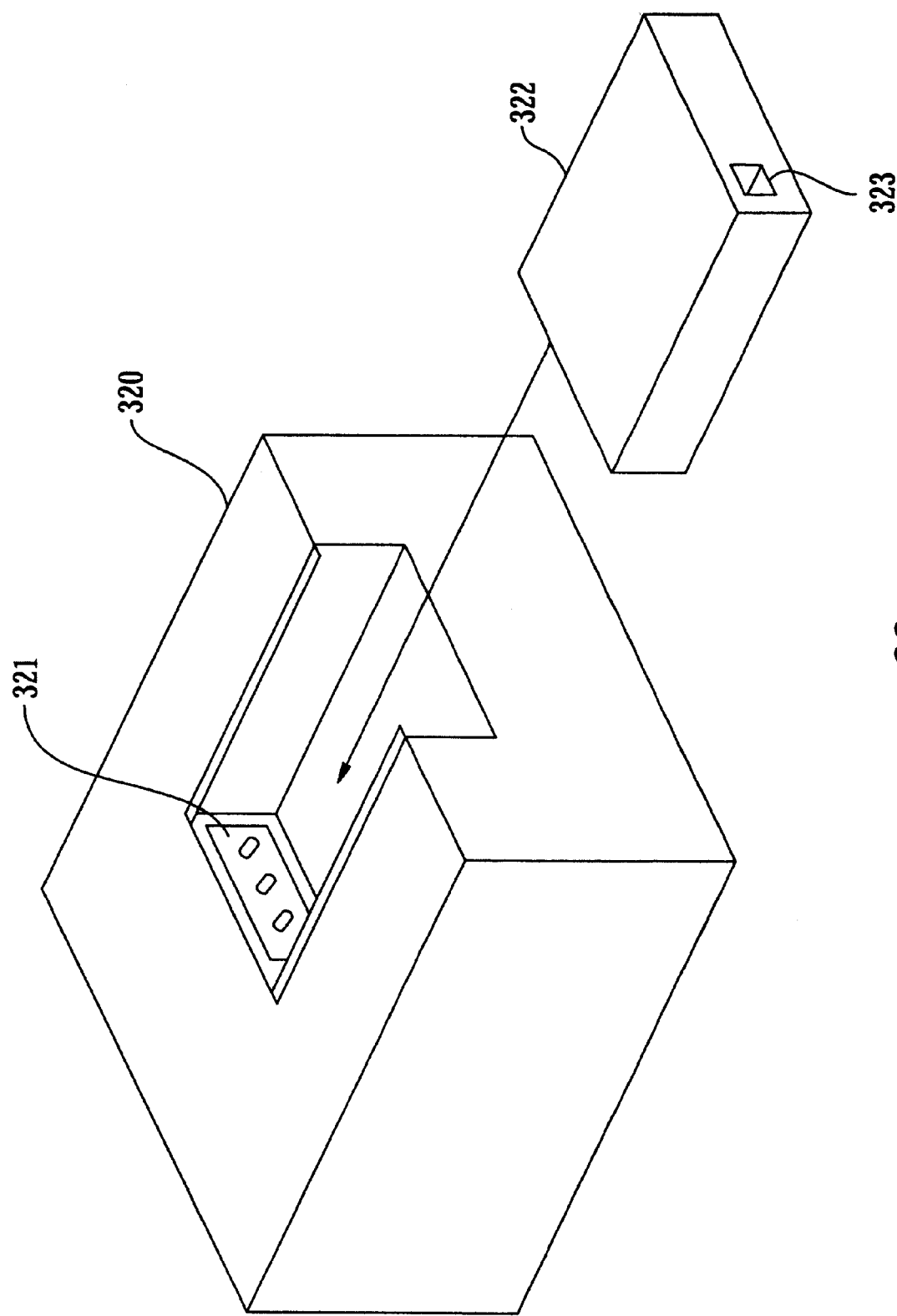
FIG. 32 is a perspective view of the vehicle tracking unit of FIG. 1 and further including a housing with an upgrade connector for an upgrade device.
Figure 33:
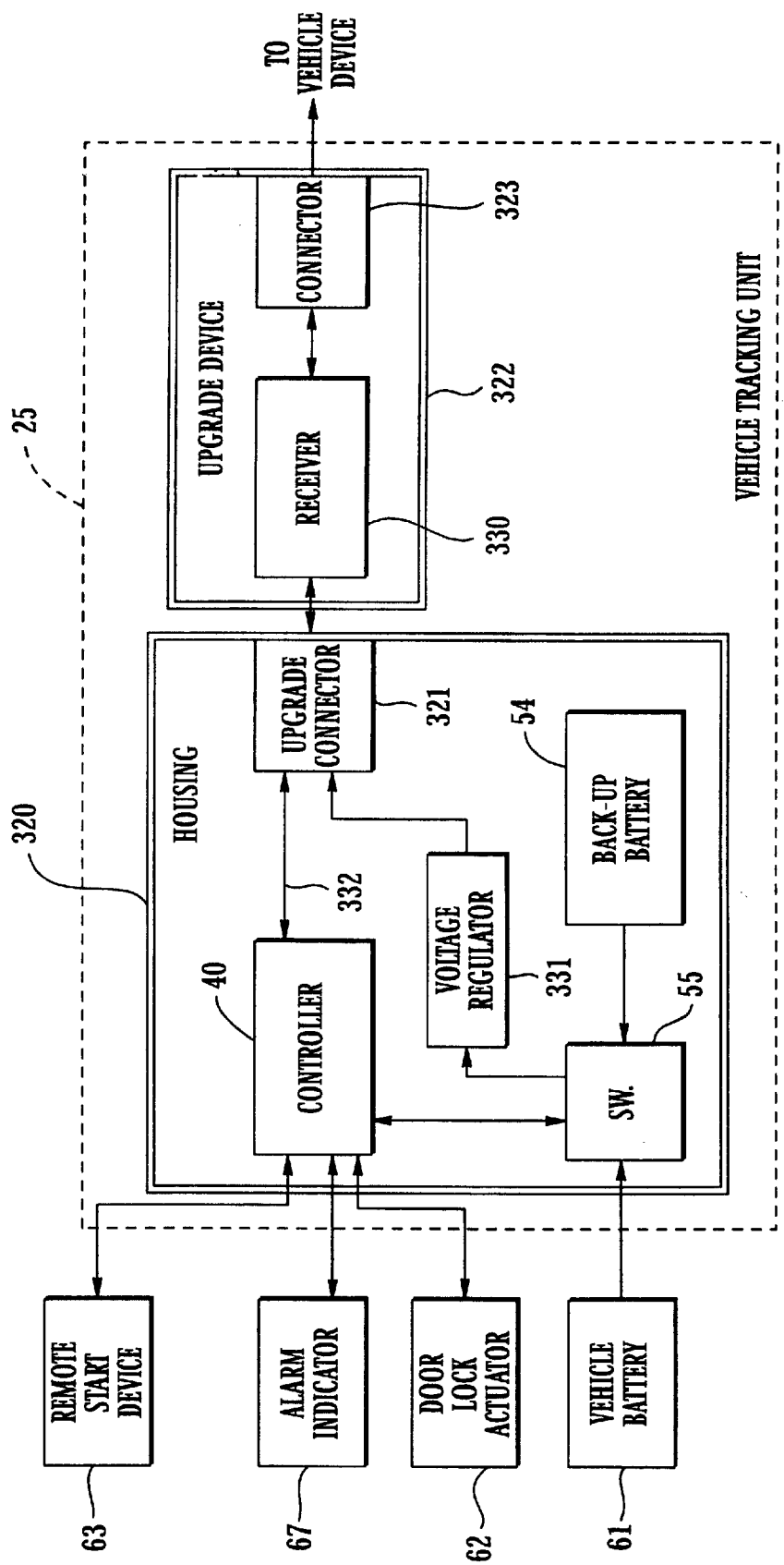
FIG. 33 is a schematic block diagram of the vehicle tracking unit of FIG. 32.

Referring now to FIGS. 32 and 33, the vehicle tracking unit 25 may also include a housing 320 for carrying the various components thereof (i.e., the vehicle position determining device 42, the wireless communications device 44, the controller 40, etc.). Additionally, an upgrade connector 321 may be carried by the housing 320 and coupled to the controller 40. As such, in accordance with another advantageous aspect of the invention, an upgrade device 322 may be removably coupled to the upgrade connector 321, as illustratively shown in FIG. 32, for causing the controller 40 to perform at least one vehicle function.

More particularly, the vehicle tracking unit 25 may further include one or more remote transmitters 60 to be carried by a user, and the upgrade device 322 may include a receiver 330 for causing the controller 40 to perform the at least one vehicle function based upon signals from the remote transmitter. The remote transmitter 60 may generate pseudorandomly coded signals, for example, to provide enhanced security, as will be appreciated by those of skill in the art.

Numerous vehicle functions may be performed based upon the type of upgrade device 322 that is used. By way of example, such vehicle functions may include either locking or unlocking vehicle doors via the door lock actuator 62, remote starting the vehicle's engine via the remote start device 63, and/or activating the alarm indicator 67. Other vehicle functions may also be performed, as will be appreciated by those of skill in the art. Moreover, a given upgrade device 322 may provide one or more of such functions. Accordingly, a user may install the vehicle tracking unit 25 and at a later time relatively easily upgrade the vehicle tracking unit to provide such additional functionality. Furthermore, the upgrade device 322 may utilize some of the control circuitry already provided in the controller 40, so both space and cost savings may potentially be realized.

The upgrade device 322 may be powered by the vehicle battery 61 via the upgrade connector 321. More particularly, the vehicle tracking unit 25 may further include a voltage regulator 331 carried by the housing 320 and coupled to the vehicle battery 61, and the upgrade device 322 may be powered by the voltage regulator via the upgrade connector 321. More particularly, the voltage regulator 331 may provide a voltage to the upgrade device 322 that is lower than a voltage of the vehicle battery 61.

By way of example, the vehicle battery 61 may provide about twelve Volts, while the upgrade device 322 may preferably operate off about five Volts. Of course, other voltages may also be used. Further, the back-up battery 54 may also be carried by the housing 320, as illustratively shown in FIG. 33, and the upgrade device 322 may be selectively powered by the back-up battery 54 via the upgrade connector 321.

A serial communications link 332 may be used to connect the controller 40 and the upgrade device 322 via the upgrade connector 321. In some embodiments, the upgrade device 322 may also include one or more connectors 323 to be connected to at least one vehicle device. Thus, instead of controlling the various vehicle devices via the controller 40, the upgrade device may directly control vehicle devices via the connector 323.

By way of example, for an alarm/keyless entry upgrade device embodiment, connectors 323 may be included for a valet switch, an LED light (or lights), shock sensors, door and hood trigger wires, and for flashing vehicle lights, as will be appreciated by those of skill in the art. In another embodiment for a remote start upgrade device, connectors 323 may be included for the car starter relays to be connected thereto, for example. Of course, other connector types known to those of skill in the art may also be used.

Figure 34:
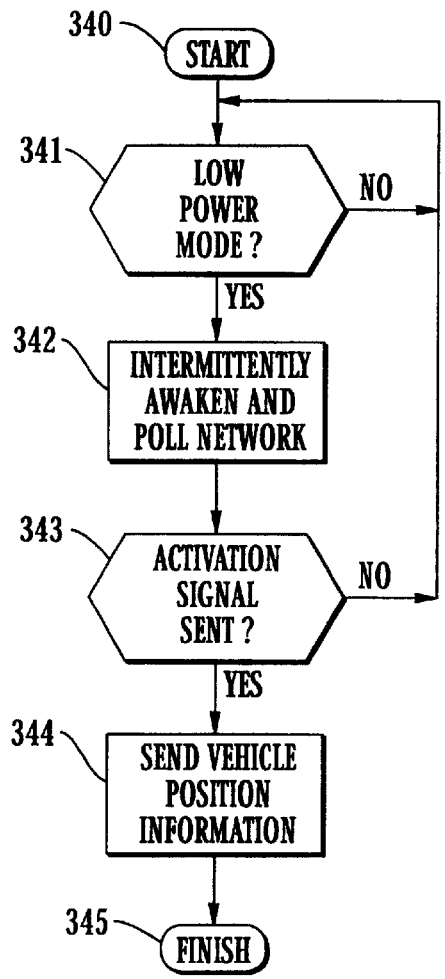
FIGS. 34 and 35 are flowcharts illustrating missed activation signal retrieval features of the present invention.
Figure 35:
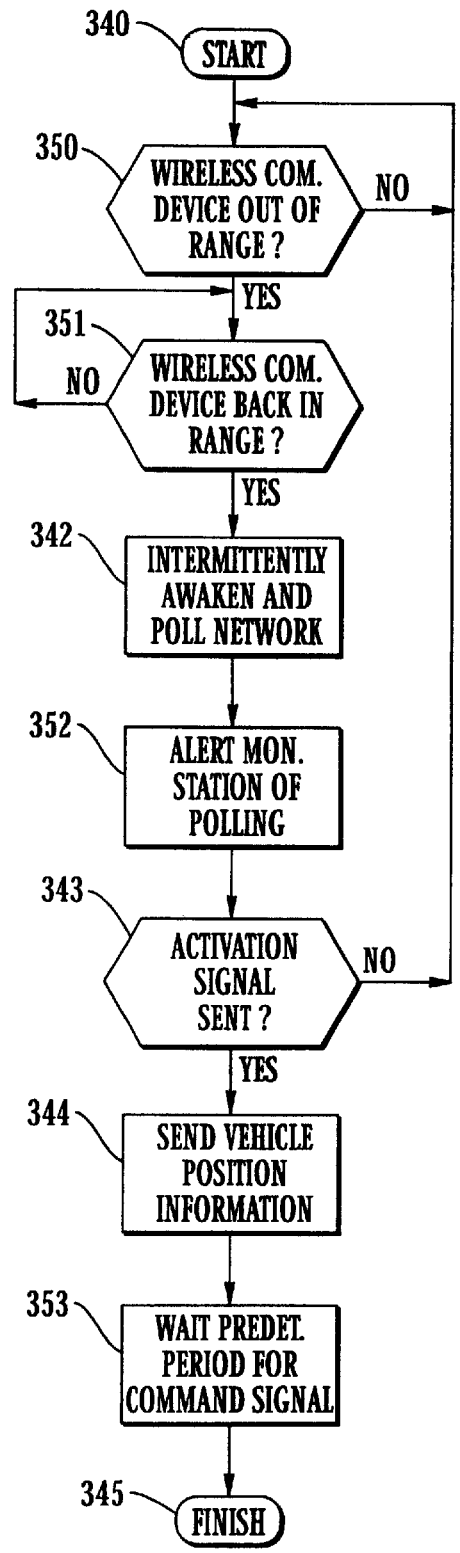

Another advantageous aspect of the invention will now be described with reference to FIGS. 34 and 35. As noted above, the controller 40 may cooperate with the vehicle position determining device 42 and the wireless communications device 44 to send vehicle position information to the monitoring station 30 based upon receiving an activation signal via a communications network.

In accordance with this aspect of the invention, beginning at Block 340 the controller 40 may selectively cause the vehicle tracking unit 25 to be in a low power mode, at Block 341, to conserve power, as discussed previously above. The controller 40 may also cooperate with the wireless communications device 44 to intermittently awaken the vehicle tracking unit 25 from the low power mode to poll the communications network (Block 342) to thereby determine whether the activation signal has been directed to the vehicle tracking unit, at Block 343. The polling may advantageously be relatively short (e.g., less than a minute) to reduce both power consumption and wireless communications charges.

The vehicle position information may then be sent to the monitoring station 30 one or more times, at Block 344, as previously described above, concluding this aspect (Block 345). As such, the monitoring station 30 need not be synchronized with the vehicle tracking unit 25 because the user does not have to send the activation during a brief window when the unit is active, as is the case with some prior art vehicle tracking units.

In particular, the controller 40 may selectively cause the vehicle tracking unit 25 to be in the low power mode based upon the vehicle's engine being off. Moreover, the controller 40 may detect the engine being off based upon the vehicle ignition switch 65 being switched to an off position. Also, the controller 40 may selectively cause the vehicle tracking unit 25 to be in the low power mode responsive to the passage of a predetermined time since the engine was turned off, and/or responsive to a voltage of the vehicle battery 61 dropping below a threshold.

The communications network may be a cellular communications network, for example. The cellular communications network may store indications of missed calls, and the activation signal may be stored as at least one missed call by the cellular communications network, as will be appreciated by those skilled in the art. Alternately, the cellular communications network may store voice mail messages, and the activation signal may be stored as a voice mail message by the cellular communications network. Further, the cellular communications network may transmit data packets and/or voice data, as will also be appreciated by those skilled in the art.

The controller 40 may also cooperate with the wireless communications device 44 for determining when the communications network is out of range, at Block 350, and for determining when the communications network is back in range after being out of range, at Block 351. The communications network may then be polled as discussed above when back in range of the vehicle tracking unit 25 to determine whether the activation signal has been directed to the vehicle tracking unit while the communications network was out of range. Thus, both missed activation signals sent while the vehicle tracking unit 25 is in the low power mode and/or out of range may still be received. It should be noted that either one or both of these options may be used in various embodiments.

The communications network may also provide a notification to the monitoring station 30 upon being polled by the wireless communications device, at Block 352. The controller 40 may also wait a predetermined time after receiving the activation signal before selectively causing the vehicle tracking unit 25 to return to the low power mode. For example, the predetermined time may be on the order of a few minutes. In addition, the wireless communications device may include a receiver 291, as noted above, and the controller 40 may cause the receiver to be turned off when the vehicle tracking unit 25 is in the low power mode. Intervals of awakening the vehicle tracking unit 25 from the low power mode may be in a range of about 12 to 48 hours, for example, though other intervals may also be used.

Figure 36:
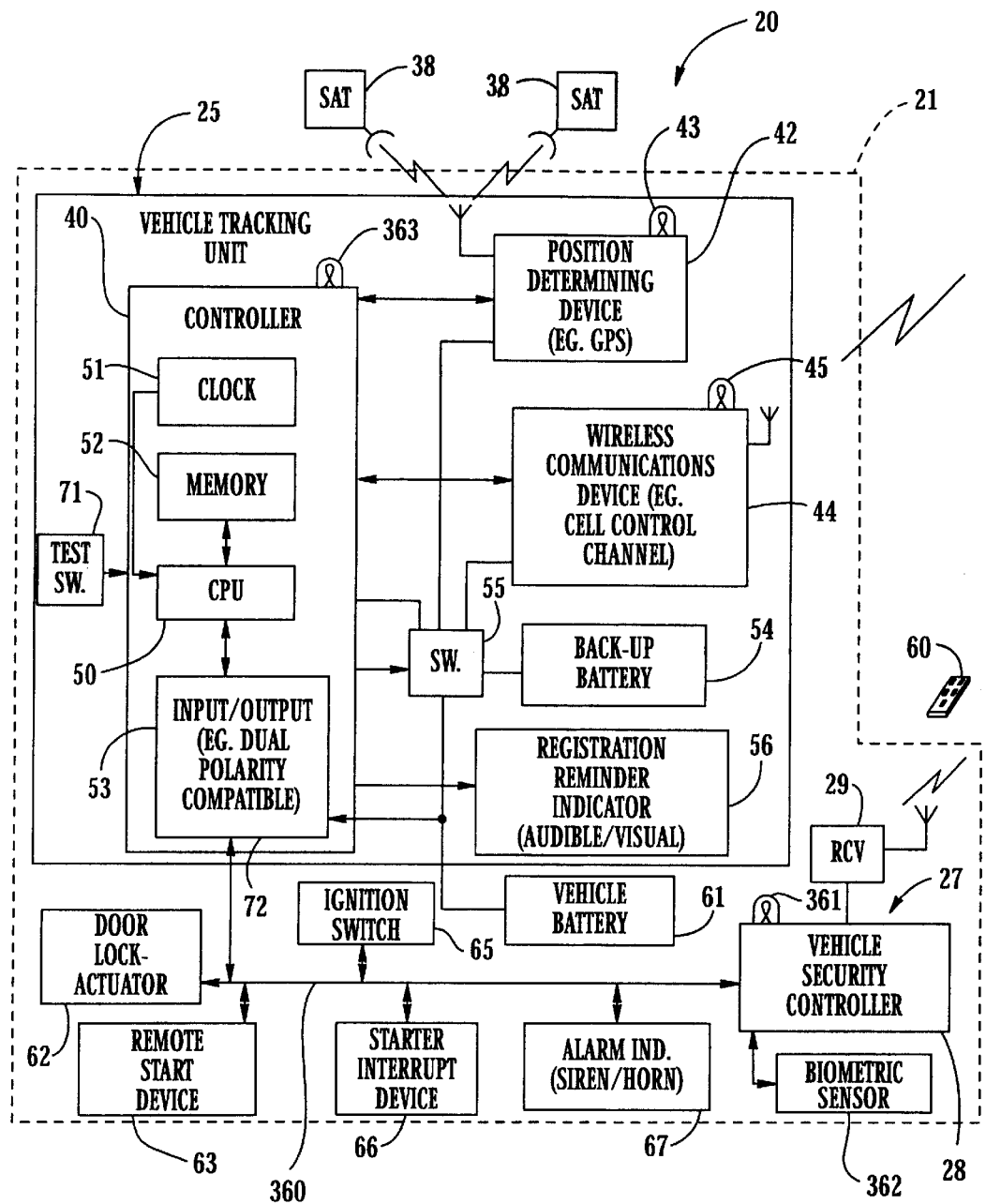
FIG. 36 is a schematic block diagram of an alternate embodiment of the vehicle as shown in FIG. 2 including a vehicle data bus.

In an alternate embodiment of the invention illustratively shown in FIG. 36, the vehicle 21 may include a vehicle data bus 360 extending throughout the vehicle and which is connected to one or more operable vehicle devices. As illustratively shown, such operable vehicle devices may include the vehicle alarm indicator 67 (e.g., horn, siren, etc.), a keyless entry device, the engine starter interrupt device 66, the remote start device 63, the door lock actuator 62, and the vehicle security controller 28, although others may also be included as will be appreciated by those of skill in the art. Furthermore, other devices to be monitored, such as the ignition switch 65, may also be connected to the vehicle data bus 360, for example.

Furthermore, one or more of the operable vehicle devices may be responsive to at least one data bus code received on the vehicle data bus 360. More particularly, each of the above listed operable vehicle devices may have one or more unique data bus codes assigned thereto which, when received, cause a respective operable vehicle device to perform a particular function, as will be understood by those skilled in the art.

Figure 37:
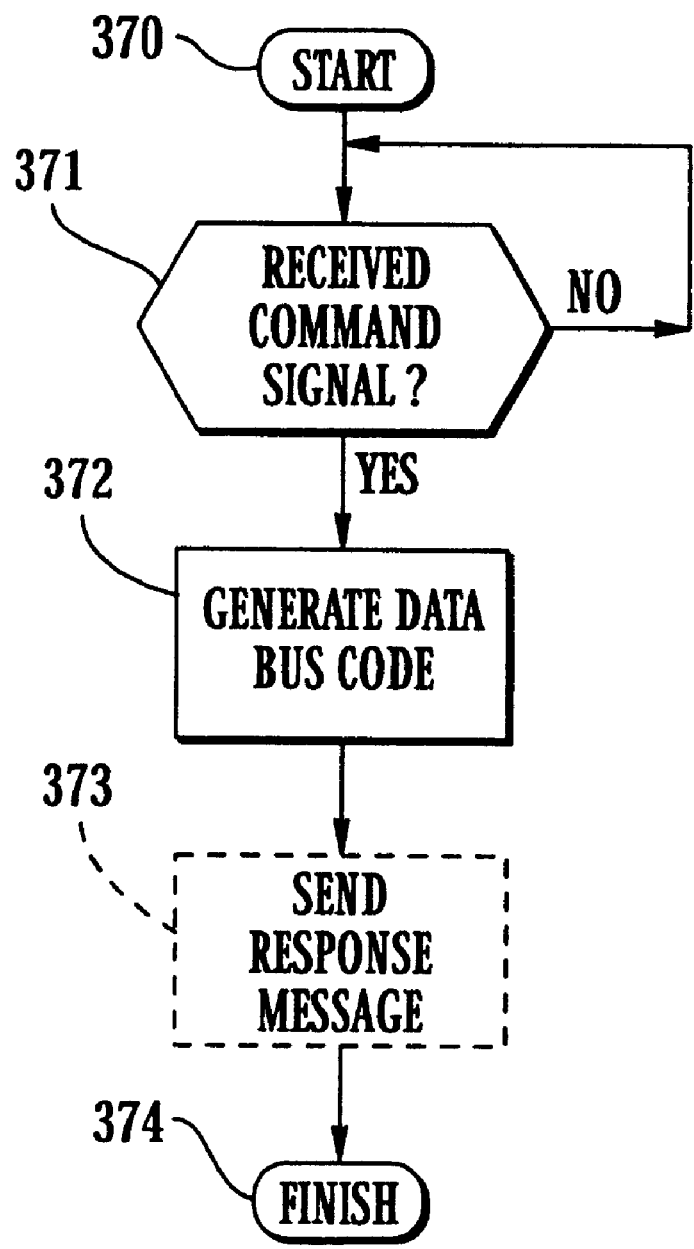
FIG. 37 is a flowchart illustrating a method for controlling operable vehicle devices using the vehicle tracking unit and vehicle data bus shown in FIG. 36.

As such, a method according to the present invention is illustratively shown in FIG. 37 in which, beginning at Block 370, the controller 40 generates at least one data bus code on the vehicle data bus 360 to control at least one operable vehicle device based upon a command signal received by the wireless communications device 44, at Blocks 371 and 372. Accordingly, the user may not only use the vehicle tracking unit 25 to control numerous vehicle devices, but separate connections between such devices and the controller 40 need not be made. Instead, each of the operable vehicle devices may conveniently be connected to the vehicle data bus 360, which may make the installation thereof easier.

In some embodiments, the command signal received by the wireless communications device 44 may include the at least one data bus code. Alternately, the command signal may relate to the at least one data bus code, and the controller 40 may process the command signal to generate the at least one data bus code on the vehicle data bus 360, as will be understood by those skilled in the art.

Further, the command signal may be provided by the monitoring station 30, and the controller 40 may optionally cooperate with the wireless communications device 44 to send a response message to the monitoring station based upon receiving the command signal, at Block 373, thus ending the method (Block 374). By way of example, the wireless communications device 44 may receive the vehicle data bus device code via a wireless pager network, although other suitable communications formats may also be used.

Figure 38:
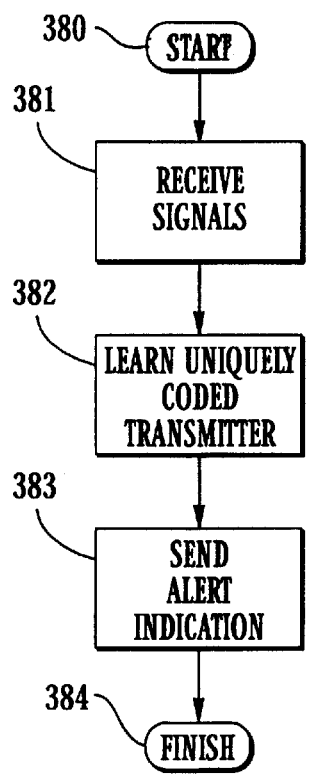
FIGS. 38 and 39 are flowcharts illustrating a method according to the invention for sending alert indications based upon learning uniquely coded transmitters.

Another advantageous aspect of the invention is for a vehicle control system including the vehicle tracking unit 25 and a function controller, which may cooperate to alert a user that uniquely coded transmitters have been learned by the vehicle function unit, will now be described with reference to FIGS. 38 and 39. By way of example, the function unit may be the vehicle security system 27, and the functions performed thereby may include security and/or door locking/unlocking functions, as previously described above.

Of course, in some embodiments the function unit may be the door lock actuator 62 itself responsive to a remote transmitter 60 for performing door lock/unlock functions. Another example of a function unit is the remote start device 63 for starting the vehicle's engine, also described above. Of course, other function units may also be used, as will be appreciated by those of skill in the art. It should be noted that while the various function units noted above are illustratively shown as being separate devices from the vehicle tracking unit 25, in some embodiments these units may be included within a single device, as will be understood by those of skill in the art. In particular, as described above, a remote start device and/or security controller may be embodied in an upgrade device 322 to be connected or plugged into the upgrade connector 321, for example.

Using the example of the vehicle security system 27 as the function unit, as illustratively shown in FIG. 36, the function unit may include one (or more) uniquely coded transmitter 60 to be carried by a user, and a receiver 29 at the vehicle 21 for receiving signals from the uniquely coded transmitter, at Blocks 380–381. The function unit 27 may also include a function controller (the vehicle security controller 28 in the present example) at the vehicle 21 and connected to the receiver 29. The function controller 28 cooperates with the receiver 29 to learn the uniquely coded transmitter 60 to permit control of one or more vehicle functions (here, security and/or door locking/unlocking functions) by the user, at Block 382.

In accordance with this aspect of the invention, the function controller 28 may advantageously cooperate with the wireless communications device 44 of the vehicle tracking unit 25 for sending an alert indication of whether one or more new uniquely coded transmitters have been learned, at Block 383, thus concluding the method (Block 384). Accordingly, if the uniquely coded transmitter 60 learned by the function controller 28 is an unauthorized transmitter, such as one a would-be thief may use to attempt to gain access to the vehicle 21, the user will advantageously be notified of this fact and may alert the proper authorities.

The vehicle control system may further include a local indicator (a vehicle security system indicator 361 in the illustrated example of FIG. 36) connected to the function controller 28 for providing a local indication of whether one or more uniquely coded transmitters 60 have been learned. Thus, if the user for some reason does not receive the alert indication to this effect, he will still be notified of this fact upon returning to the vehicle 21.

Figure 39:
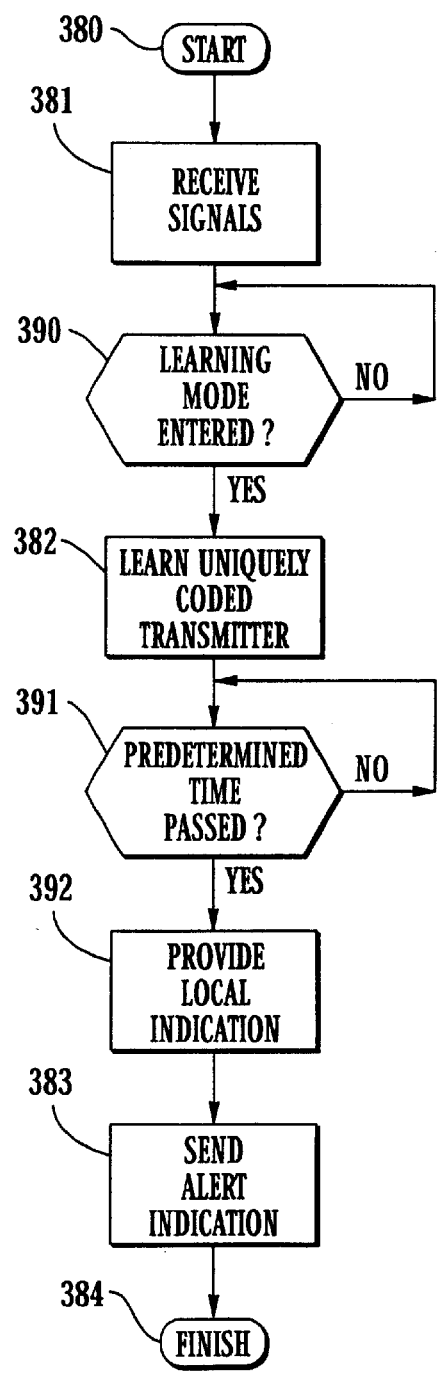
Figure 40:
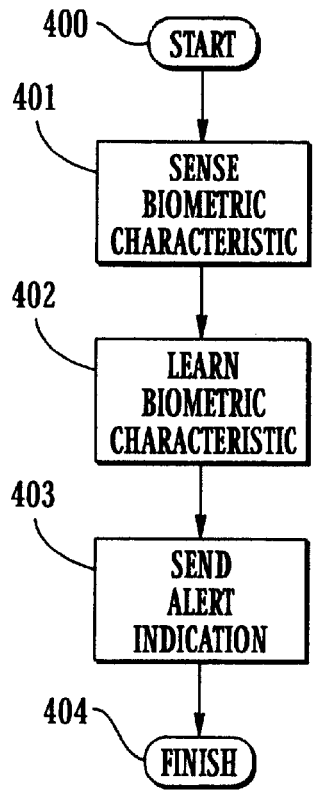
FIGS. 40 and 41 are flowcharts illustrating a related method according to the invention for sending alert indications based upon learning unique biometric characteristics.
Figure 41:
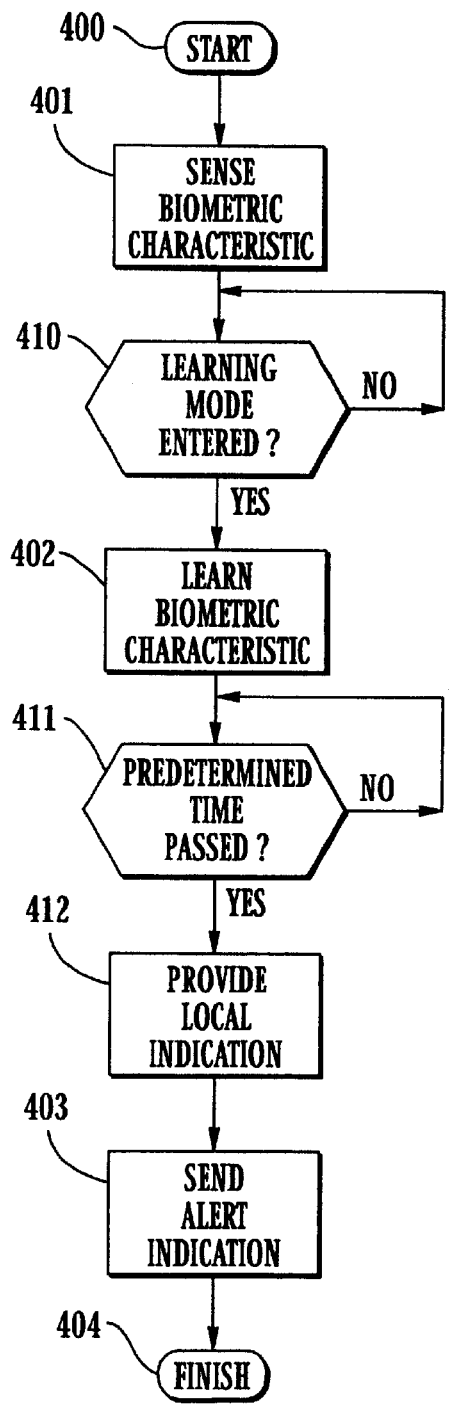

In addition, the function controller 28 may be switchable to a learning mode to permit learning of the at least one uniquely coded transmitter, at Block 390, and the function controller may cooperate with the wireless communications device 44 for sending the alert indication when the learning mode has been entered, for example, as may be seen in FIG. 39. Moreover, the function controller 28 may cooperate with the wireless communications device 44 for sending the alert indication when the learning mode has last been entered.

Additionally, the function controller 28 may cooperate with the wireless communications device 44 for sending the alert indication for a passage of time since the learning mode has last been entered, at Block 391. Similarly, the function controller 28 may cooperate with the wireless communications device 44 for sending the alert indication for a number of learned uniquely coded transmitters, as well as for sending the alert indication for a change in a number of learned uniquely coded transmitters 60, and/or for sending the alert indication for a change in a code of at least one learned uniquely coded transmitter. The uniquely coded transmitter (s) 60 may be at least one of a uniquely coded remote transmitter and a uniquely coded transponder transmitter, for example, as will be appreciated by those skilled in the art.

In accordance with a similar aspect of the invention, the function unit 28 may instead of, or in addition to, the uniquely coded transmitter 60 also include a biometric characteristic sensor 362 for sensing a unique biometric characteristic of a user, at Block 401. In this embodiment, the function controller 28 may similarly learn the unique biometric characteristic, at Block 402, to permit control of a vehicle function by the user.

Again, the function controller 28 may cooperate with the wireless communications device 44 for sending (Block 403) an alert indication of whether at least one new unique biometric characteristic has been learned, thus concluding the method (Block 404). Of course, the learning mode, time-delayed sending, and location indication steps described above may similarly be performed with respect to learning biometric characteristics, as illustratively shown at Blocks 410–412, respectively.

Figure 42:
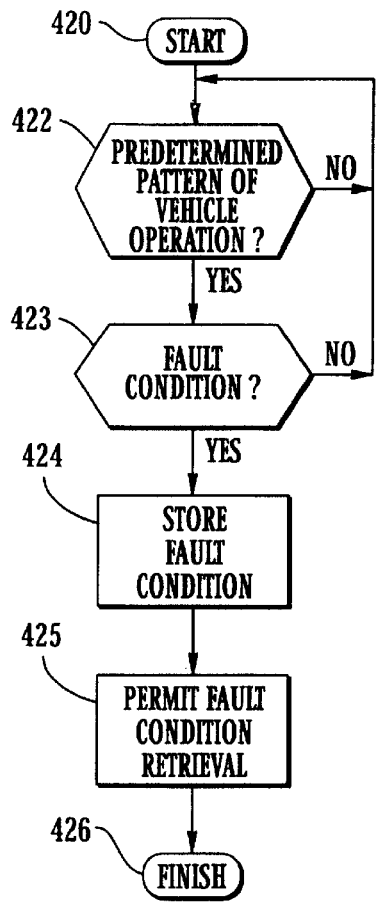
FIGS. 42 and 43 are flowcharts illustrating another aspect according to the present invention for determining fault conditions of the vehicle tracking unit of FIG. 1.
Figure 43:
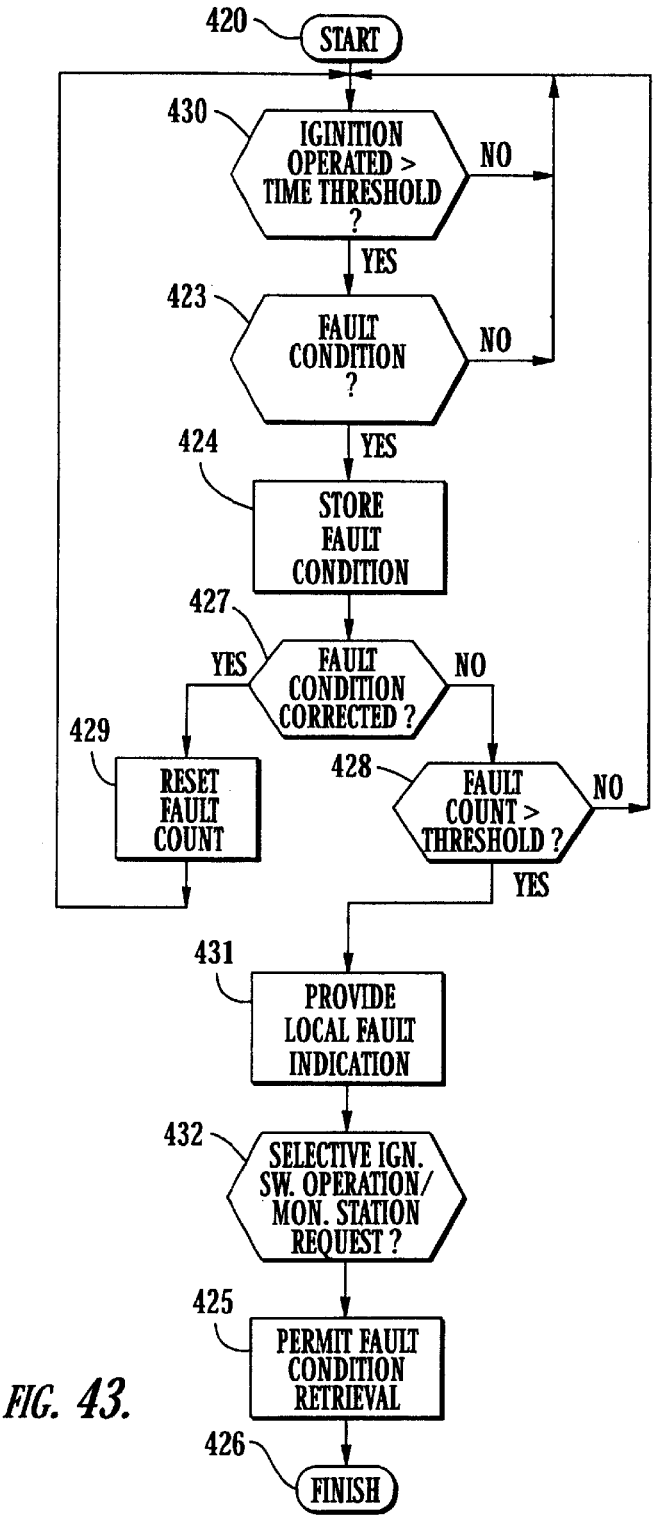

Turning now to FIGS. 42 and 43, another advantageous aspect of the invention for determining fault conditions of the vehicle tracking unit 25 will now be described. More particularly, beginning at Block 420, the controller 40 may monitor operation of the vehicle 21 and determine a fault condition of at least one of the vehicle position determining device 42 and the wireless communications device 44 based upon a failure thereof over a predetermined pattern of vehicle operation, at Blocks 422–423. By way of example, the fault condition may be based upon a received signal strength, although other faults may also be indicated.

Moreover, the controller 40 may also store the fault condition, at Block 424, and permit retrieval of the stored fault condition, at Block 425, thus concluding the fault sensing operation (Block 426). In particular, the controller 40 may monitor the operation of the vehicle 21 by monitoring the vehicle's ignition (e.g., via the ignition switch 65), for example, to determine whether the ignition has been operational for greater than a time threshold (e.g., fifteen minutes), at Block 430. Thus, occurrences of determining momentary operational errors (e.g., failure of the wireless communications device 44 to communicate with a communications network due to interference) as significant fault conditions may be reduced.

The predetermined pattern of vehicle operation may include a series of successive operations of the ignition. That is, a predetermined number of faults (e.g., two) will need to occur, at Block 428, before the local fault indication is provided (Block 431). Here again, this also helps to increase the likelihood that only a true fault condition will result in a fault indication being provided.

Further, if, at any time after the fault condition has been determined but before the fault indication is provided, the fault condition is corrected (e.g., the wireless communications device 44 comes back in range of a communications network after being out of range for an extended period), at Block 427, the controller 40 may determine that the device in question is in fact working. In such event, the fault count may be reset, at Block 429, and the fault monitoring process may begin again.

The controller 40 may permit user retrieval of the stored fault condition based upon selective operation of the ignition switch and/or remotely by the monitoring station 30 upon request. Regarding the former, an indicator 363 (FIG. 36) may also be connected to the controller 40 to provide a local fault indication based upon retrieval of the stored fault condition. By way of example, the indicator 363 may include at least one of an audible and a visual indicator, such as a tone generator or an LED. Of course, one or more of the other indicators noted above may also be used for this purpose.

It should be noted that the controller 40 may determine and store fault conditions of one or both the vehicle position determining device 42 and the wireless communications device 44 in various embodiments. Similarly, the local fault indication may correspond to either the vehicle position determining device 42, the wireless communications device 44, or both.

Figure 45:
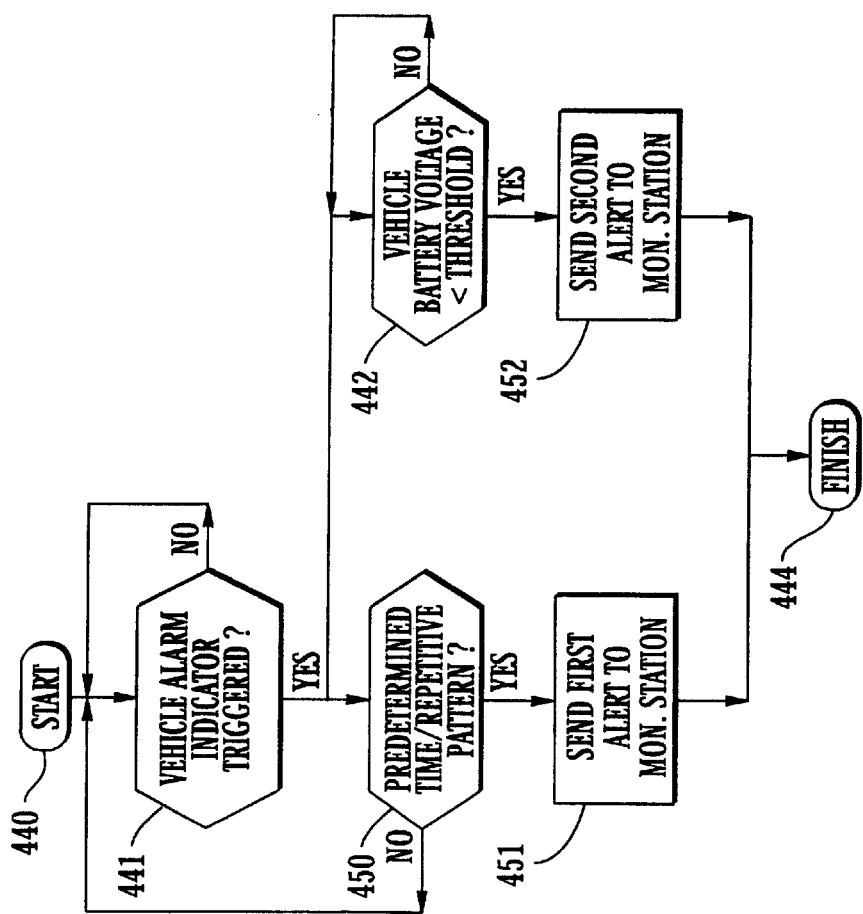
FIGS. 44 and 45 are flowcharts illustrating still another advantageous aspect of the invention for providing theft alerts based upon vehicle alarm indicator activation and a drop in vehicle battery voltage.
Figure 44:
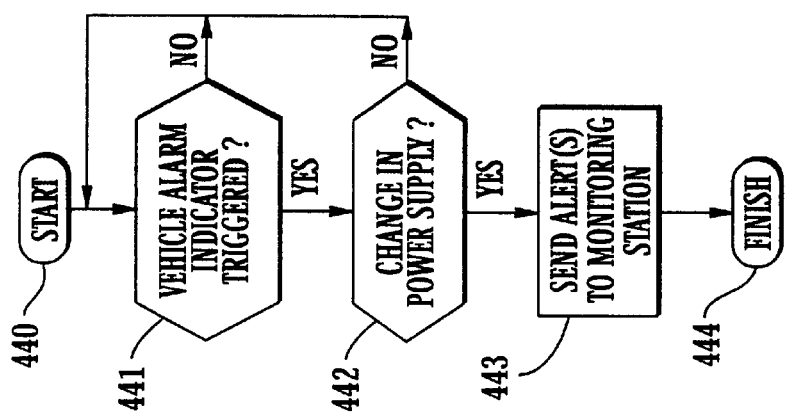

In accordance with another aspect of the invention described now with reference to FIGS. 44 and 45, beginning at Block 440 the controller 40 may also monitor the vehicle alarm indicator 67 to determine triggering thereof, at Block 441, and monitor at least one power supply to determine a change therein, at Block 442. More particularly, the at least one power supply may be the vehicle battery 61 or the back-up battery 54. By way of example, the controller may monitor the vehicle battery 61/back-up battery 54 via the battery sensing circuit 290 (FIG. 29), which may be connected to one or both of these batteries. Further, the controller 40 in cooperation with the wireless communications device 44 may cause at least one alert to be sent to the monitoring station 30 based upon both triggering of the vehicle alarm indicator 67 and a change in the at least one power supply, at Block 443, to conclude notification to the user (Block 444).

More particularly, the at least one alert may include a first alert (Block 451) based upon the alarm indicator 67 being triggered, and a second alert (Block 452) based upon the voltage of the at least one power supply (e.g., the vehicle battery 61) being below a threshold, as illustratively shown in FIG. 45. By way of example, the threshold may be less than about 4 Volts, although other thresholds may also be used. To this end, the vehicle tracking unit 25 in such embodiments will preferably include the back-up battery 54 for providing back-up power to the controller 40 and the wireless communications device 44 upon such a drop in voltage of the vehicle battery 61.

Accordingly, the vehicle tracking unit 25 of the present invention will advantageously send the second alert even if the first alert is not sent. For example, in some embodiments the controller 40 may monitor the vehicle alarm indicator 67 to determine triggering thereof continuously for greater than a predetermined time (e.g., a few seconds), at Block 450, before sending the first alert, at Block 451. This may be done to allow a user time to deactivate an errantly generated alarm condition before the first alert is sent and wireless communications charges unnecessarily incurred.

Yet, because of this delay period, a would-be thief could potentially cut the battery cable quickly enough to prevent the first alert from ever being sent. Nonetheless, by so doing, in accordance with the present invention the second alert will still be sent, and the user will therefore still be notified of the attempted theft of the vehicle 21. It should be noted that the controller 40 may also monitor the vehicle alarm indicator 67 to determine triggering in a repetitive pattern (Block 450), either in addition to or instead of monitoring for continuous triggering for a predetermined time, before sending the first alert. Further, instead of monitoring the vehicle battery 61 for a drop in voltage provided thereby to determine that the battery cables have been cut, this could also be done based upon detecting a sudden power drain on the back-up battery 54, which would also provide an indication that the cables to the vehicle battery had be severed.

Figure 46:
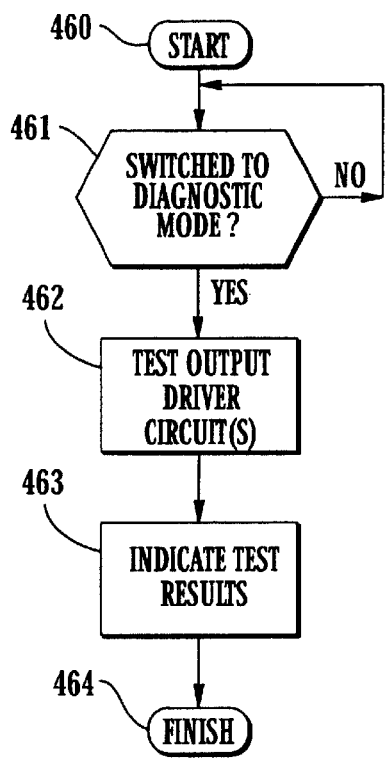
FIGS. 46 and 47 are flowcharts illustrating a further aspect of the invention for testing output drivers of the vehicle tracking unit of FIG. 1.
Figure 47:
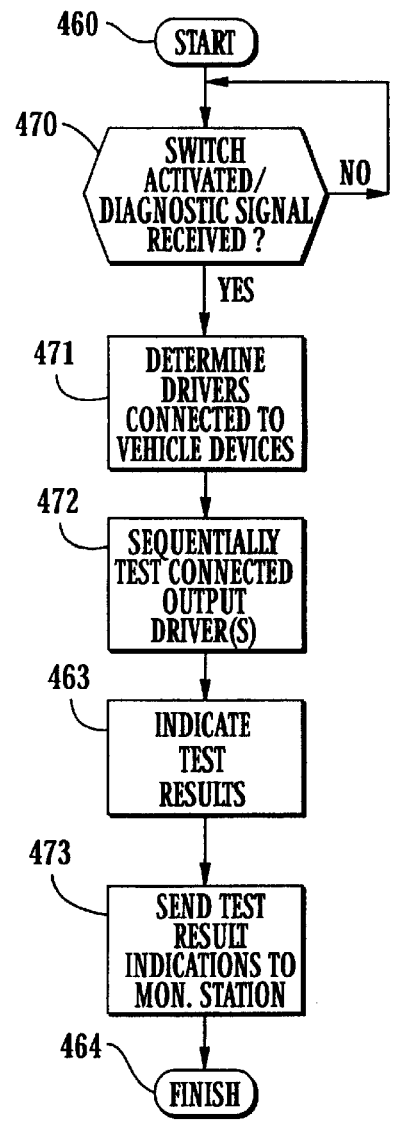

Turning now to FIGS. 46 and 47, an additional aspect of the invention will now be described for performing diagnostics of output driver circuits (i.e., the outputs 53 described above) for various vehicle devices and, correspondingly, whether the CPU 50 is providing correct output signals thereto. In accordance with this aspect of the invention, beginning at Block 461 the controller 40 may be switchable to a diagnostic mode, at Block 461, wherein at least one output driver circuit 53 is tested, at Block 462. Results of the testing may be indicated by one or more local diagnostic indicators, at Block 463, such as the previously noted indicators 363, 43, 45, for example, concluding the diagnostic operations (Block 464).

More particularly, the input device 170 (e.g., a switch) and/or a diagnostic signal received from the monitoring station 30 via the controller 40 and the wireless communications device 44 may be used for switching the controller to the diagnostic mode, at Block 470. In some embodiments, the controller 40 when in the diagnostic mode may determine whether each driver circuit 53 is connected to respective vehicle devices, at Block 471, to define one or more respective connected output driver circuits 53. Thus, the controller 40, when in the diagnostic mode, may advantageously test only the output driver circuit or circuits 53 which are connected, if desired. Of course, this need not be the case, and it will be appreciated by those skilled in the art that the output driver circuits 53 may advantageously be tested without being connected, so that the vehicle tracking unit 25 of the present invention can be tested prior to installation, for example.

By way of example, the controller 40 when in the diagnostic mode may sequentially test a plurality (or all) of the output driver circuits 53 (Block 472). Thus, by knowing which output driver circuits 53 will be tested in the diagnostic mode (e.g., which ones are connected to vehicle devices), the user may relatively easily determine which of the output driver circuits, if any, are not functioning correctly when a corresponding indication is not provided in the sequence of indications, as will be understood by those of skill in the art.

As illustratively shown in FIGS. 46 and 47, the controller 40 may cooperate with the diagnostic indicator(s) 363, for example, so that it is only operable when the controller is in the diagnostic mode. This feature may be particularly beneficial when an output driver circuit 53 is connected to a particular vehicle device, as the local diagnostic indicator 363 may otherwise provide an unwanted indication each time the vehicle device is activated during normal use, as will be appreciated by those of skill in the art.

As noted above, the local diagnostic indicator 363 may include an audible indicator and/or a visual indicator. In some embodiments, a respective diagnostic indicator 363 may be included for each output driver circuit 53, although this is not required. The controller 40 may also cooperate with the wireless communications device 44 to send test result indications to the monitoring station 30, at Block 473. As such, the user and/or a monitoring service may remotely determine whether the vehicle tracking unit 25 is functioning correctly.

Other features relating to vehicle tracking units and systems are disclosed in co-pending patent applications entitled VEHICLE TRACKER CONSERVING CODES AND RELATED METHODS, application Ser. No. 09/859,673; VEHICLE TRACKER WITH POWER SAVING FEATURES AND RELATED METHODS, application Ser. No. 09/859,728; VEHICLE TRACKER COOPERATING WITH A STARTER INTERRUPT AND RELATED METHODS, application Ser. No. 09/859,973 VEHICLE TRACKER WITH USER NOTIFICATIONS AND ASSOCIATED METHODS, application Ser. No. 09/859,733; VEHICLE TRACKER WITH USER REGISTRATION REMINDER AND RELATED METHODS, application Ser. No. 09/859,971; VEHICLE TRACKER INCLUDING INPUT/OUTPUT FEATURES AND RELATED METHODS, application Ser. No. 09/859,972; and VEHICLE TRACKER WITH TEST FEATURES AND RELATED METHODS, application Ser. No. 09/859,729; VEHICLE TRACKING UNIT PROVIDING DIRECTION DEVIATION TRACKING AND RELATED METHODS; VEHICLE TRACKER HAVING SWITCAHABLE POLARITY OUTPUT TERMINALS AND RELATED METHODS; VEHICLE TRACKING OUT PROVIDING VARIABLE FREQUENCY TRANSMISSION AND RELATED METHODS; VEHICLE TRACKER PROVIDING VEHICLE ALARM ALERT FEATURES AND RELATED METHODS; VEHICLE TRACKER INCLUDING OVERRIDE FEATURE AND RELATED METHODS; VEHICLE TRACKER INCLUDING SECURITY DEVICE MONITORING BYPASS FEATURE AND RELATED METHODS; VEHICLE TRACKER INCLUDING BATTERY MONITORING FEATURE AND RELATED METHODS; VEHICLE TRACKER INCLUDING A CONNECTOR FOR AN UPGRADE DEVICE AND RELATED METHODS; VEHICLE TRACKER INCLUDING MISSED CALL FEATURE AND RELATED METHODS; VEHICLE TRACKING UNIT FOR CONTROLING OPERABLE VEHICLE DEVICES USING A VEHICLE DATA BUS AND RELATED METHODS; VEHICLE CONTROL SYSTEM FOR CONTROLLING A VEHICLE FUNCTION INCLUDING A VEHICLE TRACKING UNIT AND RELATED METHODS; VEHICLE TRACKING UNIT WITH FAULT CONDITION DIAGNOSIS AND RELATED METHODS; VEHICLE TRACKING UNIT PROVIDING THEFT ALERT NOTIFICATIONS AND RELATED METHODS; VEHICLE TRACKING UNIT HAVING A SELF DIAGNOSTIC MODE AND RELATED METHODS; and VEHICLE TRACKER INCLUDING VARIABLE FREQUENCY TRANSMISSION AND RELATED METHODS, the entire disclosures of which are hereby incorporated herein by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A vehicle tracking unit for a vehicle of a type comprising a vehicle alarm indicator, the vehicle tracking unit comprising:
    a vehicle position determining device, a wireless communications device, and a controller connected to said wireless communications device and said vehicle position determining device to send vehicle position information to a monitoring station;
    said controller for causing the vehicle alarm indicator to provide an alarm indication lasting for a predetermined time and based upon said wireless communications device receiving a vehicle finder activation signal;
    said controller also for causing the vehicle alarm indicator to cease providing the alarm indication prior to expiration of the predetermined time based upon a user input.

2. The vehicle tracking unit according to claim 1 wherein said vehicle further comprises an ignition switch, and wherein said controller is connected to the ignition switch and switches the alarm indication off based upon the ignition switch.

3. The vehicle tracking unit according to claim 1 wherein said controller switches the alarm indication off based upon a remote transmitter to be carried by a user.

4. The vehicle tracking unit according to claim 1 wherein said controller switches the alarm indication off based upon a signal from the monitoring station.

5. The vehicle tracking unit according to claim 1 wherein the vehicle further comprises a security controller; and wherein said controller is responsive to the security controller for switching the alarm indication off.

6. The vehicle tracking unit according to claim 1 wherein said controller is switchable between armed and disarmed modes; and wherein said controller also cooperates with said vehicle position determining device and said wireless communications device to send an alert message to the monitoring station based upon the vehicle changing location while said controller is in the armed mode.

7. The vehicle tracking unit according to claim 1 further comprising a housing; and wherein said vehicle position determining device, said wireless communications device, and said controller are carried by said housing.

8. The vehicle tracking unit according to claim 1 wherein the vehicle alarm indicator comprises at least one of a vehicle horn, a vehicle siren, a vehicle parking light, a vehicle headlight, a vehicle turning direction indicator, a vehicle hazard light, and a strobe light.

9. The vehicle tracking unit according to claim 1 wherein said controller comprises at least one dual polarity compatible output, and wherein the vehicle alarm indicator is connected to said dual polarity compatible output.

10. The vehicle tracking unit according to claim 1 wherein said vehicle position determining device comprises a Global Positioning System (GPS) device.

11. The vehicle tracking unit according to claim 1 wherein said wireless communications device comprises a cellular telephone communications device.

12. The vehicle tracking unit according to claim 11 wherein said cellular telephone communications device communicates over a cellular control channel.

13. A vehicle tracking unit for a vehicle of a type comprising a vehicle alarm indicator, the vehicle tracking unit comprising:
    a housing;
    a vehicle position determining device carried by said housing;
    a wireless communications device carried by said housing; and
    a controller carried by said housing and connected to said wireless communications device and said vehicle position determining device to send vehicle position information to a monitoring station;
    said controller for causing the vehicle alarm indicator to provide an alarm indication lasting for a predetermined time and based upon said wireless communications device receiving a vehicle finder activation signal;
    said controller being switchable between armed and disarmed modes, and said controller also for causing the vehicle alarm indicator to cease providing the alarm indication prior to expiration of the predetermined time based upon switching from the armed mode to the disarmed mode.

14. The vehicle tracking unit according to claim 13 wherein said vehicle further comprises an ignition switch, and wherein said controller is connected to the ignition switch and switches between armed and disarmed modes based upon the ignition switch.

15. The vehicle tracking unit according to claim 13 wherein said controller switches between armed and disarmed modes based upon a remote transmitter to be carried by a user.

16. The vehicle tracking unit according to claim 13 wherein said controller switches between armed and disarmed modes based upon a signal from the monitoring station.

17. The vehicle tracking unit according to claim 13 wherein the vehicle further comprises a security controller; and wherein said controller is responsive to the security controller for switching between armed and disarmed modes.

18. The vehicle tracking unit according to claim 13 wherein said controller also cooperates with said vehicle position determining device and said wireless communications device to send an alert message to the monitoring station based upon the vehicle changing location while said controller is in the armed mode.

19. The vehicle tracking unit according to claim 13 wherein the vehicle alarm indicator comprises at least one of a vehicle horn, a vehicle siren, a vehicle parking light, a vehicle headlight, a vehicle turning direction indicator, a vehicle hazard light, and a strobe light.

20. The vehicle tracking unit according to claim 13 wherein said controller comprises at least one dual polarity compatible output, and wherein the vehicle alarm indicator is connected to said dual polarity compatible output.

21. The vehicle tracking unit according to claim 13 wherein said vehicle position determining device comprises a Global Positioning System (GPS) device.

22. The vehicle tracking unit according to claim 13 wherein said wireless communications device comprises a cellular telephone communications device.

23. The vehicle tracking unit according to claim 22 wherein said cellular telephone communications device communicates over a cellular control channel.

24. A vehicle location method for a vehicle of a type comprising a vehicle alarm indicator and a vehicle tracking unit, the vehicle tracking unit comprising a vehicle position determining device, a wireless communications device, and a controller connected to the wireless communications device and the vehicle position determining device to send vehicle position information to a monitoring station, the method comprising:

sending a vehicle finder activation signal to the wireless communications device;

providing an alarm indication lasting for a predetermined time using the vehicle alarm indicator based upon the wireless communications device receiving the vehicle finder activation signal;

providing a user input to the controller; and ceasing providing the alarm indication prior to expiration of the predetermined time based upon the controller receiving the user input.

25. The method according to claim 24 wherein the controller is switchable between armed and disarmed modes; and wherein providing the user input comprises switching the controller from the armed mode to the disarmed mode.

26. The method according to claim 25 wherein the vehicle further comprises an ignition switch; wherein the controller is connected to the ignition switch; and wherein switching the controller from the armed mode to the disarmed mode comprises switching the controller from the armed mode to the disarmed mode based upon the ignition switch.

27. The method according to claim 25 wherein switching the controller from the armed mode to the disarmed mode comprises switching the controller from the armed mode to the disarmed mode based upon a remote transmitter to be carried by a user.

28. The method according to claim 25 wherein switching the controller from the armed mode to the disarmed mode comprises switching the controller from the armed mode to the disarmed mode based upon a signal from the monitoring station.

29. The method according to claim 25 wherein the vehicle further comprises a security controller; and wherein switching the controller from the armed mode to the disarmed mode comprises switching the controller from the armed mode to the disarmed mode based upon the security controller.

30. The method according to claim 25 further comprising sending an alert message to the monitoring station using the wireless communications device based upon the vehicle changing location while the controller is in the armed mode.

31. The method according to claim 24 wherein the vehicle alarm indicator comprises at least one of a vehicle horn, a vehicle siren, a vehicle parking light, a vehicle headlight, a vehicle turning direction indicator, a vehicle hazard light, and a strobe light.

* * * * *